(12) United States Patent
Vassilovski et al.

(10) Patent No.: US 11,620,907 B2
(45) Date of Patent: Apr. 4, 2023

(54) METHOD AND APPARATUS FOR VEHICLE MANEUVER PLANNING AND MESSAGING

(71) Applicant: QUALCOMM Incorporated, San Diego, CA (US)

(72) Inventors: Dan Vassilovski, Del Mar, CA (US); Hong Cheng, Bridgewater, NJ (US); Zhibin Wu, Sunnyvale, CA (US); Shailesh Patil, San Diego, CA (US); Richard Hovey, Branchburg, NJ (US)

(*) Notice: Subject to any disclaimer, the term of this patent is extended or adjusted under 35 U.S.C. 154(b) by 283 days.

(21) Appl. No.: 16/545,282

(22) Filed: Aug. 20, 2019

(65) Prior Publication Data

US 2020/0339124 A1    Oct. 29, 2020

Related U.S. Application Data

(60) Provisional application No. 62/839,981, filed on Apr. 29, 2019.

(51) Int. Cl.
| | | |
|---|---|---|
| G05D 1/02 | (2020.01) | |
| G08G 1/16 | (2006.01) | |
| H04W 4/46 | (2018.01) | |
| H04W 4/40 | (2018.01) | |
| B60W 30/18 | (2012.01) | |

(Continued)

(52) U.S. Cl.
CPC ........ G08G 1/162 (2013.01); B60W 30/18163 (2013.01); G05D 1/0088 (2013.01); G05D 1/0221 (2013.01); G05D 1/0289 (2013.01); G08G 1/161 (2013.01); G08G 1/166 (2013.01); H04W 4/06 (2013.01); H04W 4/40 (2018.02); H04W 4/46 (2018.02); B60W 2510/18 (2013.01); B60W 2554/801 (2020.02); B60W 2756/10 (2020.02); G05D 2201/0213 (2013.01)

(58) Field of Classification Search
CPC ........ G08G 1/162; G08G 1/161; G08G 1/166; H04W 4/46; H04W 4/40; H04W 4/06; B60W 30/18163; G05D 1/0088; G05D 1/0221; G05D 1/0289
See application file for complete search history.

(56) References Cited

U.S. PATENT DOCUMENTS 6,621,420 B1    9/2003  Poursartip
9,296,263 B2 *  3/2016  Muthukumar ............ B60T 1/10
(Continued)

FOREIGN PATENT DOCUMENTS

EP    3351025 A1    7/2018

OTHER PUBLICATIONS

Alexander P, et al "Cooperative Intelligent Transport Systems: 5.9-GHz Field Trials". Proceedings of the IEEE, IEEE. New York, US, vol. 99, No. 7, Jul. 1, 2011 (Jul. 1, 2011), pp. 1213-1235, XP011367579, ISSN: 0018-9219, DOI:10.1109/JPROC.2011. 2105230 abstract Formula "davoid=( ••• )"; p. 1227.

(Continued)

*Primary Examiner* — Peter D Nolan
*Assistant Examiner* — Roy Rhee

(57) ABSTRACT

Techniques are provided which may be implemented using various methods and/or apparatuses in a vehicle to utilize vehicle external sensor data, vehicle internal sensor data, vehicle capabilities and external CV2X input to determine, send, receive and utilize data elements to determine inter-vehicle spacing, intersection priority, lane change behavior and spacing and other autonomous vehicle behavior.

42 Claims, 25 Drawing Sheets

(51) Int. Cl.
    *G05D 1/00*    (2006.01)
    *H04W 4/06*    (2009.01)

(56) References Cited

U.S. PATENT DOCUMENTS

| | | | |
|---|---|---|---|
| 10,217,357 | B1 | 2/2019 | Elsheemy |
| 10,395,332 | B1* | 8/2019 | Konrardy .......... G06F 16/90335 |
| 10,650,673 | B1 | 5/2020 | Elsheemy |
| 10,857,994 | B2 | 12/2020 | Iagnemma et al. |
| 11,087,624 | B2 | 8/2021 | Wei et al. |
| 2009/0082949 | A1 | 3/2009 | Petrie et al. |
| 2012/0218126 | A1 | 8/2012 | Roberts et al. |
| 2015/0149059 | A1 | 5/2015 | Choi |
| 2016/0098926 | A1 | 4/2016 | Probert et al. |
| 2016/0328968 | A1 | 11/2016 | Elsheemy |
| 2017/0053530 | A1 | 2/2017 | Gogic et al. |
| 2017/0084174 | A1 | 3/2017 | Suzuki |
| 2017/0213462 | A1 | 7/2017 | Prokhorov |
| 2017/0301237 | A1 | 10/2017 | Macneille et al. |
| 2017/0337819 | A1 | 11/2017 | Wei et al. |
| 2018/0061231 | A1 | 3/2018 | Publicover |
| 2018/0174449 | A1 | 6/2018 | Nguyen |
| 2018/0253976 | A1 | 9/2018 | Inam et al. |
| 2019/0051159 | A1* | 2/2019 | Wang .................. G05D 1/0027 |
| 2019/0088148 | A1 | 3/2019 | Jacobus et al. |
| 2019/0232962 | A1* | 8/2019 | Broll ............... B60W 30/18109 |
| 2019/0259282 | A1* | 8/2019 | Ji ........................ G08G 1/0112 |
| 2019/0367043 | A1* | 12/2019 | Dotzler ................ G05D 1/0088 |
| 2020/0079381 | A1 | 3/2020 | Lombrozo et al. |
| 2020/0081611 | A1 | 3/2020 | Beaurepaire |
| 2020/0201334 | A1 | 6/2020 | Max et al. |
| 2020/0216022 | A1* | 7/2020 | Cheng ................... B60R 25/102 |
| 2020/0242924 | A1 | 7/2020 | Publicover et al. |
| 2020/0342760 | A1 | 10/2020 | Vassilovski et al. |
| 2021/0024061 | A1* | 1/2021 | Visintainer ........... B60W 40/04 |
| 2021/0078610 | A1 | 3/2021 | Schuller et al. |
| 2021/0152991 | A1 | 5/2021 | Wu et al. |
| 2021/0192939 | A1 | 6/2021 | Vassilovski et al. |
| 2021/0248904 | A1 | 8/2021 | Nguyen |
| 2022/0030430 | A1 | 1/2022 | Lund et al. |
| 2022/0159428 | A1 | 5/2022 | Choi et al. |

OTHER PUBLICATIONS

"Dedicated Short Range Communications (DSRC) Message Set Dictionary; BallotDraft J2735 Amend 1 Oct. 2020," ETSI Draft, BallotDraft J2735 Amend 1 Oct. 2020, European Telecommunications Standards Institute (ETSI), 650, Route Des Lucioles, F-06921 Sophia-Antipolis, France, val. ITS—ITSWG1, Jan. 14, 2015 (Jan. 14, 2015), pp. 1-390.
Federal Ministry of Digital Infrastructure: "Deliverable D1.1: Use Cases, Requirements, Performance Evaluation Criteria V1.1", Oct. 5, 2017 (Oct. 5, 2017), pp. 1-107, XP055610047, Retrieved from the Internet: URL:http://convex-project.de/onewebmedia/Deliverable_D1.1_Use-Cases-Requirements-Performance-Evaluation-Criteria_v1_1.pdf [retrieved on Jul. 31, 2019]—abstract Section "Trial set up and requirements".
International Search Report and Written Opinion—PCT/US2020/028057—ISAEPO—dated Jul. 14, 2020.

* cited by examiner

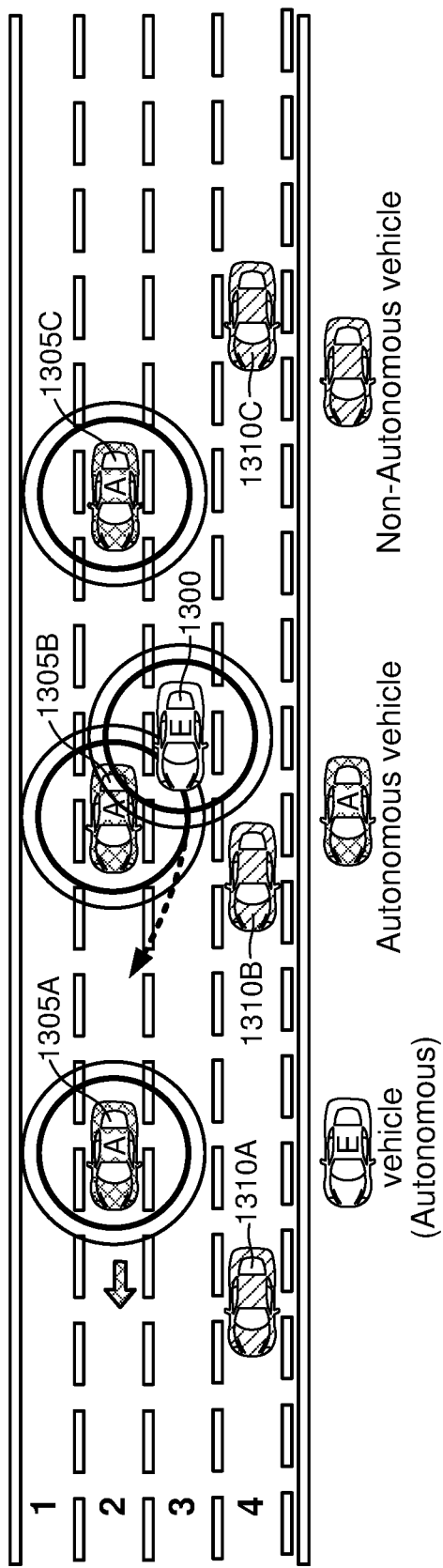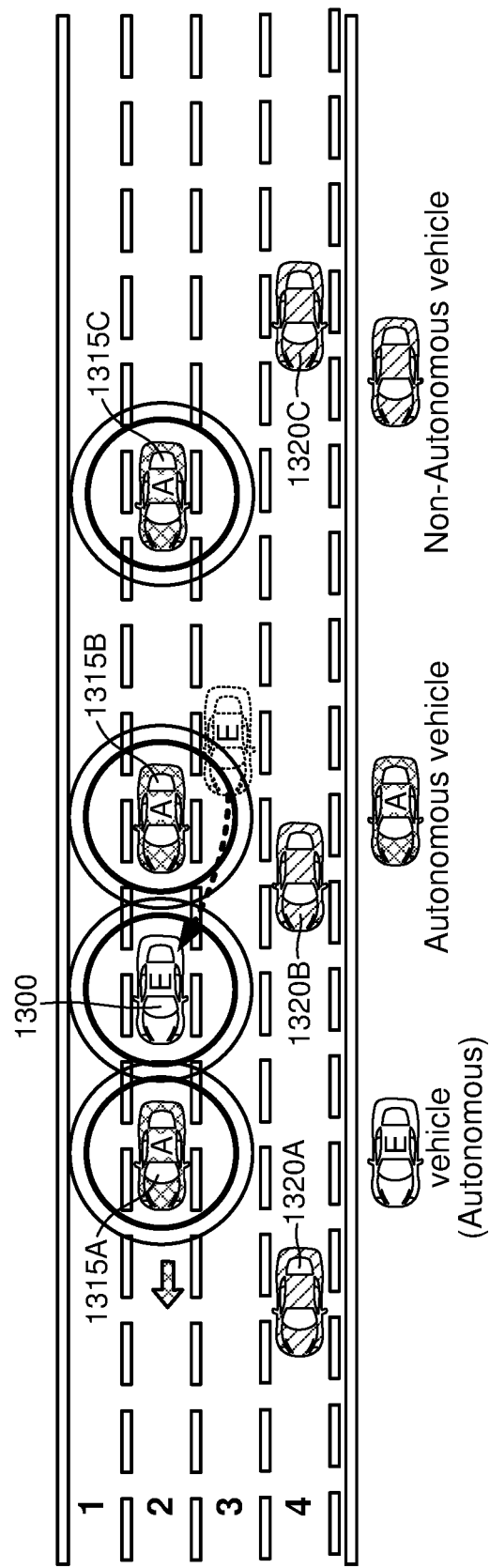

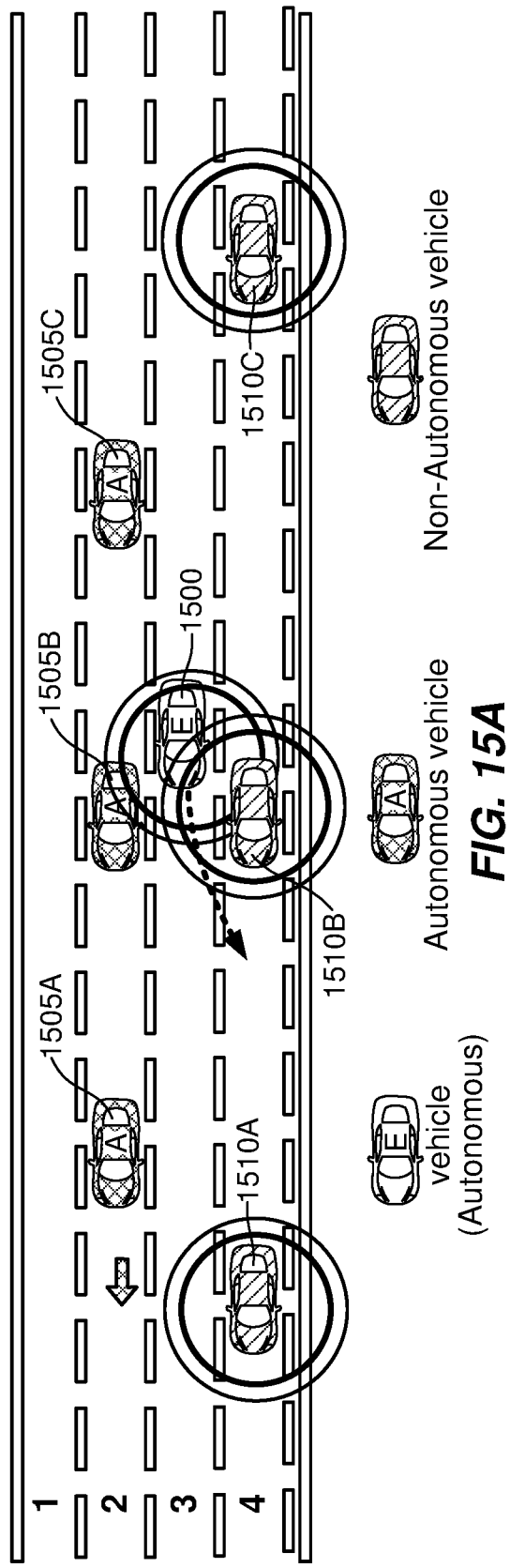
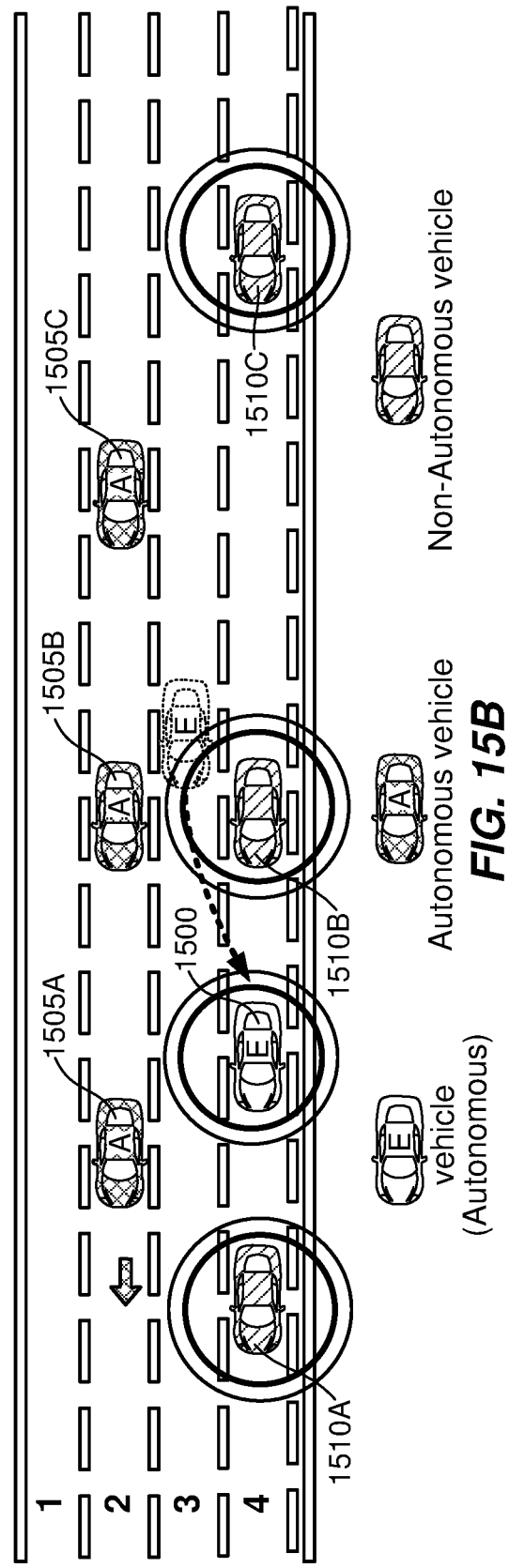
FIG. 15A
FIG. 15B

METHOD AND APPARATUS FOR VEHICLE MANEUVER PLANNING AND MESSAGING

RELATED APPLICATIONS

This application claims the benefit of U.S. Provisional Application No. 62/839,981, filed Apr. 29, 2019, entitled "Method and Apparatus for Vehicle Maneuver Planning and Messaging", which is assigned to the assignee hereof and incorporated herein by reference.

BACKGROUND

1. Field

The subject matter disclosed herein relates to automotive devices, and more particularly to methods, messaging and apparatuses for use in or with an automotive device to facilitate vehicle maneuvering.

2. Information

Self-driving cars enable automated driving, to enhance the safety, efficiency and convenience of vehicular transportation. Path and maneuver planning for a vehicle to everything (V2X)-capable vehicle, here referred to as the ego vehicle, depends on knowing the capabilities and behavior of surrounding vehicles. The capabilities and behavior of surrounding vehicles helps determine, for example, safe intervehicle spacing and lane change maneuvering. The capabilities and behavior of surrounding vehicles will need to be communicated, for example, through V2X application-layer standards via a set of Data elements (DEs) for vehicles to exchange capability information. Using these data elements will enable vehicles to optimize times and distances for inter-vehicle spacing and maneuvers. It is understood that references to vehicle to everything (V2X) and cellular vehicle to everything (CV2X), as used herein, may apply to and encompass various communication embodiments and standards such as, but not limited to, 5G new radio (NR) communications standards, dedicated short-range communications (DSRC), 802.11p, the Surface Vehicle Standard (SVS) from the Society of Automotive Engineers (SAE), the Intelligent Transport System (ITS) standards from the European Telecommunications Standards Institute (ETSI), such as the Basic Safety Message or the Cooperative Awareness Message, and/or other vehicle to vehicle (V2V), cellular vehicle to everything (CV2X) and other vehicle to everything (V2X) communication embodiments as may exist or may be defined in the future.

SUMMARY

Some example techniques are presented herein which may be implemented in various methods and apparatuses in a vehicle to determine, send, receive and utilize data elements to determine inter-vehicle spacing, intersection priority, lane change behavior and spacing and other autonomous vehicle behavior.

In an embodiment, a method of vehicle coordination may comprise: receiving, at an ego vehicle, a first message from a first vehicle, wherein the first message comprises an identification data element for the first vehicle, an autonomous vehicle status data element for the first vehicle or a braking distance data element for the first vehicle or a combination thereof; receiving, at the ego vehicle, a second message from a second vehicle, wherein the second message comprises an identification data element for the second vehicle, an autonomous vehicle status data element for the second vehicle or a braking distance data element for the second vehicle or a combination thereof; determining a target space based, at least in part, upon a size of the ego vehicle, the autonomous vehicle status data element for the first vehicle, the autonomous vehicle status data element for the second vehicle, the braking distance data element for the first vehicle, or the braking distance data element for the second vehicle or a combination thereof; sending, from the ego vehicle, a third message to the first vehicle requesting the target space between the first vehicle and the second vehicle; sending, from the ego vehicle, a fourth message to the second vehicle requesting the target space between the first vehicle and the second vehicle; receiving at least one response in a fifth message from the first vehicle or in a sixth message from the second vehicle or a combination thereof; and maneuvering the ego vehicle into the target space between the first and the second vehicle based upon the at least one response.

In an embodiment, an ego vehicle, may comprise: one or more wireless transceivers; vehicle internal sensors; vehicle external sensors; a memory; and one or more processors, communicatively coupled to the one or more wireless transceivers, the vehicle internal sensors, the vehicle external sensors, and the memory; wherein the one or more processors are configured to: receive, at the one or more wireless transceivers, a first message from a first vehicle, wherein the first message comprises an identification data element for the first vehicle, an autonomous vehicle status data element for the first vehicle or a braking distance data element for the first vehicle or a combination thereof; receive, at the one or more wireless transceivers, a second message from a second vehicle, wherein the second message comprises an identification data element for the second vehicle, an autonomous vehicle status data element for the second vehicle or a braking distance data element for the second vehicle or a combination thereof; determine a target space based, at least in part, upon a size of the ego vehicle, the autonomous vehicle status data element for the first vehicle, the autonomous vehicle status data element for the second vehicle, the braking distance data element for the first vehicle, or the braking distance data element for the second vehicle or a combination thereof; send, from the one or more wireless transceivers, a third message to the first vehicle requesting the target space between the first vehicle and the second vehicle; send, from the one or more wireless transceivers, a fourth message to the second vehicle requesting the target space between the first vehicle and the second vehicle; receive at least one response in a fifth message from the first vehicle or in a sixth message from the second vehicle or a combination thereof; and maneuver the ego vehicle into the target space between the first and the second vehicle based upon the at least one response.

In an embodiment, an ego vehicle, may comprise: means for receiving, at the ego vehicle, a first message from a first vehicle, wherein the first message comprises an identification data element for the first vehicle, an autonomous vehicle status data element for the first vehicle or a braking distance data element for the first vehicle or a combination thereof; means for receiving, at the ego vehicle, a second message from a second vehicle, wherein the second message comprises an identification data element for the second vehicle, an autonomous vehicle status data element for the second vehicle or a braking distance data element for the second vehicle or a combination thereof; means for determining a target space based, at least in part, upon a size of the ego vehicle, the autonomous vehicle status data element for the first vehicle, the autonomous vehicle status data element for the second vehicle, the braking distance data element for the first vehicle, or the braking distance data element for the second vehicle or a combination thereof; means for sending, from the ego vehicle, a third message to the first vehicle requesting the target space between the first vehicle and the second vehicle; means for sending, from the ego vehicle, a fourth message to the second vehicle requesting the target space between the first vehicle and the second vehicle; means for receiving at least one response in a fifth message from the first vehicle or in a sixth message from the second vehicle or a combination thereof; and means for maneuvering the ego vehicle into the target space between the first and the second vehicle based upon the at least one response.

In an embodiment, a method of vehicle coordination, may comprise receiving, at an ego vehicle, a first message from a first vehicle, wherein the first message comprises an identification data element for the first vehicle, an autonomous vehicle status data element for the first vehicle or a braking distance data element for the first vehicle or a combination thereof; receiving, at the ego vehicle, a second message from a second vehicle, wherein the second message comprises an identification data element for the second vehicle, an autonomous vehicle status data element for the second vehicle or a braking distance data element for the second vehicle or a combination thereof; determining a first target space between the ego vehicle and the first vehicle based upon the autonomous vehicle status data element for the first vehicle, an autonomous vehicle status of the ego vehicle, the braking distance data element for the first vehicle or a braking distance of the ego vehicle or a combination thereof; determining a second target space between the ego vehicle and the second vehicle based upon the autonomous vehicle status data element for the second vehicle, the autonomous vehicle status of the ego vehicle, the braking distance data element for the second vehicle or the braking distance of the ego vehicle or a combination thereof; sending, from the ego vehicle, a third message to the first vehicle requesting the first target space between the first vehicle and the ego vehicle; sending, from the ego vehicle, a fourth message to the second vehicle requesting the second target space between the first and the second vehicle; receiving at least one response in a fifth message from the first vehicle or in a sixth message from the second vehicle or a combination thereof; and maneuvering the ego vehicle to create or maintain the first target space between the ego vehicle and the first vehicle and the second target space between the ego vehicle and the second vehicle, based on the received at least one response.

In an embodiment, an ego vehicle may comprise: one or more wireless transceivers; vehicle internal sensors; vehicle external sensors; a memory; and one or more processors, communicatively coupled to the one or more wireless transceivers, the vehicle internal sensors, the vehicle external sensors, and the memory; wherein the one or more processors are configured to: receive, at the one or more wireless transceivers, a first message from a first vehicle, wherein the first message comprises an identification data element for the first vehicle, an autonomous vehicle status data element for the first vehicle or a braking distance data element for the first vehicle or a combination thereof; receive, at the one or more wireless transceivers, a second message from a second vehicle, wherein the second message comprises an identification data element for the second vehicle, an autonomous vehicle status data element for the second vehicle or a braking distance data element for the second vehicle or a combination thereof; determine a first target space between the ego vehicle and the first vehicle based upon the autonomous vehicle status data element for the first vehicle, the autonomous vehicle status of the ego vehicle, the braking distance data element for the first vehicle or a braking distance of the ego vehicle or a combination thereof; determine a second target space between the ego vehicle and the second vehicle based upon the autonomous vehicle status data element for the second vehicle, the autonomous vehicle status of the ego vehicle, the braking distance data element for the second vehicle or the braking distance of the ego vehicle or a combination thereof; send, from the one or more wireless transceivers, a third message to the first vehicle requesting the first target space between the first vehicle and the ego vehicle; send, from the one or more wireless transceivers, a fourth message to the second vehicle requesting the second target space between the first and the second vehicle; receive, at the one or more wireless transceivers, an at least one response in a fifth message from the first vehicle or in a sixth message from the second vehicle or a combination thereof; and maneuver the ego vehicle to create or maintain the first target space between the ego vehicle and the first vehicle and the second target space between the ego vehicle and the second vehicle, based on the received at least one response In an embodiment, an ego vehicle may comprise: means for receiving, at the ego vehicle, a first message from a first vehicle, wherein the first message comprises an identification data element for the first vehicle, an autonomous vehicle status data element for the first vehicle or a braking distance data element for the first vehicle or a combination thereof; means for receiving, at the ego vehicle, a second message from a second vehicle, wherein the second message comprises an identification data element for the second vehicle, an autonomous vehicle status data element for the second vehicle or a braking distance data element for the second vehicle or a combination thereof; means for determining a first target space between the ego vehicle and the first vehicle based upon the autonomous vehicle status data element for the first vehicle, an autonomous vehicle status of the ego vehicle, the braking distance data element for the first vehicle or a braking distance of the ego vehicle or a combination thereof; means for determining a second target space between the ego vehicle and the second vehicle based upon the autonomous vehicle status data element for the second vehicle, the autonomous vehicle status of the ego vehicle, the braking distance data element for the second vehicle or the braking distance of the ego vehicle or a combination thereof; means for sending, from the ego vehicle, a third message to the first vehicle requesting the first target space between the first vehicle and the ego vehicle; means for sending, from the ego vehicle, a fourth message to the second vehicle requesting the second target space between the first and the second vehicle; means for receiving, at the ego vehicle, at least one response in a fifth message from the first vehicle or in a sixth message from the second vehicle or a combination thereof; and means for, maneuvering the ego vehicle to create or maintain the first target space between the ego vehicle and the first vehicle and the second target space between the ego vehicle and the second vehicle, based on the received at least one response.

BRIEF DESCRIPTION OF DRAWINGS

Non-limiting and non-exhaustive aspects are described with reference to the following figures, wherein like reference numerals refer to like parts throughout the various figures unless otherwise specified.

FIG. 13A and FIG. 13B illustrate exchanging vehicle autonomous capability messaging enabling closer inter-vehicle spacing.

FIG. 15A and FIG. 15B illustrate exchanging vehicle non-autonomous capability messaging to enable safe inter-vehicle spacing.

DETAILED DESCRIPTION

Figure 1:
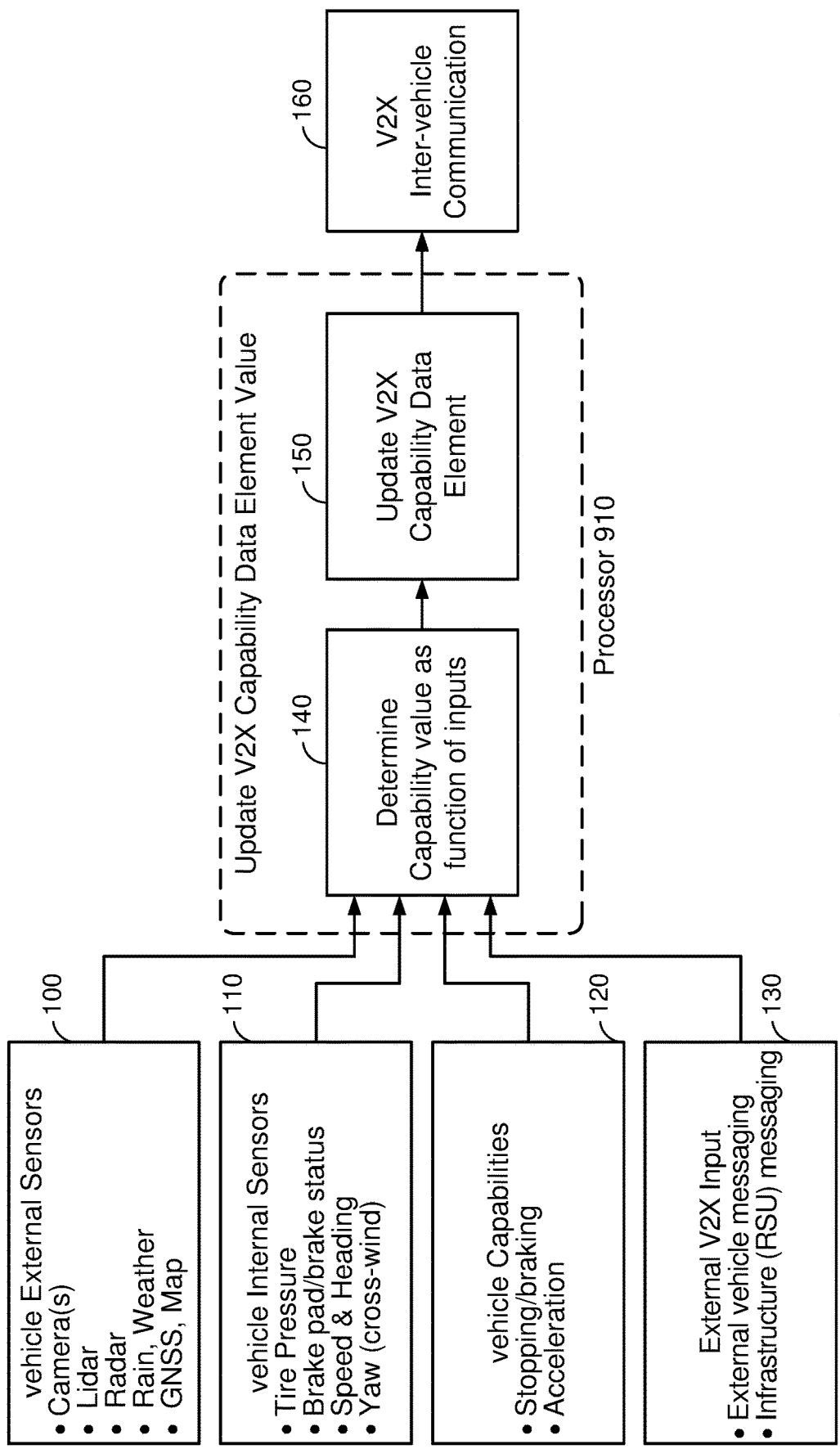
FIG. 1 is a device diagram illustrating an exemplary embodiment for determination and communication of a V2X capability data element value based on vehicle internal and external sensors, vehicle capabilities and external V2X inputs.

Some example techniques are presented herein which may be implemented in various methods, means and apparatuses in a vehicle. Example techniques presented herein address various methods and apparatuses in a vehicle to provide for or otherwise support the determination and use of vehicle to everything (V2X) data elements. Example techniques described herein may generally apply to the V2X capability data elements (DEs) describing V2X-enabled vehicle capabilities, not currently defined in V2X application-layer standards, including autonomous or non-autonomous driving, stopping distance, acceleration, turning radius at current speed and/or a measure of maneuverability at current speed. These DEs can be applied to V2X messages, for example, such as those defined in the Surface Vehicle Standard (SVS) from the Society of Automotive Engineers (SAE) or and those defined in the Intelligent Transport System (ITS) standards from the European Telecommunications Standards Institute (ETSI), such as the Basic Safety Message or the Cooperative Awareness Message. Example techniques and embodiments are provided for determining and providing these data elements. In an embodiment, the vehicle is able to dynamically update or adjust the value of the capability data elements using vehicle sensor data relating to sensed static or dynamic conditions and using external V2X inputs, such as data elements from other vehicles, to determine internal vehicle status, behavior and external environmental conditions as well as to provide up to date data elements over the air (OTA) to nearby vehicles.

In an embodiment, some example V2X data elements may include whether the vehicle is driven autonomously or non-autonomously (e.g., based on vehicle status as stored in memory or determined upon request), vehicle stopping distance, vehicle acceleration, and vehicle turning radius at current speed and/or a measure of maneuverability at current speed. In an embodiment, the V2X data element describing whether the vehicle is driven autonomously or non-autonomously may be pre-determined based on car capabilities and particularly whether a car is capable of autonomous driving. However, for autonomous driving capable vehicles, the autonomous driving capability may be disabled for a manual driving mode. In some embodiments, the autonomous driving capability may be manually disabled by the driver of a vehicle, either by turning off autonomous driving mode or by taking a driving related action such as adjusting the steering, applying acceleration or applying braking. In some embodiments, the autonomous driving mode may be disabled by the vehicle when it encounters a situation it is not well equipped to drive in; in an embodiment, the manual mode switch could be accompanied with notification to the driver that autonomous driving mode may or should be terminated and may, in some embodiments, also require acknowledgement by the driver that the driver is able to take control of the vehicle before the transition out of autonomous mode is initiated. The data element may comprise, for example, a vehicle status of autonomous mode or a vehicle status of manual mode (or other non-autonomous mode). A data element may be utilized to describe details regarding autonomous mode being terminated; for example, comprising whether autonomous mode was manually cancelled by the driver, or automatically terminated due to adverse conditions or other reason for vehicle inability to self-drive in autonomous mode.

In an embodiment, vehicle stopping distance may be estimated based on pre-determined factory specifications and/or test data that are stored in memory in the vehicle, such as non-volatile RAM/ROM or hard drive. In an embodiment, vehicle stopping distance may be estimated based on internal and external sensor measurements, vehicle capabilities and external V2X input. In an embodiment, vehicle stopping distance may be estimated based on both pre-determined factory specifications and/or test data and a combination of pre-determined vehicle specifications and internal and external sensor measurements, vehicle capabilities and/or external V2X input.

In an embodiment, vehicle acceleration may be estimated based on pre-determined factory specifications and/or test data that are stored in memory in the vehicle, such as non-volatile RAM/ROM or hard drive. In an embodiment, vehicle acceleration may be estimated based on internal and external sensor measurements, vehicle capabilities and external V2X input. In an embodiment, vehicle acceleration may be estimated based on both pre-determined factory specifications and/or test data and a combination of pre-determined vehicle specifications and internal and external sensor measurements, vehicle capabilities and/or external V2X input.

In an embodiment, vehicle turning radius at current speed and/or a measure of maneuverability at current speed may be estimated based on pre-determined factory specifications and/or test data that are stored in memory in the vehicle, such as non-volatile RAM/ROM or hard drive. In an embodiment, vehicle turning radius at current speed and/or a measure of maneuverability at current speed may be estimated based on internal and external sensor measurements, vehicle capabilities and external V2X input. In an embodiment, vehicle turning radius at current speed and/or a measure of maneuverability at current speed may be estimated based on both pre-determined factory specifications and/or test data and a combination of pre-determined vehicle specifications and internal and external sensor measurements, vehicle capabilities and/or external V2X input.

FIG. 1 illustrates a system and means for implementing the various methods, apparatus and techniques described in the figures and text herein. In an embodiment, the vehicle may contain various vehicle external sensors (100) such as cameras 935, LIDAR 950, Radar 953, rain and weather sensors 945, GNSS receivers 970, and as well as data provided from a WAN or other communications network via wireless transceiver(s) 930 such as map data and weather conditions. Measurement data from the various vehicle external sensors 100 and input sources such as cameras 935, LIDAR 950, radar 953, rain and weather sensors 945, GNSS receivers 970, and map data may be utilized, in an embodiment, to determine data elements that may be shared between the subject (ego) vehicle and other vehicles and/or with other network-connected devices.

In a vehicle, there may be multiple cameras 935. For example, in an embodiment, there may be a camera in the front window assembly associated with the rear-view mirror, a camera in the front bumper, a camera in both external rear view side mirrors (connected to the front passenger doors), and in the rear trunk assembly and/or the rear bumper, which in some embodiments will present a full 360-degree view surrounding the car and/or near and far points of view. One or more cameras may be present in various vehicle embodiments. Cameras 935 may be utilized to determine and verify distance between the vehicle and external objects, for example, to determine lane change and stopping locations. The cameras may also be utilized to determine weather and road conditions such as determining or verifying that the road is wet, based on reflectivity of the road surface. This data may be used alone or combined with wheel sensor data, such as from traction control sensors, accelerometers and/or gyros to determine, for example, the slickness of the road surface, which may be utilized to increase the estimated stopping distance. Further determination may be made relative to water and/or ice on the road surface, the quality or type of road surface (asphalt, concrete, dirt or gravel), also using a combination of wheel and traction control sensors and camera data. In various embodiments, cameras may also be utilized to determine weather conditions, day versus night, and other external conditions.

LIDAR 950 may be implemented in a central roof-mounted unit or LIDAR 950 may be implemented utilizing multiple smaller units using, for example, solid state LIDAR 950 sensors, and oriented in particular directions. LIDAR 950 may be utilized to determine distance between the vehicle and external objects can may also be used in combination with other sensors such as GNSS receiver 970 or other location sensors, camera, wheel tick/distance sensors, and other location and distance related sensors to measure and/or verify stopping distance and/or to measure and/or calibrate stopping response relative to applied braking effort. The LIDAR 950 measurements may also be utilized in combination with tire pressure sensors, brake pad sensors and other tire-related sensors to predict and/or adjust stopping distance estimates and/or braking performance characteristics; for example, relative to a nominally defined braking distance, based on pre-defined brake pressure characteristics, LIDAR 950 may be utilized to measure actual in situ relationships between braking effort, tire pressure and actual stopping performance, which would be surface and weather dependent such that braking distance may be increased by bad weather wet or icy roads and/or different road surfaces.

Tire pressure, as may be measured by various wheel sensors 1012, or other sensors 945, impacts stopping distance and acceleration. Tire pressure impacts the amount of tire surface in contact with the road or other driving surface, which impacts stopping distance, acceleration and handling as well as effort required to maneuver the car. Tire pressure also impacts tire wear and length of tread life. For example, an overinflated tire may demonstrate significant increase in stopping distance, e.g., a 20% increase in tire pressure may result in as much as 20% increase in stopping distance, depending on the tire, the tread, the actual pressure and the road surface. On the other hand, a tire underinflated by 20% may demonstrate minor to no decrease in stopping distance, in spite of increased tread road contact, possibly due to the impact of less force per applied surface as the tire surface is applied to the road surface. Because the actual interaction of the tire surface with the road surface will vary depending on tire pressure, environment factors such as temperature, road composition and other factors, LIDAR 950, Radar 953, GNSS 970, inter-object signal-based measurements (e.g., signal strength or signal timing based such as RTT or TOA) or other distance measuring sensors may be used to determine the current acceleration and braking performance through the observation of real time impacts to acceleration and deceleration through the application of brakes. Furthermore, selection of different braking and/or acceleration methodologies most appropriate for the weather, environmental and road conditions may also be determined through real time monitoring, both during actual traffic related acceleration and braking and, if necessary, through test acceleration and braking to determine current parameters, using LIDAR 950, radar 953, GNSS, and/or RTT, TOA, RSSI or other signal based measurements, for example using wireless transceivers 930 based on inter-vehicular messaging signals.

In an embodiment, vehicle turning radius at current speed and/or a measure of maneuverability at current speed will be dependent on the speed, turning radius increasing and maneuverability decreasing with speed. Vehicle turning radius at current speed and/or a measure of maneuverability at current speed is also affected by road surface conditions; (e.g., slickness, increases turning radius and decreases maneuverability at current speed. Increases in road surface traction decrease turning radius at current speed and increase maneuverability at current speed; decreases in road surface traction do the opposite. Increased tire inflation decreases the tire surface in contact with the road, reducing traction, and thereby increases vehicle turning radius at current speed and reduces maneuverability at current speed. Sufficient tire tread increases road traction and therefore decreases turning radius at current speed and increases maneuverability at current speed. Increased vehicular weight increases turning radius at current speed and decreases maneuverability at current speed. Uneven load distribution increases turning radius at current speed and decreases maneuverability at current speed. Vehicle turning radius at current speed and a measure of maneuverability at current speed may be determined as a function of some or all of these variables and/or may be monitored real time relative to current conditions utilizing the external and internal sensors (for example, to monitor loss of tire traction and tire slippage relative to the road surface and/or relative to the other tires).

In an embodiment, Radar 953 may be implemented in fender/bumper-mounted assemblies 1108, where the fenders/bumpers are composed of non-metallic substances such as plastic or fiberglass, which provide good front-facing coverage for radar signals and good signal penetration of the fender in the forward direction. Additional radar assemblies 953 may be added for rear coverage via the rear bumper. In an embodiment, radar 953 may be implemented in other front-facing manner embedding or attaching the antenna into/onto, for example, the windshield. The assemblies are typically shielded from the environment by plastic, such as the plastic bumper or other radar-transparent substance. Some vehicle embodiments may also have rear facing radar. As with LIDAR, radar-based distance measurements relative to objects at known or fixed locations can be utilized, in an embodiment to determine performance characteristics of the vehicle such as braking performance relative to applied pressure, and acceleration versus particular throttle profiles. Radar may be utilized in combination with or in place of LIDAR 950 relative to distance determination for braking calibration and acceleration calibration and/or determination of braking and acceleration distances for particular speeds. For example, in the presence of snow, fog, and rain, or other visually obscuring conditions, radar may be substituted for or complement LIDAR 950 and/or camera-based methods.

A measure of braking performance may be determined by a ratio of distance traveled over elapsed time as a particular braking profile or pressure is applied. Another measure of braking performance includes determining and/or estimating stopping distance from current speed to zero velocity. The distance required to stop from current speed may be determined through various means, using distance measurements from various systems such as LIDAR, radar, wheel rotations, and/or GNSS. Even if a full stop is not measured, the distance traveled by the vehicle as the brake is applied to slow down the vehicle may be utilized to estimate and/or scale up or down the estimated stopping distance at current speed. In some embodiments, an extra margin may be applied to the estimated stopping distance at current speed to provide for safety margin.

Redundant and/or complementary means of measuring location and distance may be particularly useful in determining braking performance on wet or icy roads, in weather situations where visual methods such as camera are impaired, non-visual sensor systems such as radar and wheel rotations may be utilized to provide distance estimates. As discussed, braking performance and stopping distance at current speed may be estimated by measuring distance and velocity impact of various applications of braking, both in pressure and in frequency, and may be utilized to estimate both adequate braking distances as well as optimizing braking actuator application strategies for the conditions. Fixed objects or objects of known location may be utilized as points of reference and may comprise vehicles of known location, road markers, signs, trees, buildings and other reference objects that are visible to the sensor systems. The vehicle may initiate test braking and/or acceleration to characterize the surface and or the braking/acceleration performance and/or to optimize braking strategy and/or steering strategy as well as to determine adequate braking distance and determining driving strategies.

Camera 935 and LIDAR 950 and/or sensor-based measurements such as accelerometers and gyro measurements may be utilized to determine and characterize maneuvering performance such as the amount of turning at any given speed achieved through a known application of force or a known extent of wheel rotation through the steering system. As with braking and acceleration, maneuvering performance is also dependent on the conditions including impacts such as weather, road surface, road and/or ambient temperature, as well as tire tread, tire pressure and other vehicular factors. The characterized performance of the vehicle relative to the current conditions may be utilized to determine vehicular performance parameters such as braking performance and stopping distance at current speed, acceleration, and turn radius and/or maneuverability at current speed. These parameters may be used to determine safe inter-vehicle spacing relative to acceleration, braking and maneuvering. In addition, when determining inter-car spacing, the performance of the adjacent and nearby vehicles may also be utilized so that, a vehicle with longer braking distance (e.g., a truck) following a vehicle with a shorter braking distance (e.g., a motorcycle) adds additional braking distance to account for the forward vehicle's better performance relative to the ego vehicle to avoid a collision if the forward vehicle slows faster than the following vehicle. Similarly, a vehicle with shorter braking distance following a vehicle with a longer braking distance could, at least in theory, take advantage of the positive performance delta to enable closer vehicle spacing, for example, to optimize overall vehicle spacing and traffic flow.

Rain, light and weather sensors, and various other sensors 945 may also be present in some vehicles and, in some embodiments, are part of the dash and/or front window assembly or under hood assembly. Further weather-related information may also be received from outside sources such as other vehicles, roadside weather relays and via data connections, such as 4G and 5G data connections, to weather and roadside condition monitoring and information delivery services. Weather-related sensors may also be useful in controlling the weighting and/or use of various sensor measurements. For example, visual-based measurements from the camera may be down-weighted relative to radar measurements in dark conditions. Both LIDAR 950 and camera measurements may be down weighted or even ignored in situations where visual measurements are obscured such as in extreme weather such as heavy rain, dense snow and/or hail or dense fog in favor of less impacted system on the vehicle such as radar.

In an embodiment, tire traction sensors such as anti-lock, traction control and all-wheel drive traction control related sensor systems 945 may be utilized, in addition to their use for traction control, anti-lock braking and all-wheel drive systems, to estimate road surface conditions which may be used, at least in part, to estimate braking distance or modify nominal braking distance estimates. In an embodiment, empirically derived or other braking estimates may be increased based on estimates of road slickness. Therefore, road surface conditions that result in more tire slippage, as measured by the traction control or other tire systems, may increase the braking distance estimate more than road surface conditions that result in little or no tire slippage. In an embodiment, the estimates of road slippage may be measured and may increase the braking distance estimates proportional to the amount of road slippage (loss of tire traction). In an embodiment, the estimates may be categorized as being below or above a threshold for tire slippage, which may impact the braking estimate by a pre-determined amount.

GNSS 970 is typically implemented in a roof mounted antenna assembly such as in the shark's fin antenna assembly 1002 on the rear of the vehicle roof. Particularly in open sky conditions, GNSS may be used to determine absolute and relative location as well as velocity (for example, using doppler measurements or by using successive location and time measurements) and also to determine change in velocity (such as via changes in doppler over time based on successive measured signals from the same GNSS satellite(s)). Relative locations may be determined via differences between successive absolute locations via trilateration to the GNSS constellation and/or by comparing changes in doppler and/or phase offset of GNSS signals at successive times/locations. Particularly in open sky conditions, GNSS-based relative location and velocity measurements may be sufficient to characterize vehicle capabilities such as braking performance and acceleration relative to particular road conditions and/or car status (tire inflation, brake pad wear, fluid status, and motion status such as current velocity and/or heading, yaw). Doppler-based velocity measurements can be determined over time and correlated against, for example, braking or acceleration parameters such as braking force applied, braking application pattern, fuel or energy supplied, etc. to determine and/or profile braking and acceleration performance for particular conditions, both intrinsic to the vehicle (such as brake pad thickness, pressure applied, tire inflation) and extrinsic to the vehicle (such as road conditions, weather conditions, etc.). In an embodiment, doppler-based velocity measurements and doppler-based delta velocity measurements may be utilized to characterize actual acceleration and braking performance of the vehicle, either independently or in conjunction with other sensor systems such as radar, LIDAR 950 and camera-based systems as well as drive train-based systems such as wheel rotations and steering angle, accelerometers and gyros.

Map data may be stored locally in memory 960 such as flash, RAM, ROM, disc drive or other memory devices and/or map data may be obtained in batch or real time and/or updated wirelessly from a networked map database that is accessed over wireless data networks, for example, using wireless transceiver 930. The map data may be combined with sensor data and used to record map meta data such as note changes in parameters and conditions based on map location. This map metadata information may be shared between vehicles to enable more accurate and earlier prediction of upcoming vehicle performance parameters and external conditions at any given location and/or shared with map information servers and/or crowdsourcing servers.

In an embodiment, the vehicle 1000 will determine capability values as a function of the vehicle external sensors 100 (such as camera(s), LIDAR, radar, rain, weather, GNSS and Map data), the vehicle internal sensors 110 (such as tire pressure sensors, brake pad and brake status sensors, speed and heading, and yaw), vehicle capabilities 120 (such as stopping/braking performance, and acceleration), and/or external V2X Input 130 (such as external vehicle messaging and infrastructure (RSU) messaging). The capability value(s) may be determined 140 as a function of the inputs, and the determined capability value(s) may be used to update V2X capability data elements 150. Steps 140 and 150 may be performed, in some embodiments utilizing a processor 910 and/or a DSP 920 and memory 960 and/or various combinations thereof, configured to perform steps 140 and 150 utilizing inputs from vehicle external sensors 100, vehicle internal sensors 110, vehicle capabilities 120 and/or external V2X input 130 or various combinations thereof. The capability data elements may be shared with other vehicles or systems, for example in some embodiments using step 160, V2X inter-vehicle communication or other modes of vehicle to vehicle or vehicle to network communications. It is understood that this is an exemplary embodiment and that the sensor types and capabilities may vary between different vehicles.

Figure 2:
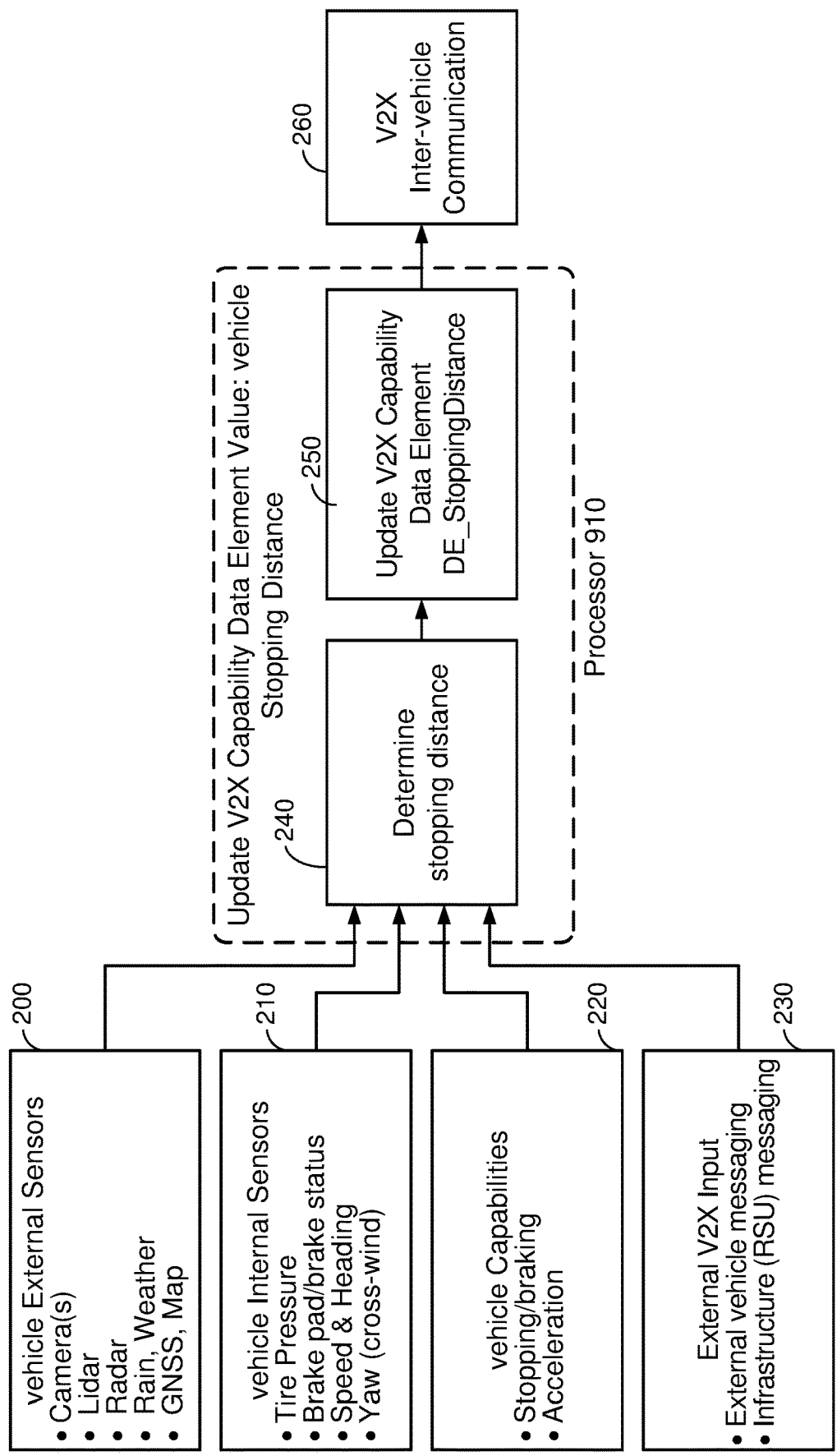
FIG. 2 is a device diagram illustrating an exemplary embodiment for determination and communication of vehicle stopping distance based on vehicle internal and external sensors, vehicle capabilities and external V2X inputs.

As shown in FIG. 2, in an embodiment, vehicle 1000, may estimate vehicle stopping distance and provide the estimate as a V2X data element, via V2X inter-vehicle communication. In an embodiment, the vehicle 1000 will determine vehicle stopping distance as a function of the vehicle external sensors 200 (such as camera(s), LIDAR, radar, rain, weather, GNSS and Map data), the vehicle internal sensors 210 (such as tire pressure sensors, brake pad and brake status sensors, speed and heading, and yaw), vehicle capabilities 220 (such as stopping/braking performance, and acceleration), and/or external V2X Input 230 (such as external vehicle messaging and infrastructure (RSU) messaging). Processor 910 and/or DSP 920 and memory 960 may be configured to update the V2X capability data element value for vehicle stopping distance. The vehicle stopping distance may be determined 240 as a function of inputs from vehicle external sensors 200, vehicle internal sensors 210, vehicle capabilities 220 and/or external V2X input 230, and the determined vehicle stopping distance may be used to update V2X capability data elements 250. Steps 240 and 250 may be performed, in some embodiments utilizing a processor 910 and/or a DSP 920 and memory 960 and/or various combinations thereof, configured to perform steps 240 and 250 utilizing various inputs from vehicle external sensors 200, vehicle internal sensors 210, vehicle capabilities 220 and/or external V2X input 230 or various combinations thereof. The capability data elements may be shared with other vehicles or systems, for example in some embodiments using step 260, V2X inter-vehicle communication, or other modes of vehicle to vehicle or vehicle to network communications. It is understood that this is an exemplary embodiment and that the sensor types and capabilities may vary between different vehicles.

Figure 3A:
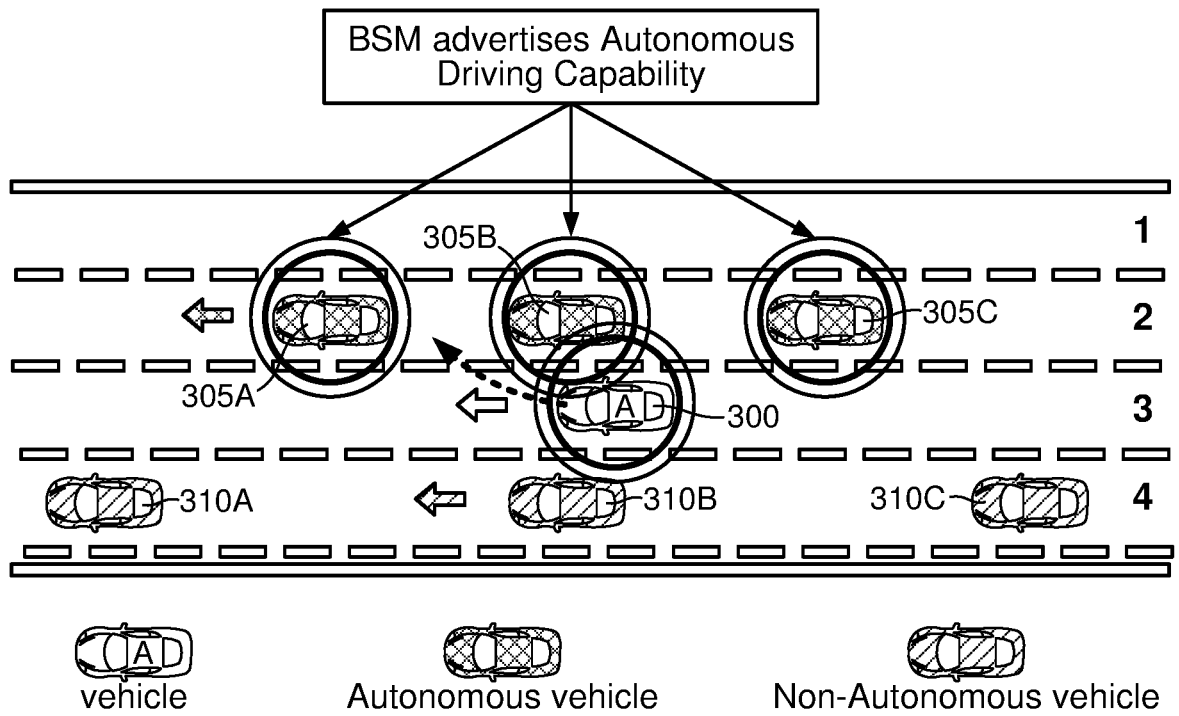
FIG. 3a and FIG. 3b illustrate an exemplary procedure for lane change with autonomous vehicles.
Figure 3B:
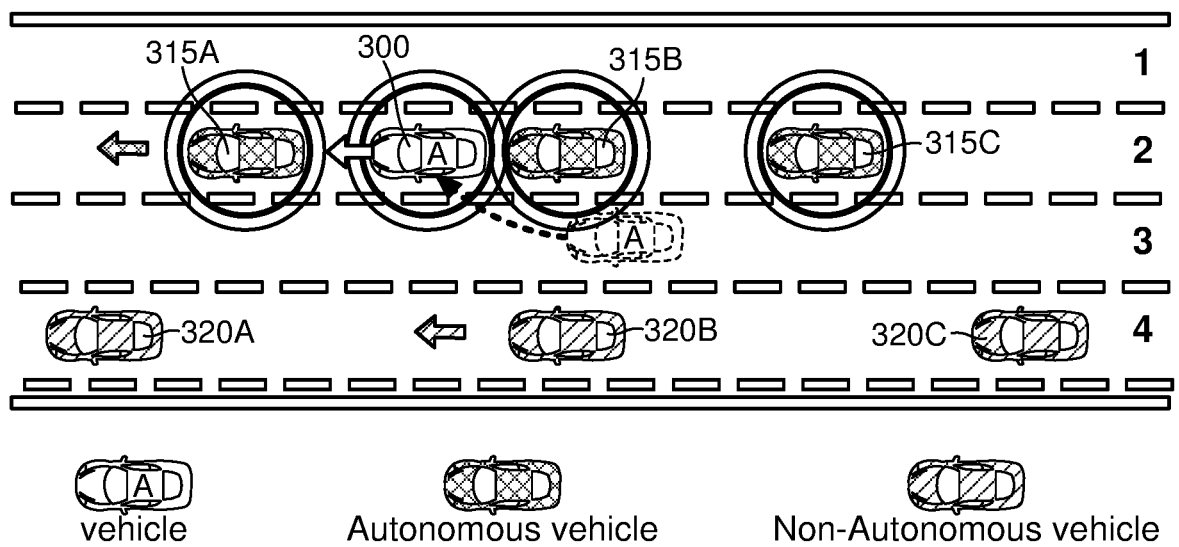

As shown in FIGS. 3A and 3B, in an embodiment, vehicle 1000, for example, a car, truck, motorcycle and/or other motorized vehicle, may exchange vehicle autonomous capability to enable desired lane change maneuver with closer vehicle spacing. In FIG. 3A, in an embodiment, vehicle A, 300, intends to do a lane change to the right, from lane 3 to lane 2. The vehicles in lane 2, 305A, 305B and 305C, advertise their autonomous driving capability. In an embodiment, each of the lane 2 vehicles (autonomous) transmit a basic safety message (BSM) including a data element delineating that the respective vehicle is autonomously driven. In an embodiment, equivalent messaging may also be achieved using ETSI cooperative awareness messages (CAM) including a data element delineating that the respective vehicle is autonomously driven. Vehicle A, 300, receives messages from the vehicles in lane 2, 305A, 305B and 305C including a data element delineating that the respective vehicle is autonomously driven. In FIG. 3B, vehicle A, 300, performs a lane change from lane 3 to lane 2, signaling to the cars in lane 2, 305A, 305B and 305C, to request and/or announce a pending lane change and subsequently performing a lane change from lane 3 to lane 2 inserting between cars 315A and 315B with reduced inter-car spacing based on the announced autonomous capability of cars 315A and 315B than if cars 315A and 315B were non-autonomous.

Figure 4A:
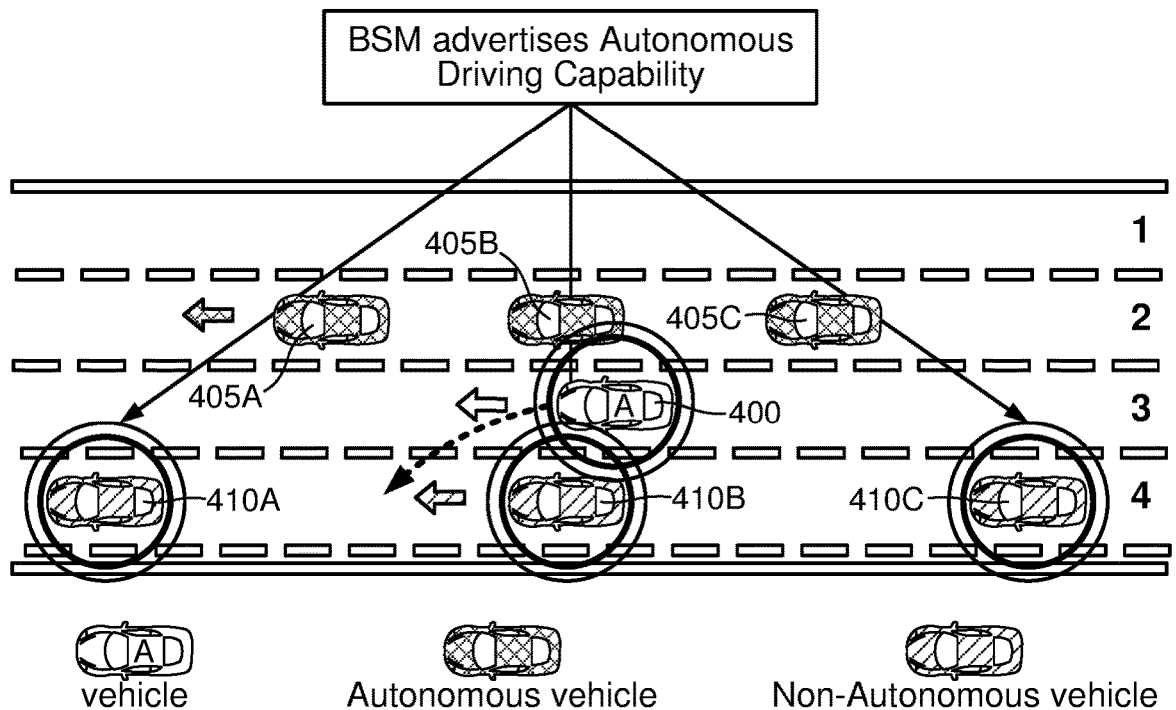
FIG. 4a and FIG. 4b illustrate an exemplary procedure for lane change with non-autonomous vehicles.
Figure 4B:
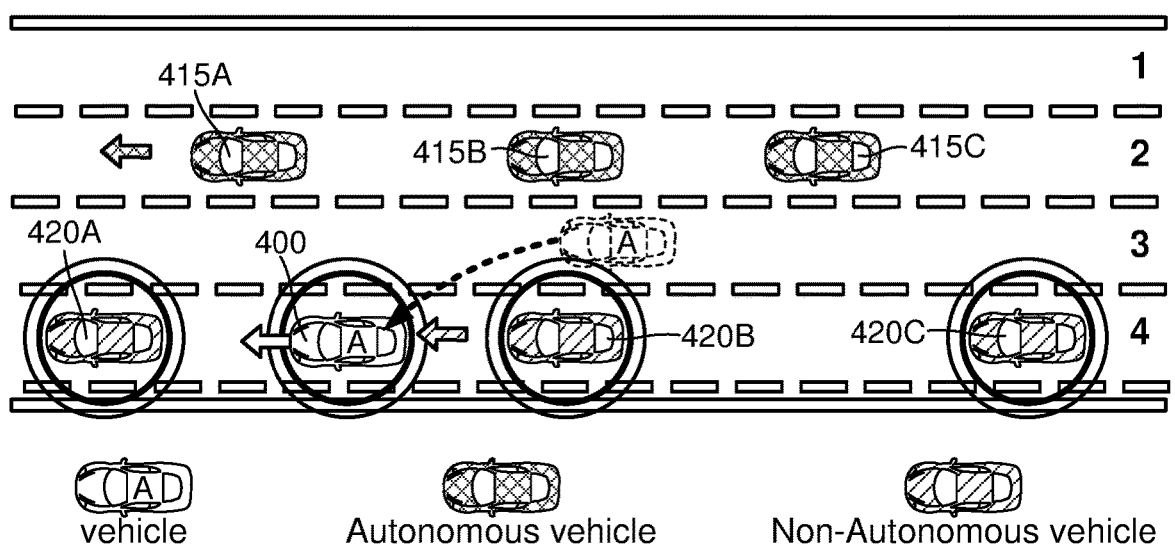

As shown in FIGS. 4A and 4B, in an embodiment, vehicle 1000, for example, a car, truck, motorcycle and/or other motorized vehicle, may receive (or infer) vehicle non-autonomous capability messages and/or information to enable a desired lane change maneuver with wider vehicle spacing than would be utilized with autonomous vehicles, such as 305A, 305B and 305C in FIGS. 3A and 3B. In FIG. 4A, in an embodiment, vehicle A, 400, intends to do a lane change to the left, from lane 3 to lane 4. The vehicles in lane 4, 410A, 410B and 410C, advertise their non-autonomous driving capability. In an embodiment, each of the lane 4 vehicles (non-autonomously driven), 410A, 410B and 410C, transmit a basic safety message (BSM) including a data element delineating that the respective vehicle is non-autonomously driven. In an embodiment, equivalent messaging may also be achieved using ETSI cooperative awareness messages (CAM) including a data element delineating that the respective vehicle is non-autonomously driven. Vehicle A, 400, receives messages from the vehicles in lane 4, 410A, 410B and 410C, including a data element delineating that the respective vehicle is non-autonomously driven. In FIG. 4B, vehicle A, 400, negotiates and executes a lane change from lane 3 to lane 4, signaling to the vehicles in lane 4, 410A, 410B and 410C, to request and/or announce the pending lane change and subsequently performing a lane change from lane 3 to lane 4 inserting between cars 410A, 410B with increased inter-car spacing based on the announced non-autonomous capability of cars 410A, 410B versus the inter-car spacing that would be utilized if cars 410A, 410B were announced autonomous. In an embodiment, detected but non-responsive cars that do not provide the BSM and/or CAM messaging responses and/or advertisements, may be assumed to be non-autonomous.

Figure 5A:
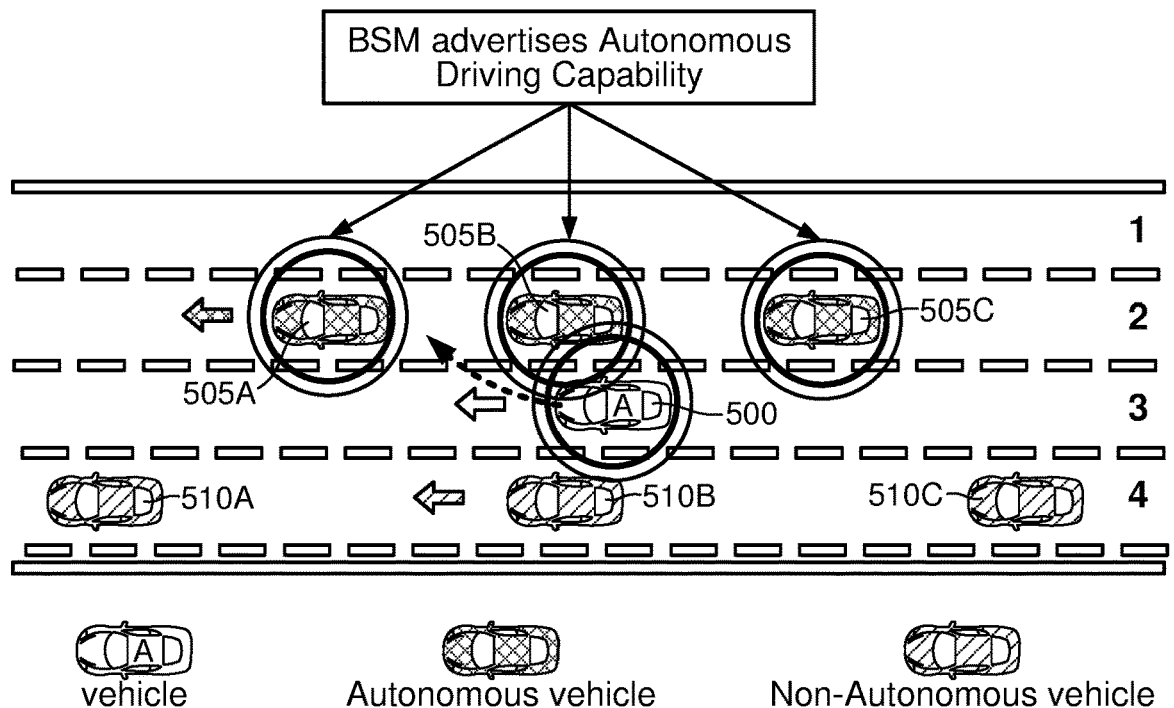
FIG. 5a and FIG. 5b illustrate an exemplary procedure for lane change for a vehicle that turns autonomous mode off.
Figure 5B:
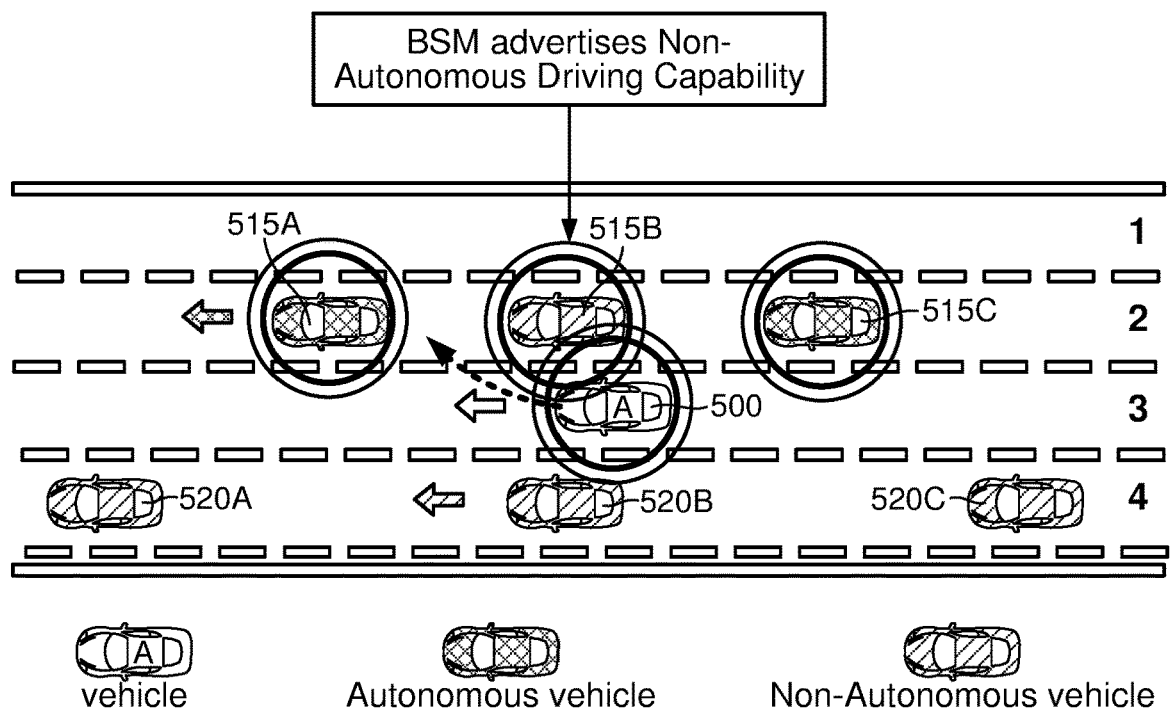

As shown in FIGS. 5A and 5B, in an embodiment, vehicle 1000, for example, a car, truck, motorcycle and/or other motorized vehicle, may receive vehicle autonomous capability messages followed by vehicle non-autonomous capability messages for a car in a target lane into which vehicle A, 500, is targeting a lane change into, causing vehicle A, 500, to defer or re-plan the lane change until a safe lane-change spacing in available. In FIG. 5A, in an embodiment, vehicle A, 500, intends to do a lane change to the right, from lane 3 to lane 2. The vehicles in lane 2, 505A, 505B and 505C, advertise their autonomous driving capability. In an embodiment, each of the lane 2 vehicles (autonomously driven), 505A, 505B and 505C, transmit a basic safety message (BSM) including a data element delineating that the respective vehicle is autonomously driven. In an embodiment, equivalent messaging may also be achieved using ETSI cooperative awareness messages (CAM) including a data element delineating that the respective vehicle is autonomously driven. Vehicle A, 500, receives messages from the vehicles in lane 2, 505A, 505B and 505C, including a data element delineating that the respective vehicle is autonomously driven. In FIG. 5B, however, the middle vehicle in lane 2, vehicle 505B turns off its autonomous capability or otherwise switches to a non-autonomous driving mode and transmits a BSM or CAM message changing the autonomous capability field to non-autonomous. Vehicle A, 500, receives the BSM or CAM message with the autonomous capability field set to non-autonomous and, in response to the non-autonomous capability of vehicle 505B, defers or re-plans the lane change to the right. For example, in an embodiment, vehicle A, 500, may wait for appropriate spacing for a non-autonomous lane change to the right or for adjacent autonomous vehicles to negotiate a lane change with to the right. In an embodiment, detected but non-responsive cars that do not provide the BSM and/or CAM messaging responses and/or advertisements, may be assumed to be non-autonomous; for example, in vehicle 505B stops transmitting autonomous capability, in an embodiment, vehicle A, 500, may infer that vehicle 505B is not (or is no longer) autonomously driven.

In an embodiment, example data elements for autonomous and non-autonomous vehicle determination, as would be utilized in a lane change or a potential lane change may be implemented as follows. SAE data element definitions may include a new data element comprising values for DE_DriverAutonomous and DE_DriverNonAutonomous. These values may be allocated to existing SAE J2735 Data element, DE_BasicVehicleClass. In this embodiment, it assigns currently unused (reserved) values to represent DriverAutonomous and DriverNonAutonomous data elements comprising V2X_DriverAutonomous and V2X_DriverNonAutonomous.

In an embodiment, ETSI-ITS data element definitions may include a new data element comprising values for DE_DriverAutonomous and DE_DriverNonAutonomous. In this embodiment, new values are allocated to existing ETSI-ITS TS 102 894-2 Common Data Dictionary DE_StationType, assigning currently unused (reserved) values to represent values for Autonomous and Non-Autonomous driving, comprising V2X_DriverAutonomous and V2X_DriverNonAutonomous.

Figure 6A:
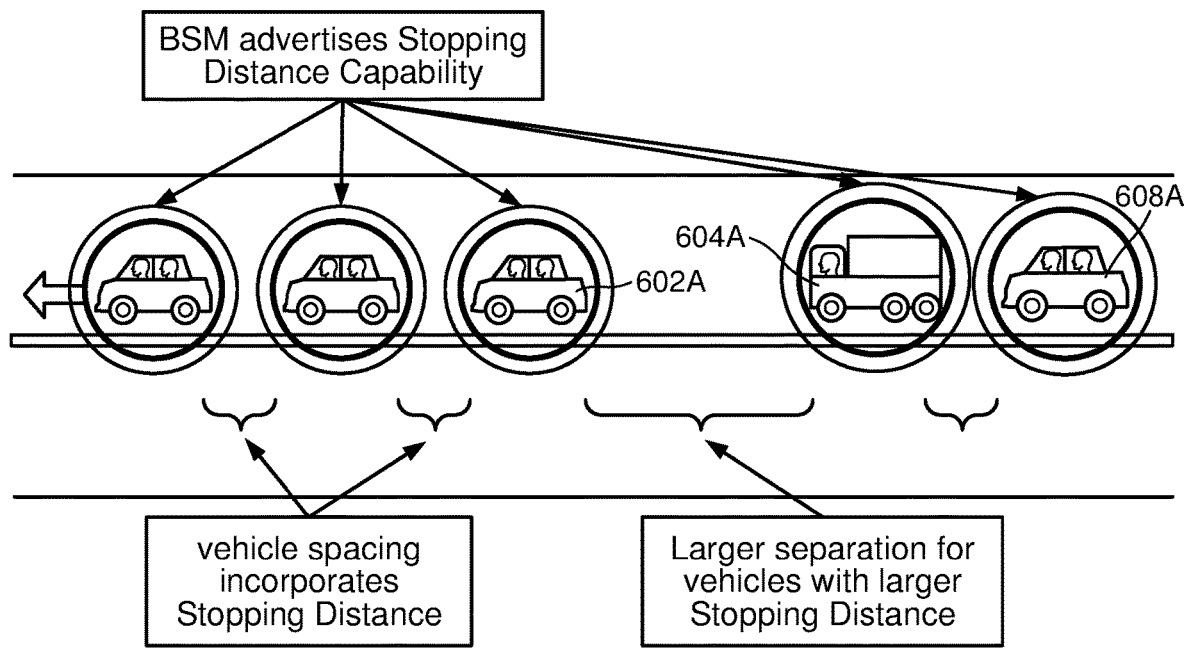
FIG. 6a and FIG. 6b illustrate an exemplary procedure for determining and advertising stopping distance for vehicle platooning.
Figure 6B:
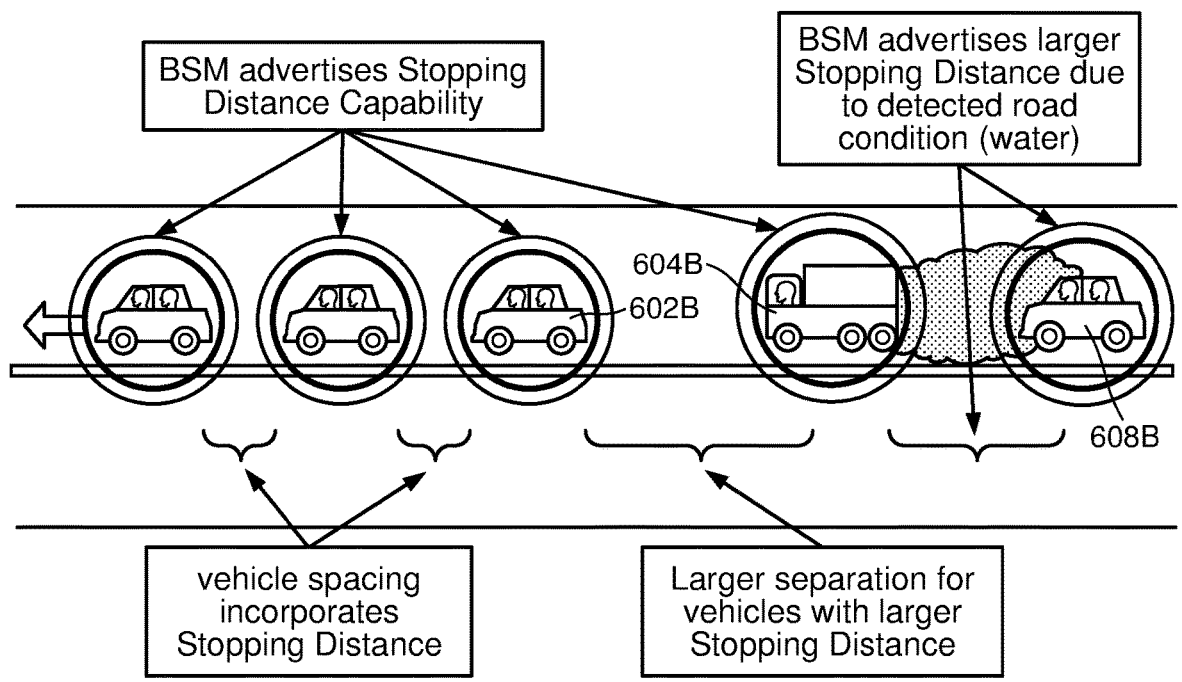

As shown in FIGS. 6A and 6B, in an embodiment, vehicles 1000, for example, a car, truck, motorcycle and/or other motorized vehicle, may advertise stopping distance, which may be utilized, in an embodiment, to determine inter-vehicle spacing for platooning, and other purposes such as for autonomous only vehicle lanes to optimize traffic flow. The inter-vehicle spacing may vary depending on road conditions such as dry road, wet road, icy road, snowy road, asphalt road, cement road, dirt road or gravel road.

In FIG. 6A, in an embodiment, illustrates inter-vehicle spacing with dry road conditions. Individual vehicles determine stopping distance based on detected parameters, such as vehicle velocity, detected road and/or weather conditions, inherent braking capability, vehicle internal status (e.g., tire pressure), vehicle driving status such as autonomous or non-autonomous driving mode. BSM and/or CAM messaging, or other inter-vehicle messaging is used to advertise stopping distance capability to nearby cars. Inter-vehicle and/or platoon spacing incorporates advertised stopping distance of each vehicle, either based on car to car V2X communication and coordination, and/or with the assistance of a platooning server accessed via wireless network connections. As illustrated, larger vehicles, such as trucks, which have longer stopping distances, will maintain a larger intervehicle distance in front of them.

In FIG. 6B, in an embodiment, illustrates inter-vehicle spacing in wet road conditions. Vehicle-detected road condition (water) results in advertising increased stopping distance in BSM and/or CAM messaging. Inter-vehicle spacing and/or platoon spacing incorporates larger advertised stopping distance due to detected road conditions. It is understood that other inclement conditions that result in longer stopping distances, such as greasy or low traction roads, icy roads, snow-covered roads, and dirt or gravel roads will similarly result in advertising increased stopping distance in BSM and/or CAM messaging.

Figure 7A:
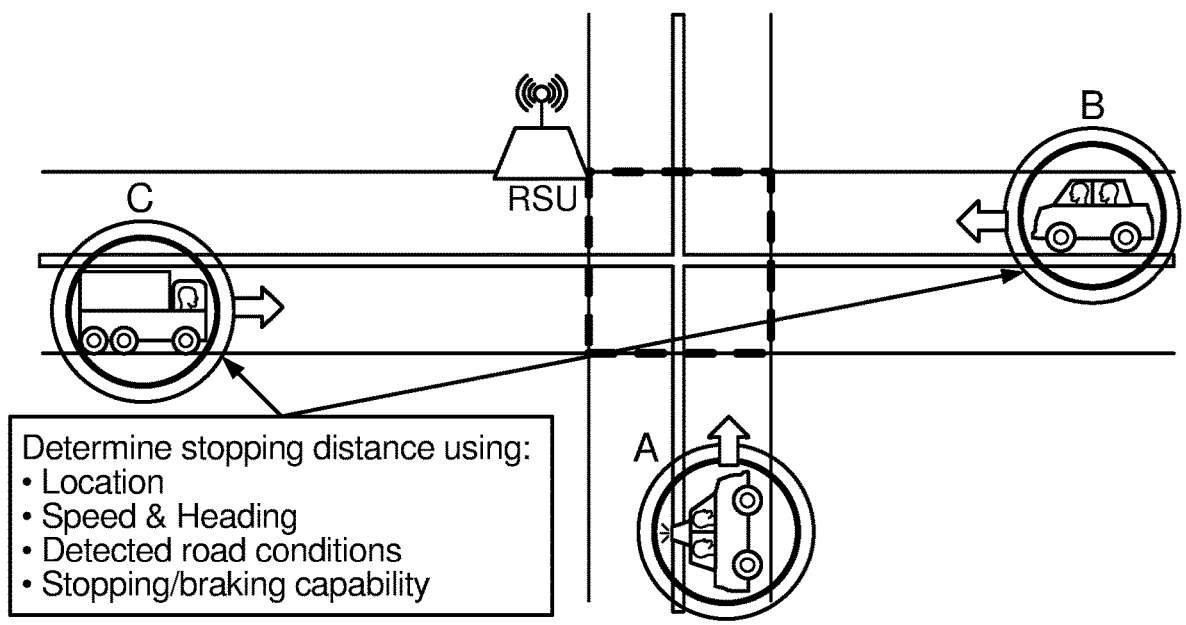
FIG. 7a and FIG. 7b illustrate an exemplary procedure for vehicle determining stopping distance at an intersection and advertising maneuvers.
Figure 7B:
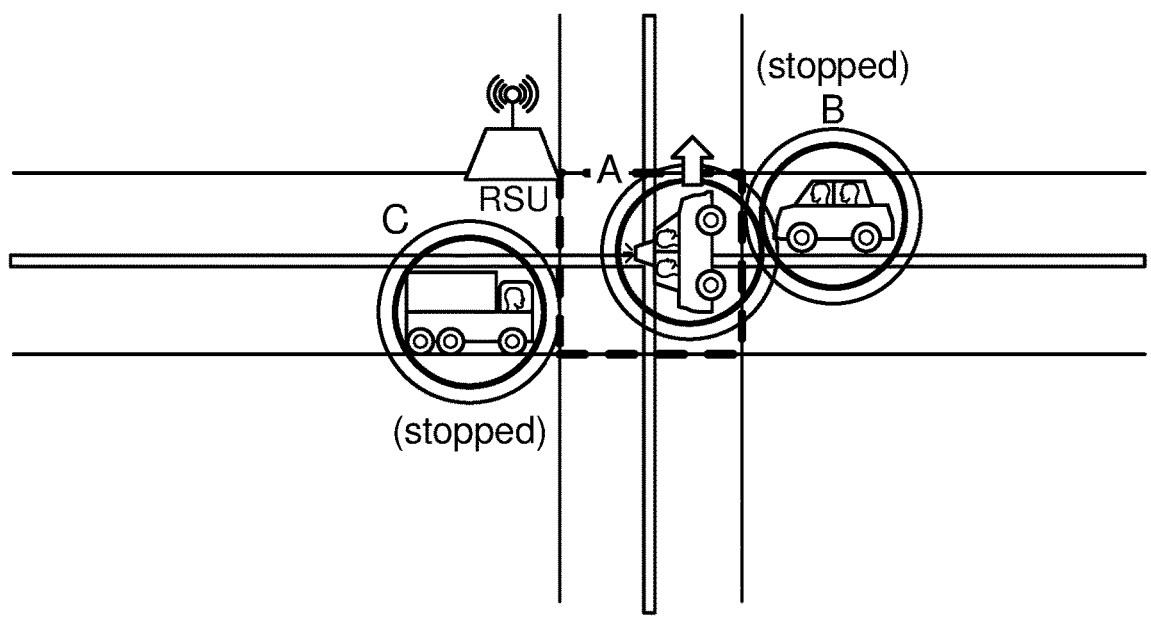

As shown in FIGS. 7A and 7B, in an embodiment, vehicles 1000, for example, a car, truck, motorcycle and/or other motorized vehicle, may advertise stopping distance, which may be utilized, in an embodiment, to determine that non-emergency vehicles are able to and will stop at an intersection for a passing emergency vehicle.

In FIG. 7A, in an embodiment, illustrates vehicles approaching an intersection, with an emergency vehicle approaching the same intersection. As it approaches the intersection, emergency vehicle A broadcasts its desired maneuver, to proceed through the intersection. Non-emergency vehicle B and vehicle C each determine their respective stopping distance using their respective location & distance to intersection, speed & heading, detected road conditions, and/or stopping/braking capability or combination thereof, which may, in an embodiment, be utilized to determine if each vehicle can stop prior to the intersection. If present, infrastructure entities (e.g., roadside units (RSU)) may augment vehicles' knowledge of environment (weather, road conditions, vulnerable road users (VRUs), etc.). In an embodiment, the calculated stopping distance may be utilized to update the BSM and/or CAM messaging data element value for stopping distance.

In FIG. 7B, in an embodiment, illustrates vehicle B and vehicle C stopping at the intersection, to allow emergency vehicle A to pass through the intersection. In an embodiment, emergency vehicle A negotiates with vehicle B, and vehicle C. Vehicle B, and vehicle C transmit Stopping Distance and confirm ability to stop at the intersection. Vehicle B and vehicle C stop at the intersection. Then, vehicle A proceeds through the intersection. In an embodiment, if either vehicle B or vehicle C could not stop, vehicle A, would either stop or adjust velocity/speed accordingly to avoid the vehicle that could not stop, as illustrated in FIGS. 8A and 8B.

Figure 8A:
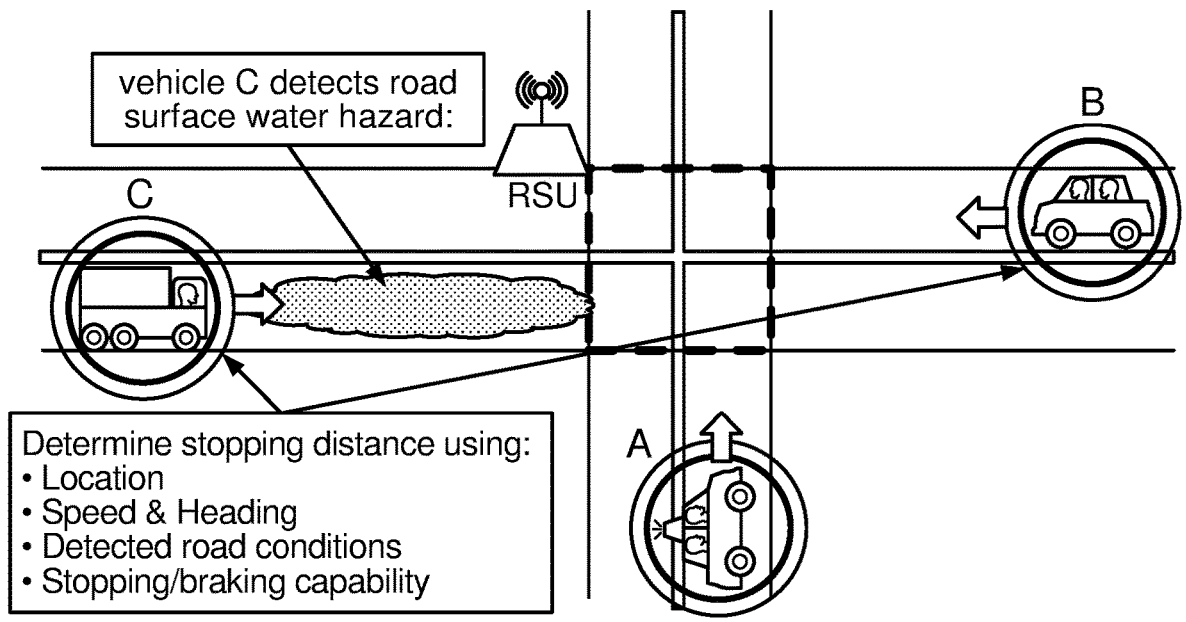
FIG. 8a and FIG. 8b illustrate an exemplary procedure for determining vehicle behavior at an intersection in the presence of environmental conditions such as a surface water hazard.
Figure 8B:
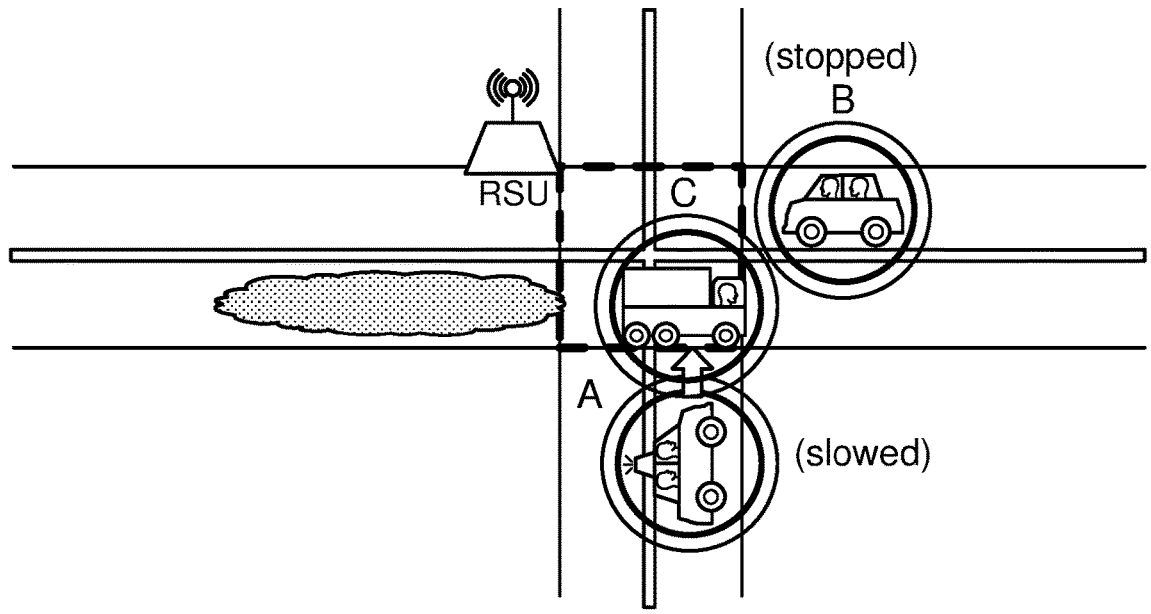

As shown in FIGS. 8A and 8B, in an embodiment, vehicles 1000, for example, a car, truck, motorcycle and/or other motorized vehicle, may advertise stopping distance, which may be utilized, in an embodiment, to determine that non-emergency vehicles are or are not able to stop at an intersection for a passing emergency vehicle.

In FIG. 8A, in an embodiment, illustrates vehicles approaching an intersection, with an emergency vehicle approaching the same intersection. In this example, however, vehicle C detects a road surface water hazard (or other road surface conditions that may impact its ability to stop such as snow, ice, oil, dirt, gravel, etc.) and may adjust its advertised stopping distance by updating its BSM and/or CAM messaging data element value for stopping distance. As it approaches the intersection, emergency vehicle A broadcasts its desired maneuver, to proceed through the intersection. Non-emergency vehicle B and vehicle C each determine their respective stopping distance using their respective location & distance to intersection, speed & heading, detected road conditions (vehicle C detects surface water), and/or stopping/braking capability or combination thereof, which may, in an embodiment, be utilized to determine if each vehicle can stop prior to the intersection. If present, infrastructure entities (e.g., roadside units (RSU)) may augment vehicles' knowledge of environment (weather, road conditions, vulnerable road users (VRUs), etc.). In an embodiment, the calculated stopping distance may be utilized to update the BSM and/or CAM messaging data element value for stopping distance.

In FIG. 8B, in an embodiment, illustrates vehicle B stopping at the intersection and vehicle C proceeding through intersection, due to a determination that it cannot stop prior to the intersection to allow emergency vehicle A to pass through the intersection. In an embodiment, emergency vehicle A negotiates with vehicle B, and vehicle C. Vehicle B determines it will be able to stop in time and transmits its stopping distance. Vehicle C determines it cannot stop in time because of a surface water hazard. Emergency vehicle A negotiates with vehicle B and vehicle C. Vehicle B stops at the intersection while vehicle C proceeds through the intersection. Vehicle A slows (or stops if necessary) to allow vehicle C to pass through the intersection before proceeding.

In an embodiment, new V2X data element (DE) types may be added to car to car messaging. In an embodiment, these new V2X Data element (DE) Types may include autonomous driver and non-autonomous driver, stopping distance, turning radius at speed, and/or acceleration at speed or various combination thereof. In an embodiment, dynamic adjustment of data element values using a functional block may incorporate vehicle static conditions (e.g., tire pressure, brake pad wear, trailer or load), vehicle dynamic conditions (e.g., speed, heading, acceleration, yaw), vehicle inherent capabilities (e.g., braking, acceleration, turning radius), including externally-sensed road conditions. In an embodiment, the new V2X data element types and dynamic adjustment of data element values may be implemented in V2X-messaging in standards such as SAE and ETSI-ITS.

Figure 9:
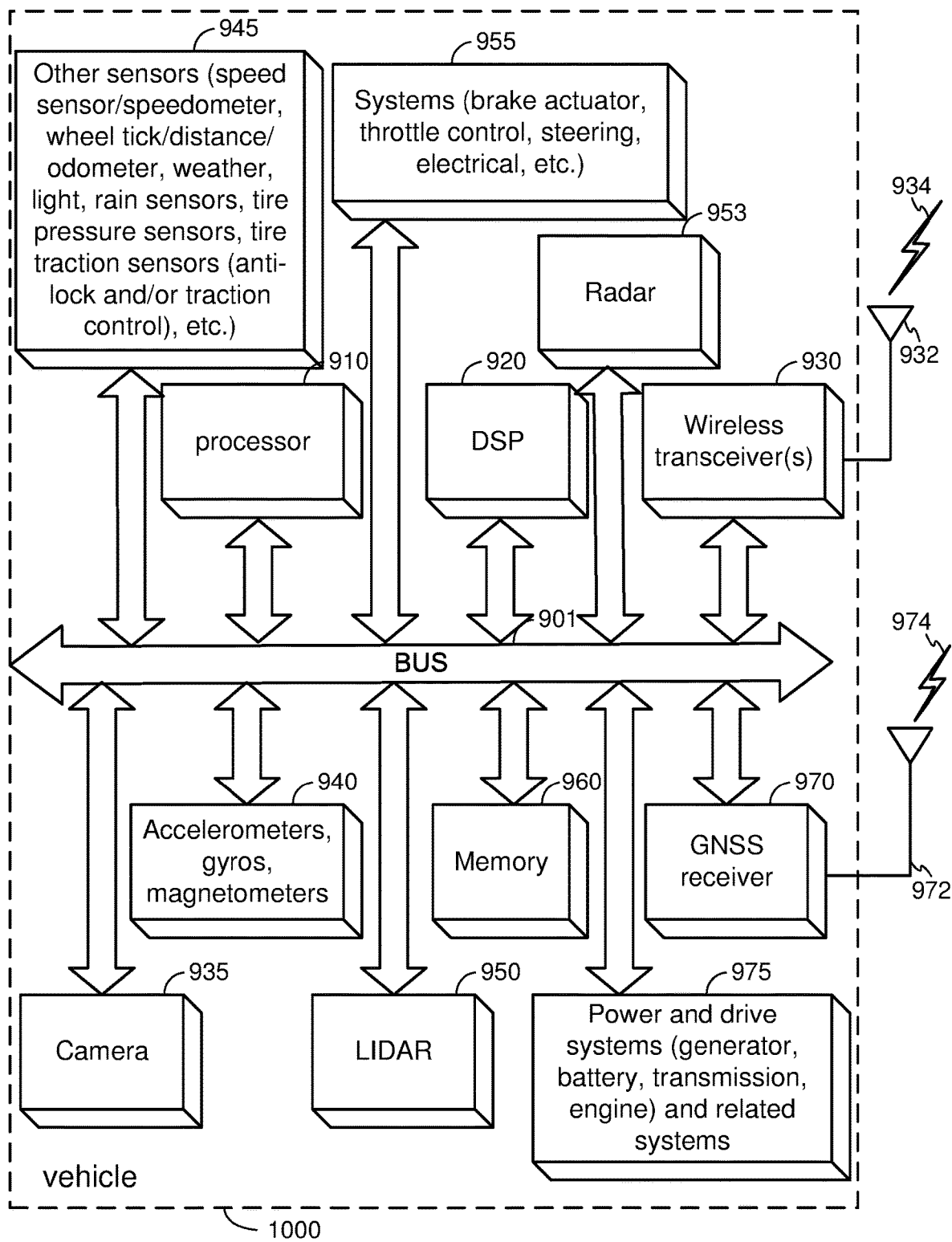
FIG. 9 illustrates an exemplary system level embodiment for an ego vehicle.

As shown in FIG. 9, in an embodiment, vehicle 1000, for example, a car, truck, motorcycle and/or other motorized vehicle, may transmit radio signals to, and receive radio signals from, other vehicles 1000, for example, via V2X car to car communication, and/or from a wireless communication network. In one example, vehicle 1000 may communicate, via wide area network (WAN) wireless transceiver 930 and wireless antenna 932 with other vehicles and/or wireless communication network by transmitting wireless signals to, or receiving wireless signals from a remote wireless transceiver 930 which may comprise another vehicle 1000', a wireless base transceiver subsystem (BTS), a Node B or an evolved NodeB (eNodeB) or a next generation NodeB (gNodeB) over wireless communication link. Similarly, vehicle 1000 may transmit wireless signals to, or receive wireless signals from a local transceiver over a wireless communication link, for example, by using a wireless local area network (WLAN) and/or a personal area network (PAN) wireless transceiver 930 and wireless antenna 932. In an embodiment, wireless transceiver(s) 930 may comprise various combinations of WAN, WLAN and/or PAN transceivers. In an embodiment, a local transceiver may also be a Bluetooth transceiver, a ZigBee transceiver, or other PAN transceiver. In an embodiment, vehicle 1000 may transmit wireless signals to, or receive wireless signals from a wireless transceiver 930 on a vehicle 1000 over wireless communication link 934. A local transceiver, a WAN wireless transceiver and/or a mobile wireless transceiver may comprise a WAN transceiver, an access point (AP), femtocell, Home Base Station, small cell base station, Home Node B (HNB), Home eNodeB (HeNB) or next generation NodeB (gNodeB) and may provide access to a wireless local area network (WLAN, e.g., IEEE 802.11 network), a wireless personal area network (PAN, e.g., Bluetooth® network) or a cellular network (e.g. an LTE network or other wireless wide area network such as those discussed in the next paragraph). Of course, it should be understood that these are merely examples of networks that may communicate with a vehicle over a wireless link, and claimed subject matter is not limited in this respect. It is also understood that wireless transceiver 930 may be located on various vehicles 1000 boats, ferries, cars, buses, drone and various transport vehicles. In an embodiment, the vehicle 1000 may be utilized for passenger transport, package transport or other purposes. In an embodiment, GNSS signals 974 from GNSS Satellites are utilized by vehicle 1000 for location determination. In an embodiment, signals 934 from WAN transceiver(s), WLAN and/or PAN local transceivers are used for location determination, alone or in combination with GNSS signals 974.

Examples of network technologies that may support wireless transceivers 930 are Global System for Mobile Communications (GSM), Code Division Multiple Access (CDMA), Wideband CDMA (WCDMA), Long Term Evolution LTE), $5^{th}$ Generation Wireless (5G) or New Radio Access Technology (NR), High Rate Packet Data (HRPD), and V2X car to car communication. V2X may be defined in various standards such as SAE, ETS-ITS standards. GSM, WCDMA and LTE are technologies defined by 3GPP. CDMA and HRPD are technologies defined by the $3^{rd}$ Generation Partnership Project 2 (3GPP2). WCDMA is also part of the Universal Mobile Telecommunications System (UMTS) and may be supported by an HNB.

Wireless transceivers 930 may communicate with communications networks via WAN wireless base stations which may comprise deployments of equipment providing subscriber access to a wireless telecommunication network for a service (e.g., under a service contract). Here, a WAN wireless base station may perform functions of a wide area network (WAN) or cell base station in servicing subscriber devices within a cell determined based, at least in part, on a range at which the WAN wireless base station is capable of providing access service. Examples of WAN base stations include GSM™, WCDMA™, LTE™, CDMA™, HRPD™, WiFi™, BT, WiMax™, and/or $5^{th}$ Generation (5G) base stations. In an embodiment, further wireless base stations may comprise a wireless LAN (WLAN) and/or PAN transceiver.

In an embodiment, vehicle 1000 may contain multiple wireless transceivers including WAN, WLAN and/or PAN transceivers. In an embodiment, radio technologies that may support wireless communication link or links further comprise Wireless local area network (e.g., WLAN, e.g., IEEE 802.11), Bluetooth™ (BT) and/or ZigBee™.

In an embodiment, vehicle 1000 may contain one or more cameras 935. In an embodiment, the camera may comprise a camera sensor and mounting assembly. Different mounting assemblies may be used for different cameras on vehicle 1000. For example, front facing cameras may be mounted in the front bumper, in the stem of the rear-view mirror assembly or in other front facing areas of the vehicle 1000. Rear facing cameras may be mounted in the rear bumper/fender, on the rear windshield, on the trunk or other rear facing areas of the vehicle. The side facing mirrors may be mounted on the side of the vehicle such as being integrated into the mirror assembly or door assemblies. The cameras may provide object detection and distance estimation, particularly for objects of known size and/or shape (e.g., a stop sign and a license plate both have standardized size and shape) and may also provide information regarding rotational motion relative to the axis of the vehicle such as during a turn. When used in concert with the other sensors, the cameras may both be calibrated through the use of other systems such as through the use of LIDAR, wheel tick/distance sensors, and/or GNSS to verify distance traveled and angular orientation. The cameras may similarly be used to verify and calibrate the other systems to verify that distance measurements are correct, for example by calibrating against known distances between known objects (landmarks, roadside markers, road mile markers, etc.) and also to verify that object detection is performed accurately such that objects are accordingly mapped to the correct locations relative to the car by LIDAR and other system. Similarly, when combined with, for example, accelerometers, impact time with road hazards, may be estimated (elapsed time before hitting a pot hole for example) which may be verified against actual time of impact and/or verified against stopping models (for example, compared against the estimated stopping distance if attempting to stop before hitting an object) and/or maneuvering models (verifying whether current estimates for turning radius at current speed and/or a measure of maneuverability at current speed are accurate in the current conditions and modifying accordingly to update estimated parameters based on camera and other sensor measurements).

Accelerometers, gyros and magnetometers 940, in an embodiment, may be utilized to provide and/or verify motion and directional information. Accelerometers and gyros may be utilized to monitor wheel and drive train performance. Accelerometers, in an embodiment, may also be utilized to verify actual time of impact with road hazards such as pot holes relative to predicted times based on existing stopping and acceleration models as well as steering models. Gyros and magnetometers may, in an embodiment, be utilized to measure rotational status of the vehicle as well as orientation relative to magnetic north, respectively, and to measure and calibrate estimates and/or models for turning radius at current speed and/or a measure of maneuverability at current speed, particularly when used in concert with measurements from other external and internal sensors such as other sensors 945 such as speed sensors, wheel tick sensors, and/or odometer measurements.

Light detection and ranging (LIDAR) uses pulsed laser light to measure ranges to objects. While cameras may be used for object detection, LIDAR provides a means, to detect the distances of the objects with more certainty, especially in regard to objects of unknown size and shape. LIDAR measurements may also be used to estimate stopping distance at different speeds and under varying conditions by providing accurate distance measurements and delta distance measurements, which may be, in an embodiment, measured during braking and/or acceleration to determine actual stopping distances and/or acceleration distances which may be utilized directly or may, perhaps more likely, utilized to calibrate predictive stopping, turning and acceleration models. For example, measurements taken of stopping distance and, perhaps also of stopping profile versus time and brake pressure, done at 25 miles per hour may be used as input to vary the estimate for stopping performance at other speeds, such as at 60 mph. These estimates could be done as estimates based on sensor measurements or as estimated variances off of or applied to a profile determined under reference conditions. Similar estimates may be done for acceleration and maneuverability to either tune a particular model or apply variances to a model to estimate performance under given road, environment and vehicular conditions.

Memory 960 may be utilized with processor 910 and/or DSP 920. which may comprise FLASH, RAM, ROM, disc drive, or FLASH card or other memory devices or various combinations thereof. In an embodiment, memory 960 may contain instructions to implement various methods described throughout this description. In an embodiment, memory may contain instructions for estimating stopping distance, maneuverability and acceleration parameters. In an embodiment, memory may contain instructions for operating and calibrating sensors, and for receiving map, weather, vehicular (both vehicle 1000 and surrounding vehicles) and other data, and utilizing various internal and external sensor measurements and received data and measurements to determine performance parameters such as stopping distance, acceleration and turning radius at current speed and/or maneuverability at current speed and to determine operational parameters such as inter-car distance, turn initiation/timing and performance, and initiation/timing of merging operations into traffic.

In an embodiment, power and drive systems (generator, battery, transmission, engine) and related systems 975 and systems (brake, actuator, throttle control, steering, and electrical) 955 may be controlled by the processor(s) and/or hardware or software or by an operator of the vehicle or by some combination thereof. The systems (brake, actuator, throttle control, steering, electrical, etc.) 955 and power and drive or other systems 975 may be utilized in conjunction with performance parameters and operational parameters, to enable autonomously (and manually, relative to alerts and emergency overrides/braking/stopping) driving and operating a vehicle 1000 safely and accurately, such as to safely, effectively and efficiently merge into traffic, stop, accelerate and otherwise operate the vehicle 1000.

A global navigation satellite system (GNSS) receiver may be utilized to determine position relative to the earth (absolute position) and, when used with other information such as measurements from other objects and/or mapping data, to determine position relative to other objects such as relative to other cars and/or relative to the road surface.

The GNSS receiver 970 may be used to determine location which may be utilized to calibrate other sensors, when appropriate, such as for determining distance between two time points in clear sky conditions and using the distance data to calibrate other sensors such as the odometer and/or LIDAR. GNSS doppler measurements may also be utilized to determine linear motion and rotational motion of the vehicle, which may be utilized in conjunction with gyro and/or magnetometer and other sensor systems to maintain calibration of those systems based upon measured location data.

Radio detection and ranging, Radar 953, uses transmitted radio waves that are reflected off of objects. The reflected radio waves are analyzed, based on the time taken for reflections to arrive and other signal characteristics of the reflected waves to determine the location of nearby objects. Radar 953 may be utilized to detect the location of nearby cars, roadside objects (signs, other vehicles, pedestrians, etc.) and will generally enable detection of objects even if there is obscuring weather such as snow, rail or hail. Thus, radar 953 may be used to complement LIDAR 950 systems and camera 935 systems in providing ranging information to other objects by providing ranging and distance measurements and information when visual-based systems typically fail. Furthermore, radar 953 may be utilized to calibrate and/or sanity check other systems such as LIDAR 955 and camera 935. Ranging measurements from radar 953 may be utilized to determine/measure stopping distance at current speed, acceleration, maneuverability at current speed and/or turning radius at current speed and/or a measure of maneuverability at current speed.

Figure 10:
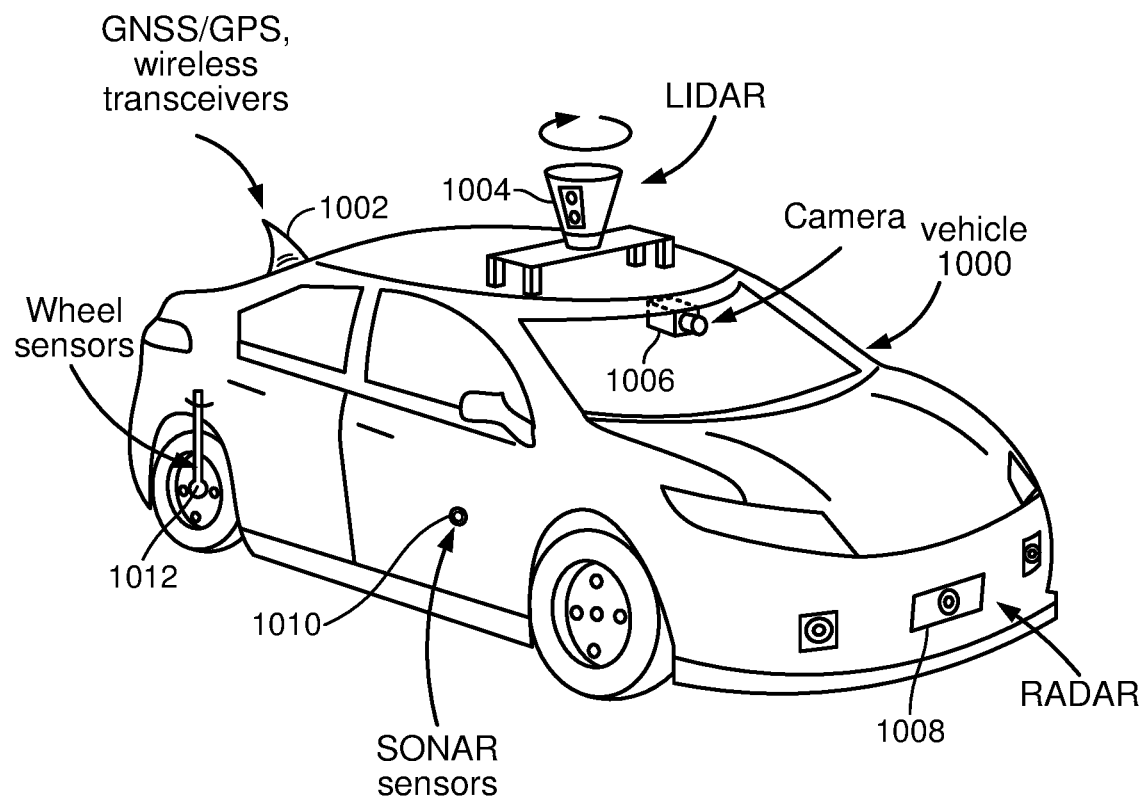
FIG. 10 illustrates an exemplary physical embodiment for an ego vehicle.

As shown in FIG. 10, in an embodiment, vehicle 1000 may have camera(s) such as rear-view mirror-mounted camera 1006, front fender-mounted camera (not shown), side mirror-mounted camera (not shown) and a rear camera (not shown, but typically on the trunk, hatch or rear bumper). Vehicle 1000 may also have LIDAR 1004, for detecting objects and measuring distances to those objects; LIDAR 1004 is often roof-mounted, however, if there are multiple LIDAR units, they may be oriented around the front, rear and sides of the vehicle. Vehicle 1000 may have other various location-related systems such as a GNSS receiver (typically located in the shark fin unit on the rear of the roof), various wireless transceivers (such as WAN, WLAN, V2X; typically, but not necessarily, located in the shark fin) 1002, radar 1008 (typically in the front bumper), and SONAR 1010 (typically located on both sides of the vehicle, if present). Various wheel 1012 and drive train sensors may also be present, such as tire pressure sensors, accelerometers, gyros, and wheel rotation detection and/or counters. It is realized that this list is not intended to be limiting and that FIG. 10 is intended to provide typical location of various sensors in an embodiment of vehicle 1000. In addition, further detail in regard to particular sensors is described relative to FIG. 9.

Figure 11:
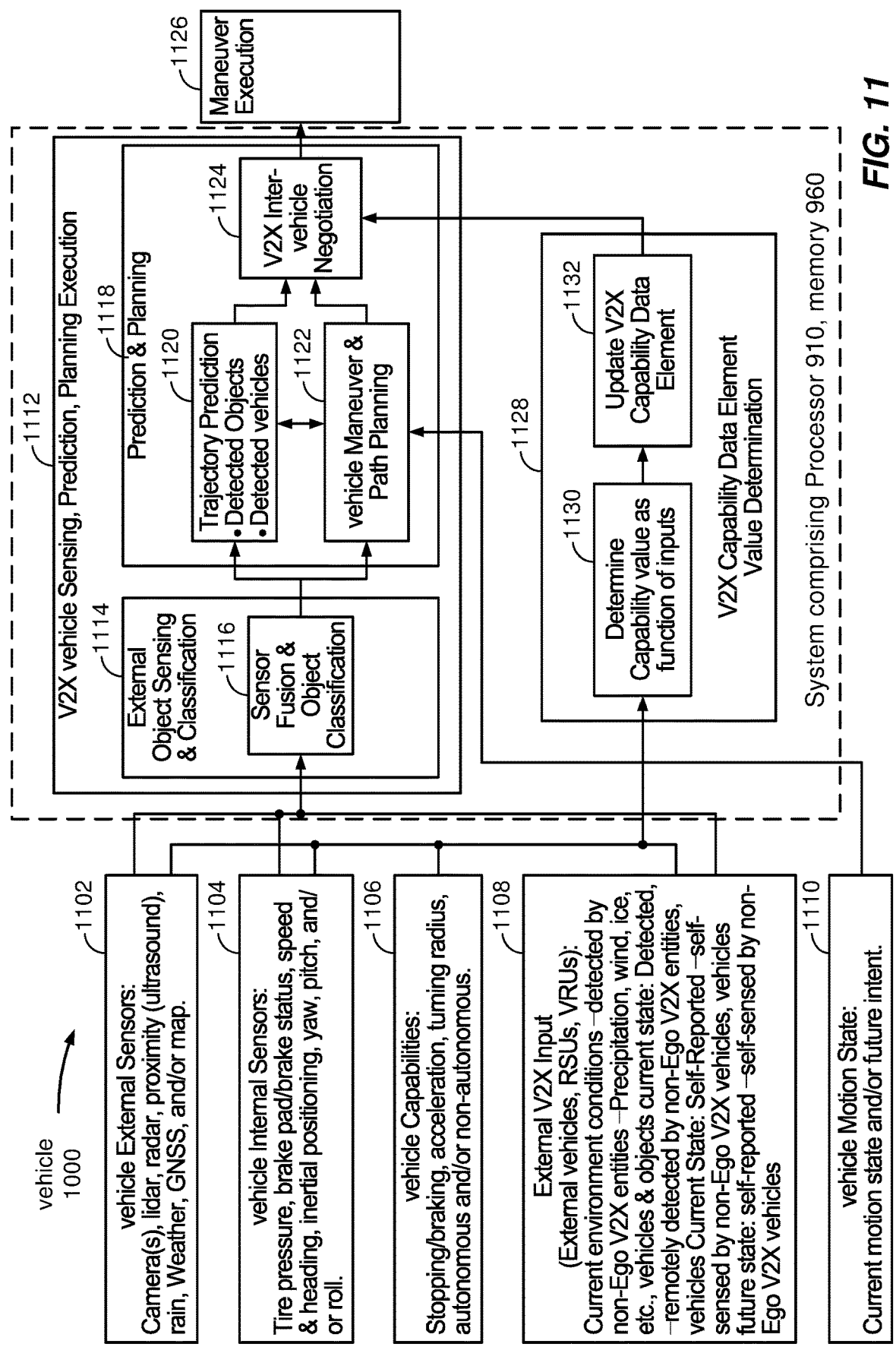
FIG. 11 illustrates an exemplary system level embodiment for an ego vehicle performing V2X Ego Vehicle sensing, prediction, planning and execution.

As shown in FIG. 11, in an embodiment, vehicle 1000 may receive vehicle and environment information from vehicle external sensors 1102, vehicle internal sensors 1104, vehicle capabilities 1106, external V2X input 1108 from the environment, from other vehicles, from system servers and/or from vehicle motion state 1110 (describing current and/or future motion states). The received vehicle and environment information may, in an embodiment, be processed in one or more processor(s) 910, DSP(s) 920 and memory, connected and configured to provide external object sensing and classification, prediction and planning, and maneuver execution, as well as to determine and update V2X capability data element values and to transmit, via one or more wireless transceivers 930, such as via a V2X transceiver, V2X messaging including the determined data elements. The messaging and data elements may be sent and received via various means, protocols and standards, such as via SAE or ETSI SV2X messages and data elements or other wireless protocols supported by wireless transceiver(s) 930.

V2X capability data element value determination block 1128 comprises blocks 1130 for determining capability value as a function of inputs and 1132 for updating V2X capability data elements and forwarding V2X capability data elements to block 1124 V2X Inter-vehicle negotiation, which may communicate various V2X data elements and V2X vehicle requests and communication via wireless transceiver(s) 930. Block 1130, which determines capability value as function of inputs, receives inputs from blocks 1102, 1104, 1106, 1108 and 1110, in an embodiment, comprising internal and external sensors, capabilities, external V2X inputs and/or vehicle motion state. For example, in an embodiment, the inputs may comprise vehicle external sensors 1102, vehicle internal sensors 1104, vehicle capabilities 1106, eternal V2X input(s) 1108, and/or vehicle motion state 1110. Based upon and/or as a function of the above described inputs and other vehicle-related input sources such as servers 1255, 1245, 1260, 1250, and 1240 providing, for example, vehicle information, routing, location assistance, map data and environmental data and provide input on and/or complement and/or are used in conjunction with the other inputs, for example road location data, map data, driving condition data and other vehicle-related data inputs, the ego vehicle determines capability value(s), the vehicle determines capability value(s) as a function of inputs 1130. The capability values provided by block 1130 are determined as a function of inputs from blocks 1102, 1104, 1106, 1108 and/or 1110, and are provided to update V2X capability data element(s) in block 1132, where the capability data elements are determined and formatted for V2X intervehicle messaging. Blocks 1130 and 1132 may be implemented using various dedicated or generalized hardware and software, such as using processor 910 and/or DSP 920 and memory 960 or, in an embodiment, in specialized hardware blocks such as dedicated sensor processing and/or vehicle messaging cores. In an embodiment, blocks 1102, 1104, 1106, 1108 and 1110 may have dedicated processing cores or may share processing with blocks 1130 and 1132.

Vehicle external sensors 1102 may comprise, in some embodiments, cameras 1006, LIDAR 1004, RADAR 1008, proximity sensors, rain sensors, weather sensors, GNSS receivers 1002 and received data used with the sensors such as map data, environmental data, location, route and/or other vehicle information such as may be received from other vehicles, devices and servers such as, in an embodiment, map server 1250, route server 1245, vehicle information server 1255, environmental data server 1240, location server 1260, and/or from associated devices such as mobile device 1200, which may be present in or near to the vehicle such as vehicle A 1280. It is understood that there may be one or a plurality of cameras. In an embodiment, a camera may be front facing, side facing, rear facing or adjustable in view (such as a rotatable camera). In an embodiment, there may be multiple cameras 1006 facing the same plane. For example, the cameras 1006 may comprise two front facing cameras, one focused on lower objects and/or a lower point of view (such as bumper mounted) for parking purposes and one focusing on a higher point of view such as to track traffic, other vehicles, pedestrians and more distant objects. In an embodiment, various views may be stitched and/or may be correlated against other inputs such as V2X input from other vehicles to optimize tracking of other vehicles and external entities and objects and/or to calibrate sensor systems against each other. LIDAR 1004 may be roof mounted and rotating, or may be focused on a particular point of view (such as front facing, rear facing, side facing). LIDAR 1004 may be solid state or mechanical. Proximity sensors may be ultrasonic, radar-based, light-based (such as based on infrared range finding), and/or capacitive (surface touch oriented or capacitive detection of metallic bodies). Rain and Weather sensors may include various sensing capabilities and technologies such as barometric pressure sensors, moisture detectors, rain sensors, and/or light sensors and/or may leverage other pre-existing sensor systems. GNSS receivers may be roof-mounted, such as in the fin antenna assembly at the rear of the roof of a car, hood or dash mounted or otherwise placed within the exterior or interior of the vehicle.

In an embodiment, vehicle internal sensors 1104 may comprise wheel sensors 1012 such as tire pressure sensors, brake pad sensors, brake status sensors, speedometers and other speed sensors, heading sensors and/or orientation sensors such as magnetometers and geomagnetic compasses, distance sensors such as odometers and wheel tic sensors, inertial sensors such as accelerometers and gyros as well as inertial positioning results using the above-mentioned sensors, and yaw, pitch and/or roll sensors as may be determined individually or as determined using other sensor systems such as accelerometers, gyros and/or tilt sensors.

Both vehicle internal sensors 1104 and vehicle external sensors 1102 may have shared or dedicated processing capability. For example, a sensor system or subsystem may have a sensor processing core or cores that determines, based on measurements and other inputs from accelerometers, gyros, magnetometers and/or other sensing systems, car status values such as yaw, pitch, roll, heading, speed, acceleration capability and/or distance, and/or stopping distance. The different sensing systems may communicate with each other to determine measurement values or send values to block 1130 to combine measurement values and determine capability value(s) as a function of inputs. The car status values derived from measurements from internal and external sensors may be further combined with car status values and/or measurements from other sensor systems using a general or applications processor. For example, blocks 1130, 1132 and/or 1124 or may be implemented on a dedicated or a centralized processor to determine data element values for V2X messaging which may be sent utilizing wireless transceivers 930 or via other communication transceivers. In an embodiment, the sensors may be segregated into related systems, for example, LIDAR, RADAR, motion, wheel systems, etc., operated by dedicated core processing for raw results to output car status values from each core that are combined and interpreted to derive combined car status values, including capability data elements and status data elements, that may be used to control or otherwise affect car operation and/or as messaging steps shared with other vehicles and/or systems via V2X or other messaging capabilities. These messaging capabilities may be based on, in an embodiment, a variety of wireless-related, light-related or other communication standards, such as those supported by wireless transceiver(s) 930 and antenna(s) 932.

In an embodiment, vehicle capabilities 1106 may comprise performance estimates for stopping, braking, acceleration, and turning radius, and autonomous and/or non-autonomous status and/or capability or capabilities. In an embodiment, the capability estimates may be formula-based or may be based upon stored estimates, which may be loaded, in an embodiment, into memory. In an embodiment, stored estimates may be based on empirical performance numbers, either for a specific vehicle, or for averages across one or more vehicles, and/or one or more models for a given performance figure. Where performance estimates for multiple models are averaged or otherwise combined, they may be chose based on similar or common features. For example, vehicles with a similar or the same weight and the same or similar drive train may share performance estimates for drive-performance related estimates such as braking/stopping distance, turning radius, and acceleration performance. Vehicle performance estimates may also be obtained, for example, using external V2X input(s) 1108, over a wireless network from vehicular data servers on the network. This is particularly helpful to obtain information for vehicles that are not wireless capable and cannot provide vehicular information directly. In an embodiment, vehicle capabilities 1106 may also be influenced by car component status such as tire wear, tire brand capabilities, brake pad wear, brake brand and capabilities, and engine status. In an embodiment, vehicle capabilities 1106 may also be influenced by overall car status such as speed, heading and by external factors such as road surface, road conditions (wet, dry, slipperiness/traction), weather (windy, rainy, snowing, black ice, slick roads, etc.). In many cases, wear, or other system degradation, and external factors such as weather, road surface, road conditions, etc. may be utilized to reduce, validate or improve performance estimates when determining capability value(s) as a function of inputs 1130. Similarly, in an embodiment, brand related performance such as the installation of tires with better traction such as snow tires for use in a snowy environment in Winter may be used to alter or improve performance or to temper degradation of performance. In an embodiment, multiple factors such as those mentioned above may be combined to estimate performance and to determine capability value as a function of inputs 1130. In some embodiments, actual measured vehicle performance such as measuring vehicular stopping distance and/or acceleration time per distance, may be measured and/or estimated based on actual vehicular driving-related performance. In an embodiment, more recently measured performance may be weighted more heavily or given preference over older measurements, if measurements are inconsistent. Similarly, in an embodiment, measurements taken during similar conditions such as in the same type of weather or on the same type of road surface as is currently detected by the ego vehicle, such as via vehicle external sensors 1102 and/or vehicle internal sensors 1104, may be weighted more heavily and/or given preference in determining capability value(s) as a function of inputs 1130.

The determined capability value(s), as determined as a function of inputs in block 1130, are provided to block 1132, update V2X capability data element(s), which are sent via block 1124, V2X inter-vehicle negotiation, as may be implemented via various means, such as via communication over wireless transceiver 930 and utilizing various V2X messaging standards, such as via SAE or ETSI SV2X messages and data elements. In an embodiment, one or more processor(s) 910 and/or DSP(s) 920 and memory 960, and the systems described herein, or means therefore, may be connected and configured to perform the processes described in regard to FIG. 11 and throughout this specification. Capability values as a function of inputs 1130 may be modified into different data formats and/or units and/or may require other conversion or combination of one or more capability values prior to being utilized as V2X capability data elements. Adjusting data formats and/or units and/or conversion or combination of one or more capability values may be performed, in an embodiment, in processor(s) 910 and update V2X capability data element block 1132 or elsewhere in the architecture.

V2X vehicle sensing, prediction, planning execution 1112 handles the receipt and processing of information from blocks 1102, 1104, 1106, 1108 and 1110, via external object sensing and classification block 1114, in part utilizing sensor fusion and object classification block 1116 to correlate, corroborate and/or combine data from input blocks 1102, 1104, 1106, 1108 and 1110. Block 1114 external object sensing and classification determines objects present, determines type of objects (car, truck, bicycle, motorcycle, pedestrian, animal, etc.) and/or object status relative to the ego vehicle, such as movement status, proximity, heading relative to the ego vehicle, size, threat level, and vulnerability priority (a pedestrian would have a higher vulnerability priority versus road litter, for example). This output from block 1114 may be provided to prediction and planning block 1118, which determines detected objects and vehicles and their associated trajectory via block 1120 and determines vehicle maneuver and path planning in block 1122, the outputs of which are utilized in block 1126 vehicle maneuver execution either directly or via V2X inter-vehicle negotiation block 1124, which would integrate and account for maneuver planning, location and status received from other vehicles. V2X inter-vehicle negotiation accounts for the status of neighboring vehicles and enables negotiation and coordination between neighboring or otherwise impacted vehicles based on vehicle priority, vehicle capabilities (such as the ability to stop, decelerate or accelerate to avoid collision), and, in some embodiments, various conditions such as weather conditions (rainy, foggy, snow, wind), road conditions (dry, wet, icy, slippery). These include, for example, negotiation for timing and order to pass through an intersection between cars approaching the intersection, negotiation for lane change between adjacent cars, negotiation for parking spaces, negotiation for access to directional travel on a single lane road or to pass another vehicle. Inter-vehicle negotiation may also include time-based and/or distance-based factors such as appointment time, destination distance and estimated route time to reach destination, and, in some embodiments, type of appointment and importance of the appointment.

Figure 12:
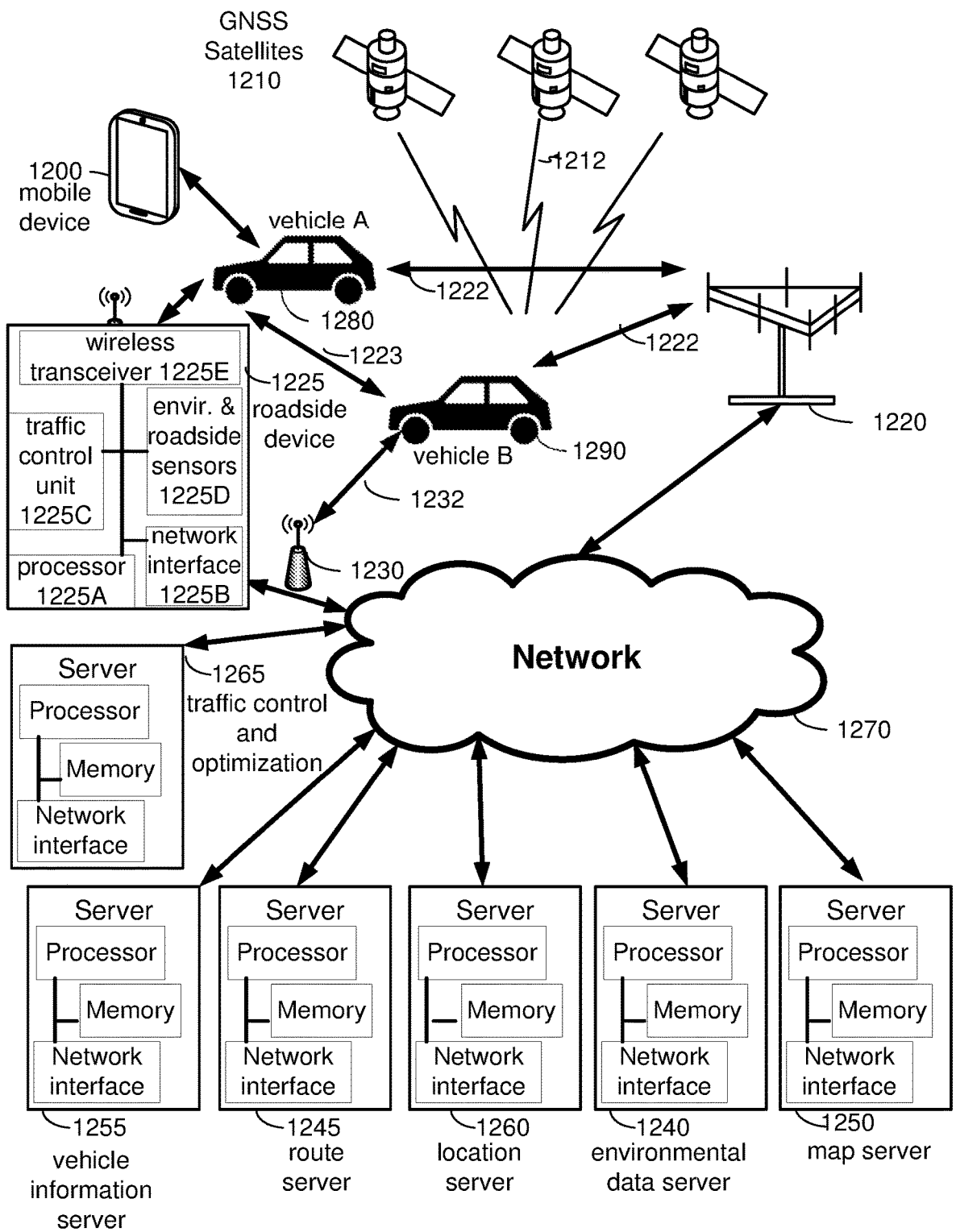
FIG. 12 illustrates an exemplary system level embodiment for an ego vehicle performing V2X Ego Vehicle sensing, prediction, planning and execution using capability data elements.

As highlighted in FIG. 12, the ego vehicle may communicate over various networks and with various devices and servers. In an embodiment, V2X vehicle A 1280 may communicate, using V2X or other wireless or communication transceiver over link 1223, with V2X or otherwise communication-transceiver-enabled vehicle B 1290, for example, in an embodiment to perform inter-vehicle negotiation for lane changes or for passage through an intersection, and to exchange V2X capability data elements such as vehicle status, location and abilities, measurement data, and/or calculated status, and to exchange other V2X vehicle status steps not covered in the V2X capability data elements. In an embodiment, vehicle A may also communicate with vehicle B through a network, for example, via base station 1220 and/or access point 1230, or via a communication-enabled roadside unit (RSU) 1225, any of which may relay communication, information and/or convert protocols for use by other vehicles, such as vehicle B, particularly in an embodiment where vehicle B is not capable of communicating directly with vehicle A 1280 in a common protocol. In an embodiment, vehicle A 1280 may also communicate with roadside unit(s) 1225 such as, in various embodiments, various roadside beacons, traffic and/or vehicular monitors, traffic control devices, and location beacons.

In an embodiment, roadside unit (RSU) 1225 may have a processor 1225A configured to operate wireless transceiver 1225E to send and receive wireless messages, for example, Basic Safety Messages (BSM) or Cooperative Awareness Messages (CAM) or other V2X messages to/from vehicle A 1280 and/or vehicle B 1290, from base station 1220 and/or access point 1230. For example, wireless transceiver 1225E may send and/or receive wireless messages in various protocols such as V2X communication with vehicles, and/or using various WAN, WLAN and/or PAN protocols to communicate over a wireless communication network. In an embodiment, wireless transceiver 1225E may communicate over a wireless communication network by transmitting or receiving wireless signals from a wireless base transceiver subsystem (BTS), a Node B or an evolved NodeB (eNodeB) or a next generation NodeB (gNodeB) over wireless communication link. In an embodiment, wireless transceiver(s) 1225E may comprise various combinations of WAN, WLAN and/or PAN transceivers. In an embodiment, a local transceiver may also be a Bluetooth transceiver, a ZigBee transceiver, or other PAN transceiver. A local transceiver, a WAN wireless transceiver and/or a mobile wireless transceiver may comprise a WAN transceiver, an access point (AP), femtocell, Home Base Station, small cell base station, Home Node B (HNB), Home eNodeB (HeNB) or next generation NodeB (gNodeB) and may provide access to a wireless local area network (WLAN, e.g., IEEE 802.11 network), a wireless personal area network (PAN, e.g., Bluetooth® network) or a cellular network (e.g. an LTE network or other wireless wide area network such as those discussed in the next paragraph). It should be understood that these are merely examples of networks that may communicate with a roadside unit (RSU) 1225 over a wireless link, and claimed subject matter is not limited in this respect.

RSU 1225 may receive location, status and capability information from vehicle A 1280 and/or vehicle B 1290 such as velocity, heading, location, stopping distance, priority or emergency status and other vehicle-related information and well as, in some embodiments, environmental information such as road surface information/status, weather status, and camera information. RSU 1225 may utilize received information, via wireless transceiver 1225E, from vehicle A 1280 and/or vehicle B 1290, environmental and roadside sensors 1225D, and network information and control messages from, for example, traffic control and optimization server 1265 to coordinate and direct traffic flow and to provide environmental, vehicular, safety and announcement messages to vehicle A 1280 and vehicle B 1290.

Processor 1225A may be configured to operate a network interface 1225B, in an embodiment, which may be connected via a backhaul to network 1270, and which may be used, in an embodiment, to communicate and coordinate with various centralized servers such as a centralized traffic control and optimization server 1265 that monitors and optimizes the flow of traffic in an area such as within a city or a section of a city or in a region. Network interface 1225B may also be utilized for remote access to roadside unit (RSU) 1225 for crowd sourcing of vehicle data, maintenance of the roadside unit (RSU) 1225, and/or coordination with other roadside units 1225 or other uses. Roadside unit (RSU) 1225 may have a processor 1225A configured to operate traffic control unit 1225C which may be configured to process data received from vehicles such as vehicle A 1280 and vehicle B 1290 such as location data, stopping distance data, road condition data, identification data and other information related to the status and location of nearby vehicles and environment. Roadside unit (RSU) 1225 may have a processor 1225A configured to obtain data from environmental and roadside sensors 1225D, which may include temperature, weather, camera, pressure sensors, road sensors (for car detection, for example), accident detection, movement detection, speed detection and other vehicle and environmental monitoring sensors.

In an embodiment, vehicle A 1280 may also communicate with mobile device 1200 using short range communication and personal networks such as Bluetooth, WiFi or Zigbee or via V2X or other vehicle-related communication protocols, for example, in an embodiment to access WAN and/or WiFi networks and/or, in an embodiment, to obtain sensor and/or location measurements from mobile device 1200. In an embodiment, vehicle A 1280 may communicate with mobile device 1200 using WAN related protocols through a WAN network, such as via WAN base station 1220 or using WiFi either directly peer to peer or via a WiFi access point. Vehicle A 1280 and/or vehicle B 1290 may communicate using various communication protocols. In an embodiment, vehicle A 1280 and/or vehicle B 1290 may support various and multiple modes of wireless communication such as, for example, using V2X, GSM, WCDMA, LTE, CDMA, HRPD, Wi-Fi, BT, WiMAX, Long Term Evolution (LTE), 5th Generation Wireless (5G) new radio access technology (NR) communication protocols, etc.

In an embodiment, vehicle A may communicate over WAN networks using WAN protocols via base station 1220 or with wireless LAN access point 1230 using wireless LAN protocols such as WiFi. A vehicle may also support wireless communication using a wireless LAN (WLAN), personal area network (PAN) such as Bluetooth™ or ZigBee, DSL or packet cable for example.

Vehicle A 1280 and/or vehicle B 1290, in an embodiment, may contain one or more GNSS receivers such as GNSS receiver 970 for reception of GNSS signals 1212, from GNSS satellites 1210, for location determination, time acquisition and time maintenance. Various GNSS systems may be supported alone or in combination, using GNSS receiver 970 or other receiver, to receive signals from Beidou, Galileo, Glonass, and/or GPS, and various regional navigational systems such as QZSS and NavIC or IRNSS. Other wireless systems may be utilized such as those depending on beacons such as, in an example, one or more roadside units (RSU) 1225, one or more wireless LAN access point 1230 or one or more base stations 1220. Various GNSS signals 1212 may be utilized in conjunction with car sensors 940 and/or 945 to determine location, velocity, proximity to other vehicles such as between vehicle A 1280 and vehicle B 1290.

In an embodiment, vehicle A and/or vehicle B may access GNSS measurements and/or locations determined at least in part using GNSS as provided by mobile device 1200, which, in an embodiment would also have GNSS, WAN, WiFi and other communications receivers and/or transceivers. In an embodiment, vehicle A 1280 and/or vehicle B 1290 may access GNSS measurements and/or locations determined at least in part using GNSS as provided by mobile device 1200 as a fallback in case GNSS receiver 970 fails or provides less than a threshold level of location accuracy.

In an embodiment, Vehicle A 1280 and/or Vehicle B 1290 may access, either directly or indirectly (such as through a roadside unit), various servers on the network such as vehicle information server 1255, route server 1245, location server 1260, map server 1250, environmental data server 1240, and traffic control and optimization server 1265. The various servers including vehicle information server 1255, route server 1245, location server 1260, map server 1250, environmental data server 1240, and traffic control and optimization server 1265 comprise at least one processor, which may include general processors, DSPs, dedicated processors and various combinations thereof, memory including RAM, ROM, FLASH, hard drive and virtual memory or various combinations thereof, and an at least one network interface which may comprise a physical link such as a LAN cable, fiber or other physical connection, wireless links such as wide area network (WAN), wireless LAN (WLAN), personal area and short range network connections (PAN) such as Bluetooth, Zigbee, and some 5G device to device communications and/or any combination thereof.

Vehicle information server 1255, may provide information describing various vehicles, as may be utilized in making decisions in regard to nearby cars such as whether they are capable of stopping or accelerating in time, whether they are autonomously driven, autonomous driving capable, and/or communications capable. In an embodiment, vehicle information server 1255 may also provide information in regard to vehicle size, shape, capabilities, identification, ownership, occupancy, and/or determined location point (such as, for example, the location of the GNSS receiver) and the location of the car boundaries relative to the determined location point.

Route server 1245, may receive current location and destination information, and provide routing information for the vehicle, map data, alternative route data and/or traffic and street conditions data.

Location server 1260, in an embodiment, may provide location determination capabilities, transmitter signal acquisition assistance (such as GNSS satellite orbital predictions information, time information approximate location information and/or approximate time information), transceiver almanacs such as those containing identification of and location for WiFi access points and base stations, and, in some embodiments, additional information relative to the route such as speed limits, traffic, and road status/construction status. Map server 1250 which may provide map data, such as road locations, points of interest along the road, address locations along the roads, road size, road speed limits, traffic conditions, and/or road conditions (wet, slippery, snowy/icy, etc.), road status (open, under construction, accidents, etc.). Environmental data server 1240 may, in an embodiment, provide weather and/or road related information, traffic information, terrain information, and/or road quality & speed information and/or other pertinent environmental data. V In an embodiment, Vehicles 1280 and 1290 and mobile devices 1200, in FIG. 12, may communication over network 1270 via various network access points such as wireless LAN access point 1230 or wireless WAN base station 1220 over network 1270. Vehicles 1280 and 1290 and mobile devices 1200, in FIG. 12, may also, in some embodiments, communicate directly between devices, between vehicles and device to vehicle and vehicle to device using various shorter-range communications mechanisms to communicate directly without going over network 1270, such as via Bluetooth, Zigbee and 5G new radio standards.

As shown in FIGS. 13A and 13B, in an embodiment, vehicle 1000, for example, a car, truck, motorcycle and/or other motorized vehicle, may exchange vehicle autonomous capability to enable desired lane change maneuver with closer vehicle spacing. In FIG. 13A and FIG. 13B, in an embodiment, Ego vehicle E 1300 does a lane change to merge between vehicles to its right, moving from lane 3 to lane 2, and entering the slot between two autonomous vehicles A, 1305A and 1305B. BSM (or CAM or other V2X) messages from autonomous vehicles in Lane 2 include a data element designating the vehicles A as autonomously driven. BSM (or CAM or other V2X) messages for ego vehicle E, the vehicle that is planning to do the lane change, from lane 3 to lane 2 also includes a data element designating vehicle E as autonomously driven. Vehicle E 1300 negotiates and executes the lane change with vehicles A, 1305A and 1305B, in lane 2. Since vehicle E 1300 and vehicles A, 1305A and 1305, are mutually aware they are autonomous, closer inter-vehicle spacing is enabled than if vehicles A in lane 2 were non-autonomous and/or not able to communicate status and intended lane change information.

Figure 14:
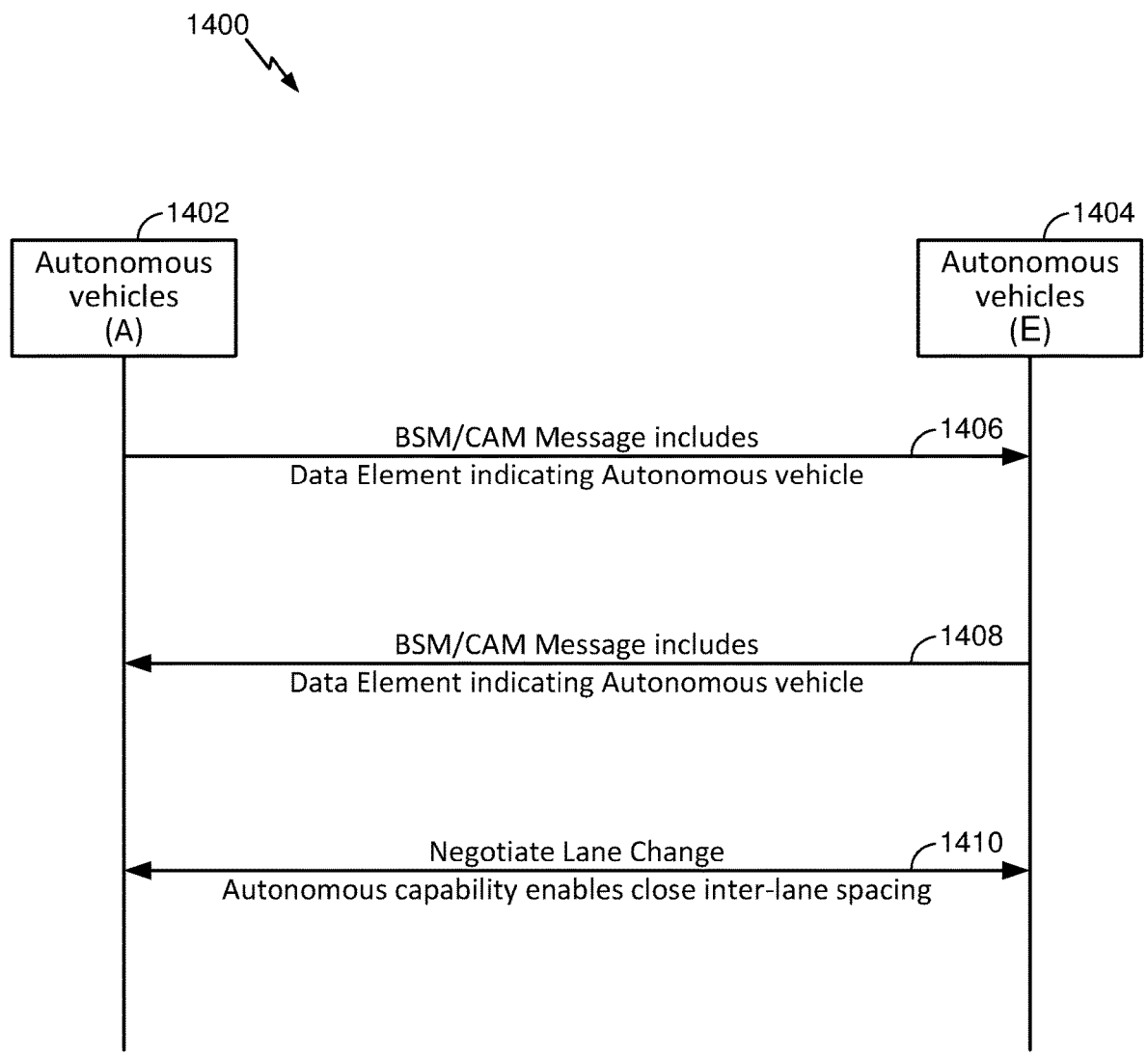
FIG. 14 illustrates exchanging vehicle autonomous capability messaging enabling closer inter-vehicle spacing.

In FIG. 14, in an embodiment, an example message flow between autonomous vehicle E 1300, shown in FIG. 14 as autonomous vehicle (E) 1404, and autonomous vehicles A, 1305A and 1305B, shown in FIG. 14 as autonomous vehicles (A) 1402, is illustrated for the lane change illustrated in FIG. 13A and FIG. 13B. In step 1406 autonomous vehicles A, 1305A and 1305B, send a BSM/CAM message containing a data element indicating autonomous vehicle capability for vehicles A, 1305A and 1305B. In step 1408, ego vehicle E 1300 sends a BSM/CAM message containing a data element indicating autonomous vehicle capability for vehicle E 1300. In an embodiment, these messages may be broadcast or may be point to point. In step 1410, autonomous vehicles A, 1305A and 1305B, negotiate the lane change with ego vehicle E 1300, via BSM and/or CAM messages. Autonomous vehicles A, 1305A and 1305B, and ego vehicle E 1300 may negotiate, in an embodiment, the timing, inter-car spacing, and schedule of events involved such that the lane change may be completed safely. In an embodiment, ego vehicle E 1300 sends a request to autonomous vehicles (A), corresponding to vehicles 1305A and 1305B of FIG. 13, requesting a lane change with destination location between autonomous vehicles A, 1305A and 1305B. The request may be broadcast to nearby vehicles or may be send point to point to from ego vehicle (E) 1300 to autonomous vehicles 1305A and 1305B of FIG. 13. Autonomous vehicles A, 1305A and 1305B may, in an embodiment, respond to ego vehicle (E) 1300 with an acknowledgement and an acceptance or denial of the request to increase inter-vehicle spacing between autonomous vehicles A, 1305A and 1305B. Autonomous vehicles A, 1305A and 1305B, may send messaging between each other to negotiate whether vehicle 1305A speeds up or whether vehicle 1305B slows down or some combination thereof. If either of autonomous vehicles A, 1305A and 1305B, is incapable of increasing spacing or if one has access to greater available space in front (1305A) or back (1305B) of it, that vehicle may be chosen or volunteer to increase the in spacing between autonomous vehicles A, 1305A and 1305B without further action on the part of the other of the pair of autonomous vehicles A, 1305A and 1305B. In an embodiment, once autonomous vehicles A, 1305A and 1305B, have reached the requested spacing, one or both of autonomous vehicles A, 1305A and 1305B, will send a message to requesting ego vehicle (E) 1300 noting that required spacing has been reached, enabling autonomous vehicle (E) 1300 to move from its current lane into the created space between autonomous vehicles A, 1305A and 1305B. If one of the vehicles in the target lane is not autonomous, ego vehicle (E) may instead request a space between a nearby pair of autonomous vehicles or, in the alternative, the autonomous vehicle of a pair of autonomous and non-autonomous vehicles may create the entire space for ego vehicle (E) to merge into. Furthermore, if one of the two cars is not autonomous, the autonomous vehicle may increase the spacing between it and the non-autonomous vehicle to be greater than what would other be allocated between two autonomous vehicles to provide extra margin for a safe lane change.

As shown in FIGS. 15A and 15B, in an embodiment, vehicle 1000, for example, a car, truck, motorcycle and/or other motorized vehicle, may exchange vehicle autonomous capability messaging, between autonomous vehicle E (1500) and non-autonomous vehicles in the target lane (1510A, 1510B, 1510C) to enable a desired lane change maneuver, but with greater vehicle spacing than between autonomous vehicles. In FIG. 15A and FIG. 15B, in an embodiment, vehicle E (1500) intends to do a lane change to the left, from lane 3 to lane 4 between two non-autonomous vehicles (1510A, 1510B). BSM (or CAM or other V2X) messages from non-autonomous vehicle(s) in Lane 4 include a data element designating the vehicle(s) 1510A and 1510B as non-autonomously driven. BSM (or CAM or other V2X) messages for ego vehicle E (1500), the vehicle that is planning to do the lane change, from lane 3 to lane 4 includes a data element designating vehicle E (1500) as autonomously driven. Vehicle E (1500) negotiates and executes the lane change with vehicles in lane 4. Since vehicle E (1500) and vehicles 1510A and 1510B are mutually aware that vehicles 1510A and 1510B are non-autonomous, a greater inter-vehicle lane spacing is utilized than if lane 4 vehicles 1510A and 1510B were autonomous. If either of non-autonomous vehicles (1510A, 1510B) is incapable of responding to a lane change request by autonomous ego vehicle 1500, it may respond with an incapability message, a refusal or other message denoting its inability to respond. If the other non-autonomous vehicle of non-autonomous vehicles (1510A, 1510B) is capable of responding, it may create the entire gap without further involvement by the other non-autonomous vehicle of non-autonomous vehicles (1510A, 1510B). Otherwise, based on the request failure, autonomous ego vehicle 1300 may re-target the lane merge to another space and/or another pair of automobiles.

Figure 16:
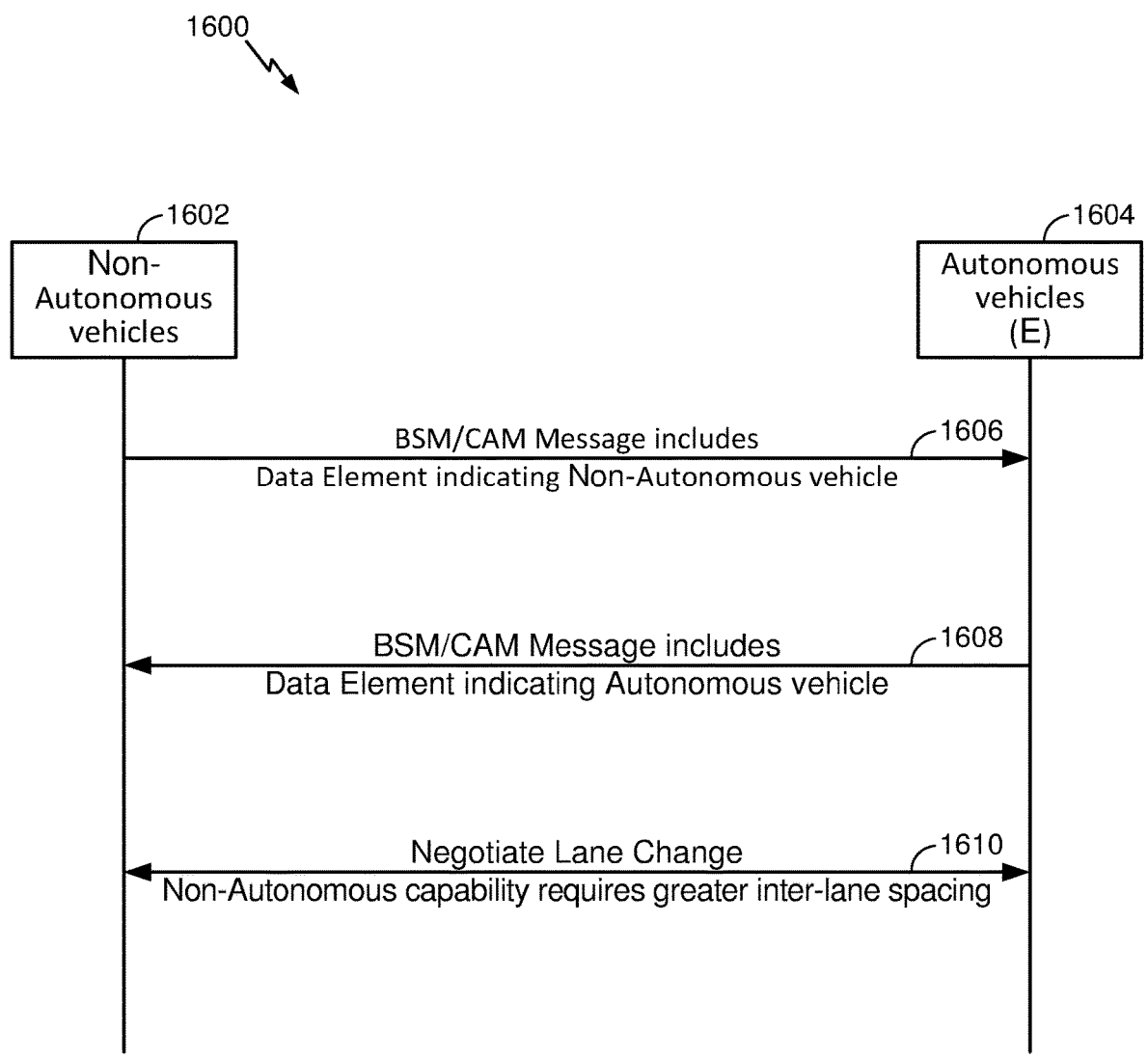
FIG. 16 illustrates exchanging vehicle non-autonomous capability messaging to enable safe inter-vehicle spacing.

In FIG. 16, in an embodiment, an example message flow between autonomous vehicle (E) 1604 and non-autonomous vehicles 1602 (e.g., 1510A and 1510B of FIGS. 15A and 15B) is illustrated for the lane change illustrated in FIG. 15A and FIG. 15B. In FIG. 16, in an embodiment, an example message flow between autonomous vehicle E 1604, (e.g., as shown in FIGS. 15A and 15B as autonomous vehicle (E) 1500), and non-autonomous vehicles 1602, (e.g., 1510A and 1510B, as shown in FIGS. 15A and 15B) is illustrated for the lane change illustrated in FIG. 15A and FIG. 15B. In step 1606 non-autonomous vehicles A1602 send a BSM and/or CAM message containing a data element indicating non-autonomous vehicle status or lack of autonomous vehicle capability for non-autonomous vehicles 1602. In an embodiment, the message may be broadcast to nearby vehicles or sent point to point as a response to requests from nearby vehicles or both. In step 1608, autonomous ego vehicle (E) 1604 sends a BSM/CAM message containing a data element indicating autonomous vehicle capability for autonomous ego vehicle (E) 1604. In an embodiment, these messages may be broadcast or may be point to point. In step 1610, non-autonomous vehicles 1602 (e.g., 1510A and 1510B of FIGS. 15A and 15B), negotiate the lane change with autonomous ego vehicle (E) 1604, via BSM and/or CAM messages. Non-autonomous vehicles 1602, and autonomous ego vehicle (E) 1604 may negotiate, in an embodiment, the timing, inter-car spacing, and schedule of events involved such that the lane change may be completed safely. In an embodiment, autonomous ego vehicle (E) 1604 sends a request to non-autonomous vehicles 1602, corresponding to vehicles 1510A and 1510B of FIGS. 15A and 15B, requesting a lane change with destination location between the two non-autonomous vehicles 1602. The request may be broadcast to nearby vehicles or may be send point to point to from ego vehicle (E) 1604 to non-autonomous vehicles 1602.

Non-autonomous vehicles 1602 may, in an embodiment, respond to requesting autonomous ego vehicle (E) 1604 with an acknowledgement and an acceptance or denial of the request to increase inter-vehicle spacing between non-autonomous vehicles 1602. Non-autonomous vehicles 1602 may send messaging between each other to negotiate whether one non-autonomous vehicle speeds up or whether the other non-autonomous vehicle slows down or some combination thereof. If either non-autonomous vehicles 1602, is incapable of increasing spacing (e.g., blocked in by a non-autonomous vehicle or by a vehicle otherwise not capable of supporting automatic lane changes) or if one of the non-autonomous vehicles 1602 has access to greater available space in front or in back of it, that vehicle may be chosen or volunteer to increase the in spacing between the non-autonomous vehicles 1602 without further action on the part of the other of the pair of non-autonomous vehicles 1602. In an embodiment, once non-autonomous vehicles 1602 have reached the requested spacing, one or both of non-autonomous vehicles 1602 will send a message to requesting ego vehicle (E) 1604 noting that required spacing has been reached, enabling autonomous vehicle (E) 1604 to move from its current lane into the created space between non-autonomous vehicles 1602. As an alternative, because the vehicles in the target lane are non-autonomous, ego vehicle (E) may instead request a space between a nearby pair of autonomous vehicles or, as a further alternative, the autonomous vehicle of a pair of autonomous and non-autonomous vehicles may create the entire space for autonomous ego vehicle (E) 1604 to merge into. Furthermore, because the two vehicles in the target lane are non-autonomous, the autonomous vehicle that is requesting a lane change may request increased the spacing between the two non-autonomous cars before merging into their lane than it would request from two autonomous vehicles to provide extra margin for a safe lane change.

Figure 17:
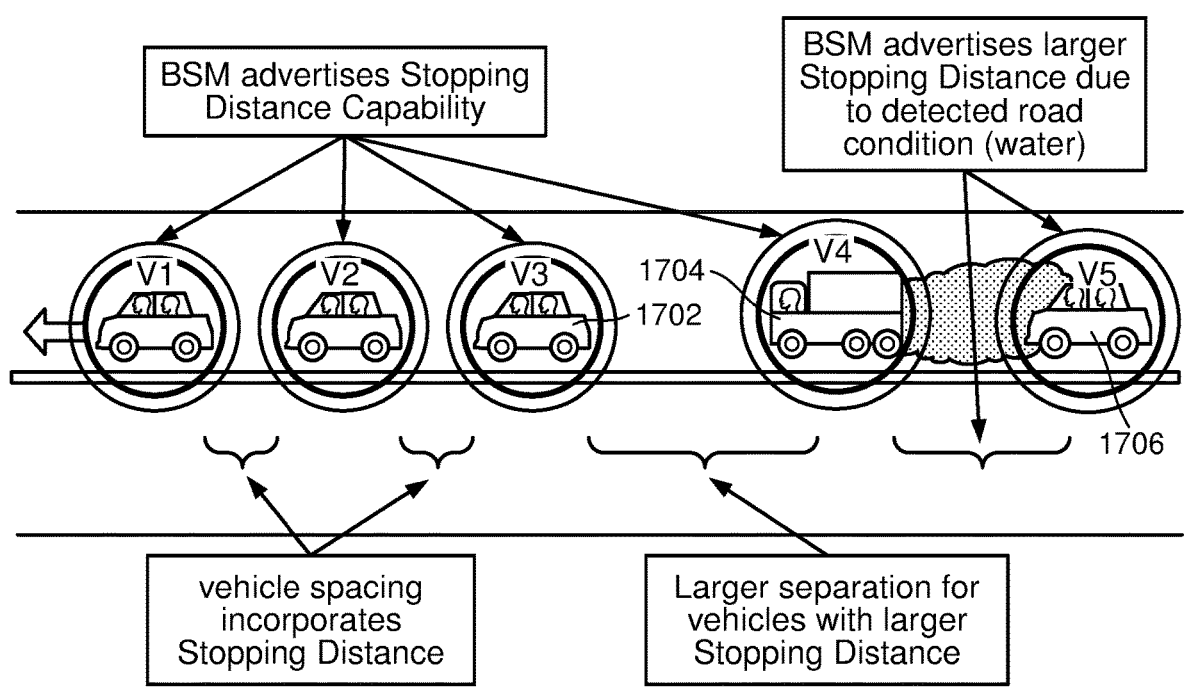
FIG. 17 illustrates exchanging vehicle-advertised stopping distance to determine platoon inter-vehicle spacing.

As shown in FIG. 17, in an embodiment, vehicle 1000, for example, a car, truck, motorcycle and/or other motorized vehicle, may exchange vehicle-advertised stopping distance to determine platoon or other inter-vehicle spacing. In an embodiment, vehicles determine stopping distance based on detected parameters, such as vehicle velocity, detected road/weather conditions, inherent braking capability, vehicle internal status (e.g., tire pressure), and vehicle driving state (autonomous or non-autonomous). In FIG. 17, V5 (1706) advertises a larger stopping distance due to a detected road condition (water on the road or other road hazard (such as ice, gravel or sand on the road)). Platoon or other inter-car spacing incorporates larger advertised stopping distance due to a one or more detected road condition. Here, in FIG. 17, V4 (1704) and V5 (1706) may increase inter-vehicle spacing between each other due to the advertisement by V5 (1706) of a larger stopping distance due to water or other road hazard.

Figure 18:
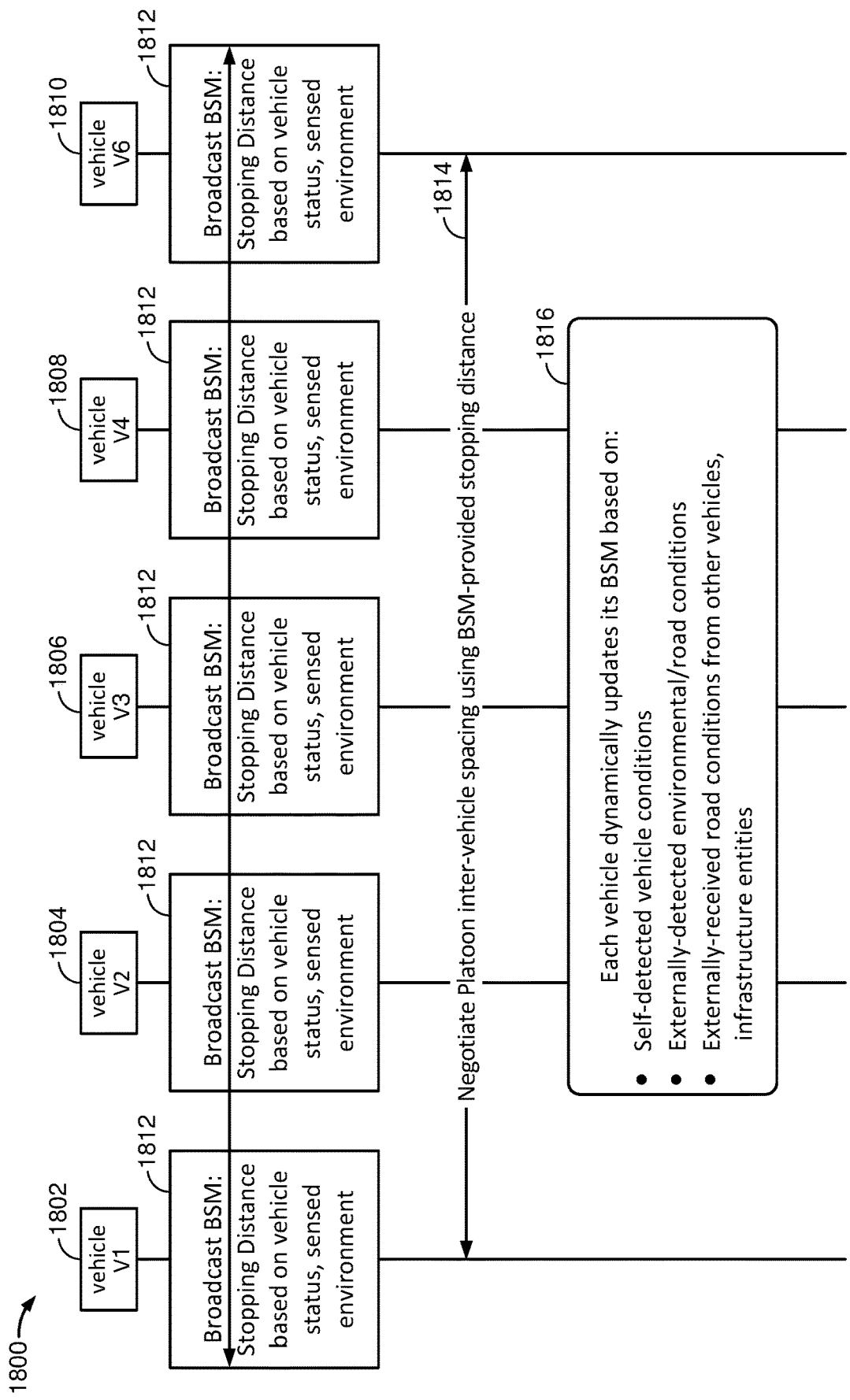
FIG. 18 illustrates exchanging vehicle-advertised stopping distance to determine platoon inter-vehicle spacing.

In FIG. 18, in an embodiment, an example message flow between autonomous vehicles V1 (1802), V2 (1804), V3 (1806), V4 (1808) and V5 (1810) is illustrated, incorporating stopping distance based on vehicle status and sensed environment. In step 1812, each of V1 (1802) through V5 (1810) broadcasts, using BSM or CAM messaging, based on the respective vehicle status (for example, tire tread, tire inflation, current weight) and environment (hazards on the road such as water, ice, gravel or sand, road composition, weather, wind, and/or visibility distance). The vehicles, if they are capable of doing so, will utilize the broadcast stopping distance of each nearby vehicle, to, in step 1814, negotiate platoon and/or other inter-vehicle spacing (i.e., a platoon formation is not necessary to use this technique) using the BSM- (or CAM or otherwise) provided stopping distance. If a vehicle is incapable of messaging or otherwise does not support inter-vehicle spacing adjustments based on broadcast stopping distance-related measurements, the adjacent vehicles may adjust around it to compensate. In FIG. 18, each vehicle dynamically updates its BSM (or CAM) messaging steps for stopping distance based upon self-detected vehicle conditions, externally-detected environmental and/or road conditions, externally-received road conditions from other vehicles and/or infrastructure entities such as environmental data server 1240 and/or map server 1250 and/or roadside units (RSU) 1225.

Figure 19A:
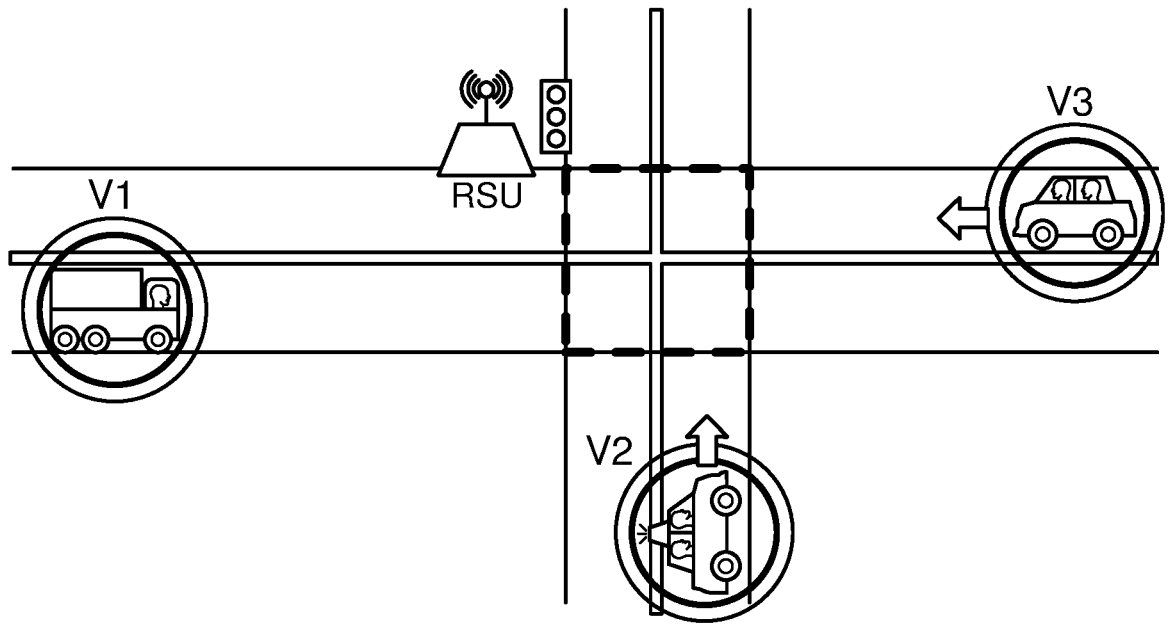
FIG. 19A and FIG. 19B illustrate exchanging stopping distance information to enable surrounding vehicles to stop so that an emergency vehicle may traverse an intersection.
Figure 19B:
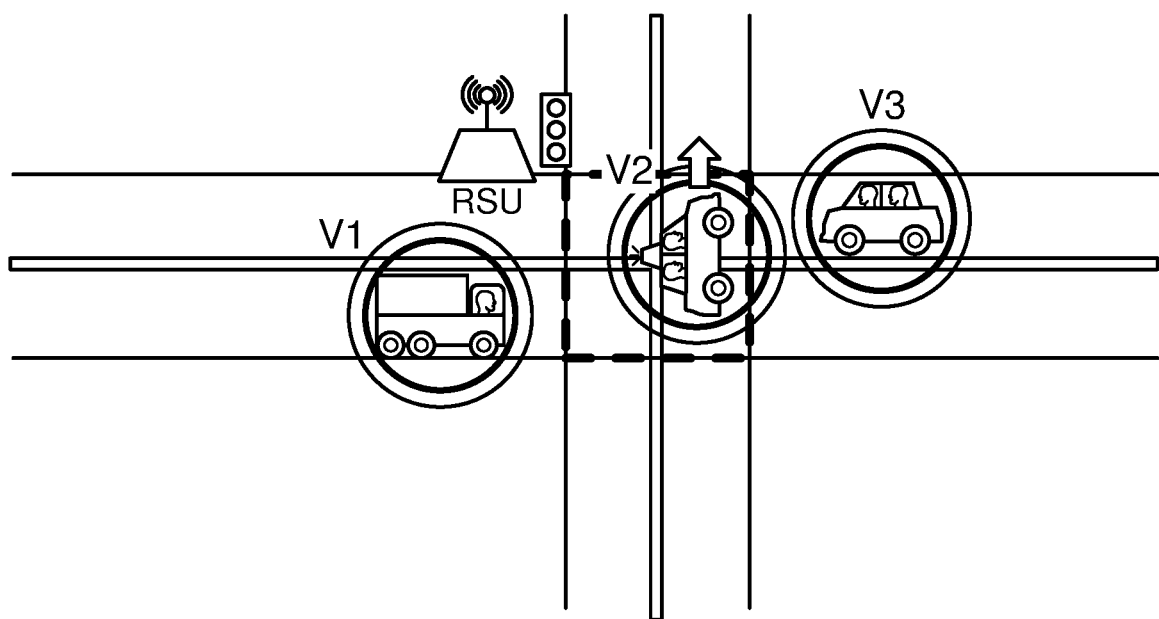

In FIG. 19A and FIG. 19B, in an embodiment, surrounding vehicles stop to allow an emergency vehicle to traverse an intersection. In FIG. 19A and FIG. 19B, in an embodiment, vehicles V1, V2, V3 broadcast BSM (or other V2X such CAM messaging) messages with calculated stopping distance. Emergency (or other priority) vehicle V2 transmits intersection priority request to a roadside unit (RSU), such as a Signal Request Message SRM, for example. Based on the respective stopping distances provided by V1 and V3 (using respective stopping distances and estimated distance from the intersection, the RSU may determine if V1 and V3 are able to safely stop before the intersection), the RSU, upon determining that V1 and V3 are able to safely stop, grants V2 intersection access (transmits Signal Status Message, SSM). The RSU then transmits revised intersection timing (SPAT message, for example). The RSU then transmits a signal status message (SSM) to V1 and V3 requesting a stop at the intersection. Emergency/priority vehicle V2 proceeds through the intersection while V1 and V3 stop at the intersection.

Figure 20:
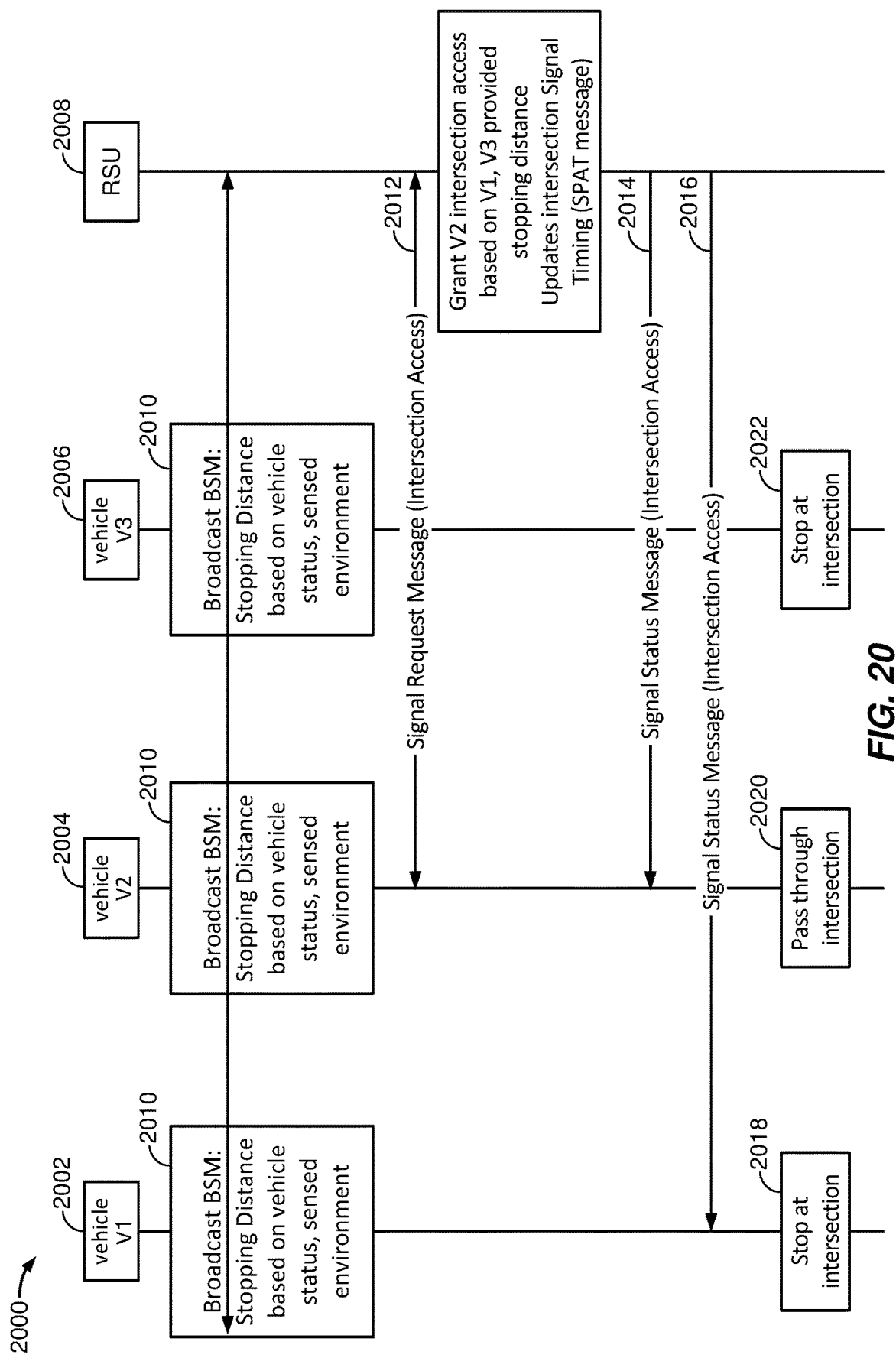
FIG. 20 illustrates exchanging stopping distance information to enable surrounding vehicles to stop so that an emergency vehicle may traverse an intersection.

In FIG. 20, in an embodiment, an example message flow between vehicles approaching an intersection incorporating messaging that includes stopping distance is illustrated. In an embodiment, vehicles V1, V2 and V3 transmit BSM messages with a message step containing their respective stopping distance based on vehicle status and sensed environment. Where V2 is an emergency vehicle, in an embodiment, the RSU will verify that vehicles V1 and V3 are capable of safely stopping before the intersection based on the stopping distances provided by V1 and V3. If V1 and V3 are capable of stopping, the RSU will grant V2 intersection access based on V1 and V3 provided stopping distances. The RSU will also update the intersection signal timing, e.g., using a SPAT message, such that emergency vehicle V2 may proceed through the intersection without stopping. The RSU sends a signal status message (intersection access message) to V2 to communicate the grant of intersection access to V2. Similarly, the RSU sends a signal status message denying intersection access to V1 and V3, requesting that V1 and V3 stop at the intersection. Emergency vehicle V2 then proceeds through the intersection while V1 and V3 stop at the intersection. In a case where all three vehicles are non-emergency vehicles, in an embodiment, the RSU may allocate intersection access in a manner that minimizes the number of vehicles that stop at the intersection to maximize traffic throughput (thus, here, V1 and V3 would be instructed/messaged to pass through the intersection and V2 would be instructed to stop, assuming V2's stopping distance provided via BSM allowed for safely stopping before the intersection).

Figure 21A:
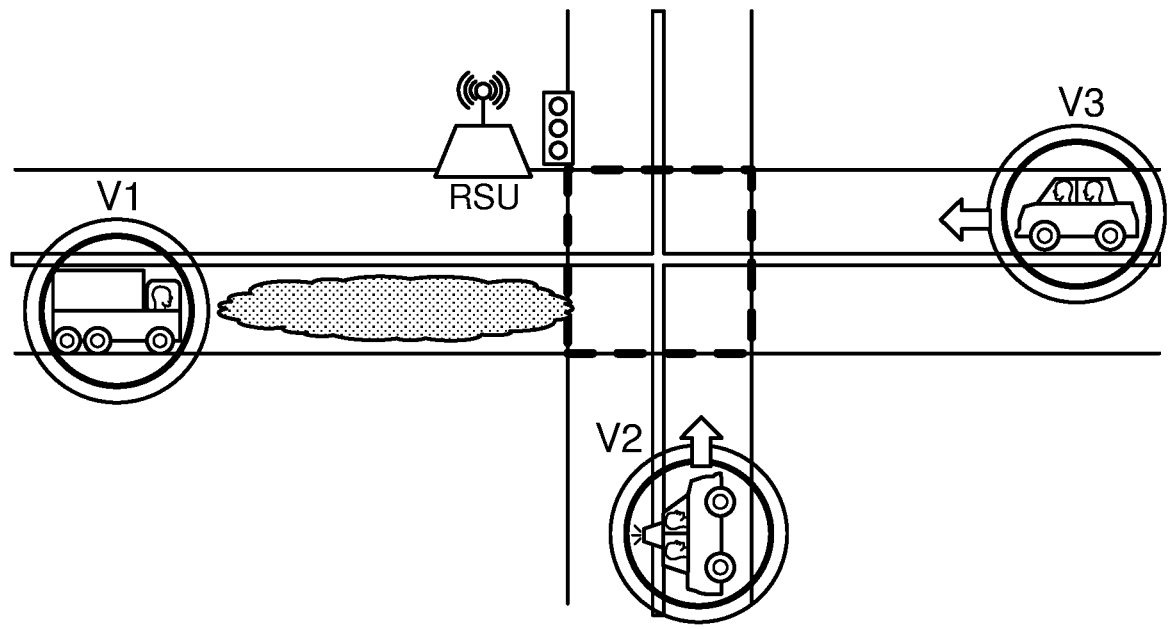
FIG. 21A and FIG. 21B illustrate exchanging stopping distance information to enable surrounding vehicles, capable of stopping, to stop while an emergency vehicle may slow before passing an intersection to enable surrounding vehicles, incapable of stopping, to pass through the intersection prior to the emergency vehicle.
Figure 21B:
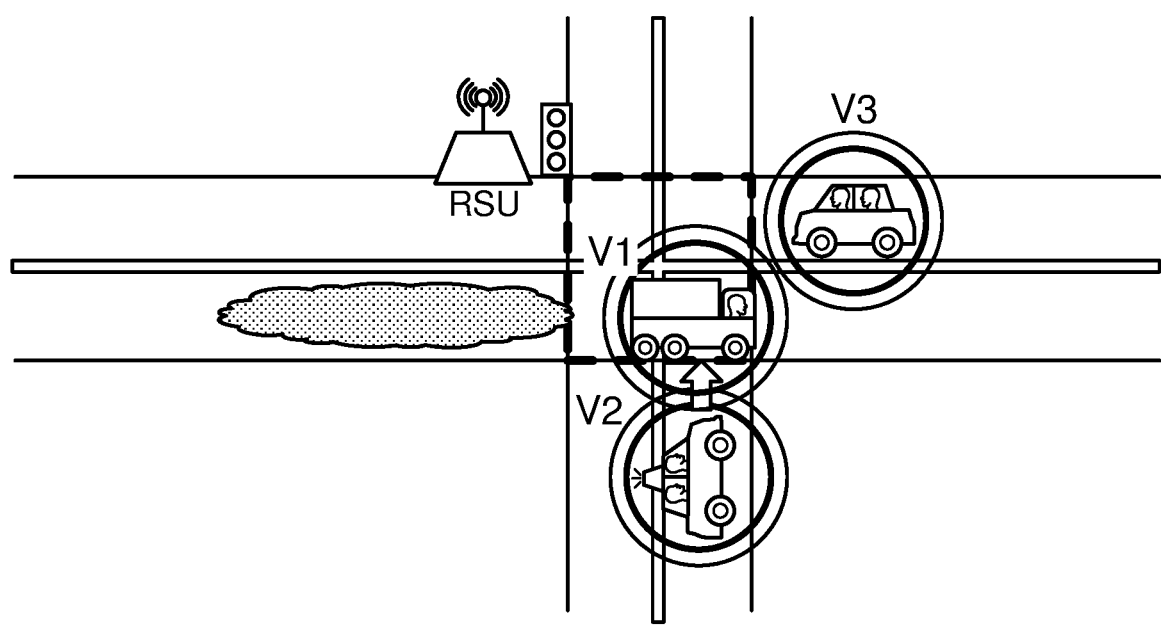

In FIG. 21A and FIG. 21B, in an embodiment, an emergency vehicle slows and/or stops before passing an intersection to allow a vehicle that is potentially unable to stop to pass through the intersection. In FIG. 21A and FIG. 21B, in an embodiment, Vehicles V1, V2, V3 broadcast BSM (or other V2X messaging) with calculated stopping distance; here, the V1 stopping distance is increased due to a water hazard and/or due to other factors such as vehicle speed, vehicle weight, and road surface conditions (note that here, in an example, V1 may is a truck; however, V1 could also be a car or other vehicle type). Emergency (or other urgent) vehicle V2 transmits an intersection priority request to roadside unit (RSU) such as a signal request message, SRM, for example. Based on V1-provided stopping distance, the RSU determines that V1 cannot safely stop before the intersection and rejects V2 intersection access, transmitting Signal Status Message, SSM, such that V2 will slow or stop for the intersection to allow V1 to pass through the intersection first. The RSU then transmits revised intersection timing (SPAT message, for example). Then, the RSU transmits SSM to V1, V3. V1 proceeds through the intersection. Emergency/priority vehicle V2 and vehicle V3 stop at the intersection. In an embodiment, if V3 may also safely proceed while V1 proceeds through the intersection, both V1 and V3 may pass through the intersection, granted access due to V1's broadcast stopping distance. Once V1 has passed through the intersection or if V3 is also allowed to pass, then once both V1 and V3 have passed through the intersection, the RSU transmits a signal status message instructing emergency vehicle V2 to pass through the intersection.

Figure 22:
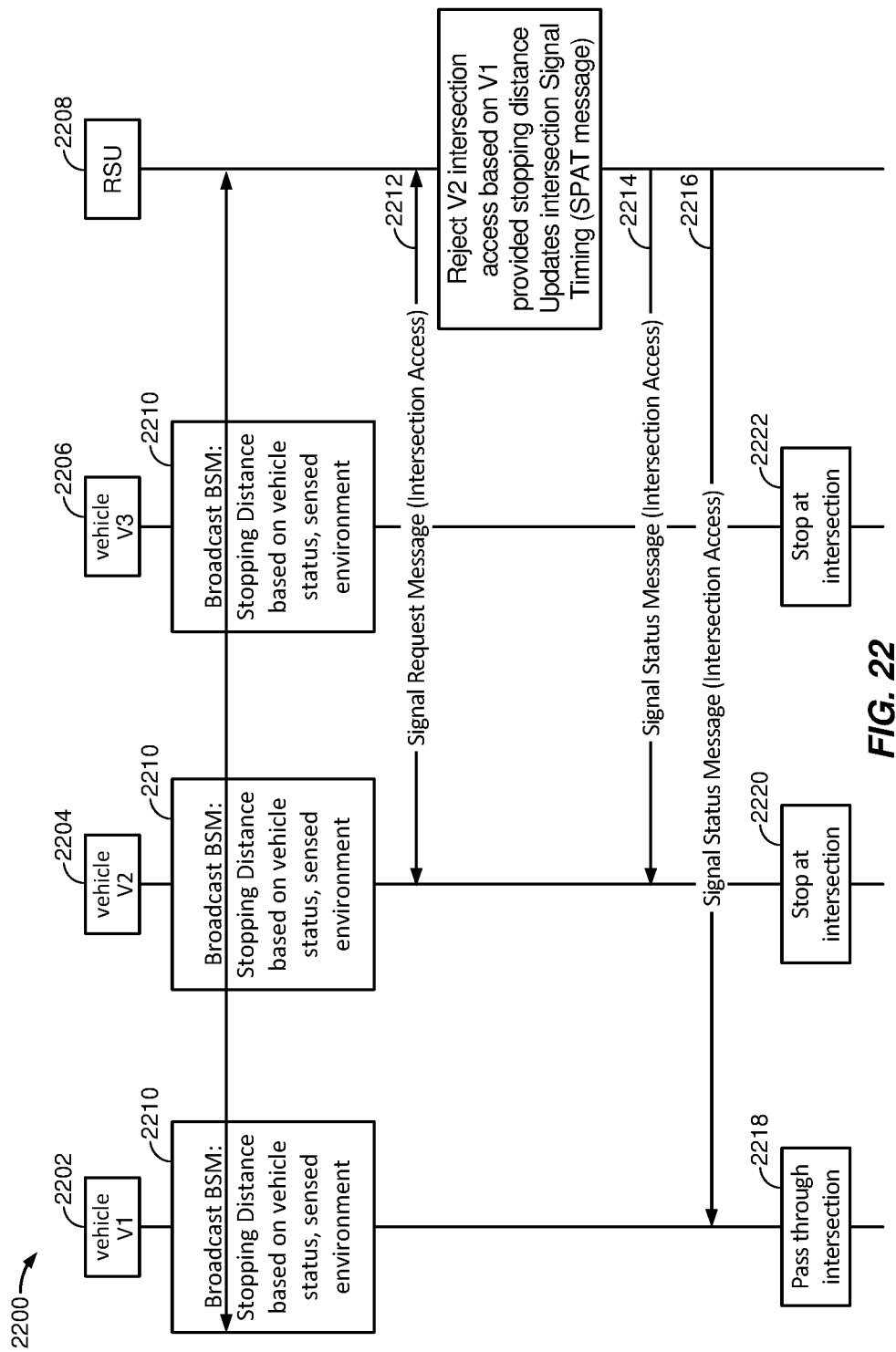
FIG. 22 illustrates exchanging stopping distance information to enable surrounding vehicles, capable of stopping, to stop while an emergency vehicle may slow before passing an intersection to enable surrounding vehicles, incapable of stopping, to pass through the intersection prior to the emergency vehicle.

In FIG. 22, in an embodiment, an example message flow between vehicles approaching an intersection incorporating messaging that includes stopping distance, and further including a vehicle with increased stopping distance due to sensed environmental conditions, is illustrated, reflecting the messaging involved in the scenario illustrated in FIGS. 21A and 21B. Thus, in an embodiment, in step 2210, Vehicles V1, V2 and V3 broadcast BSM messaging including a respective stopping distance data element based on vehicle status and sensed environmental data. Vehicle V1, as illustrated in FIGS. 21A and 21B, determines environmental data showing that a wet/slippery road condition exists and therefore broadcasts a longer stopping distance in a BSM message. In step 2212, Emergency vehicle V2 sends a signal request message for intersection access to the roadside unit (RSU). Based upon V1's broadcast BSM stopping distance, the roadside unit (RSU) 2208 will determine that vehicle V1 is incapable of safely stopping before the intersection and the RSU will reject the V2 intersection access request based on the V1 provided stopping distance, updating the intersection signal timing via a SPAT or other message accordingly, enabling vehicle V1, or, in some embodiments, if both may safely pass at the same time, then, allowing both vehicles V1 and V3, to pass through the intersection. Therefore, in step 2214 a signal status message will be sent from the RSU to vehicle V2 denying intersection access, causing vehicle V2 to subsequently stop at the intersection. Also, in step 2216, a signal status message will be sent from the RSU to vehicle V1 granting intersection access to vehicle V1, which will subsequently pass through the intersection. In an embodiment, a signal status message or other message may be sent to vehicle V3 denying intersection access which causes vehicle V3 to subsequently stop at the intersection while waiting for vehicle V1 and then for vehicle V2 to pass through the intersection; or, in an embodiment, the RSU may determine that both V1 and V3 are going in the same direction or at least that their respective paths do not conflict (e.g., V3 and V1 are going straight through the intersection or turning right) and may pass through the intersection concurrently, in which case vehicle V3 may receive a signal status message or other message allowing it intersection access concurrently with vehicle V1, prior to allowing emergency vehicle V2 access to the intersection.

Therefore, once V1 has passed through the intersection (or V1 and V3 if both are allowed), a new signal status message or other message granting intersection access is sent by RSU 2208, to V2, instructing V2 to proceed through the intersection. Once vehicle V2 has proceeded through the intersection, if V3 was not previously allowed through the intersection while V1 passed through the intersection, a signal status instruction may then be sent to vehicle V3 authorizing vehicle V3 to pass through the intersection.

Figure 23:
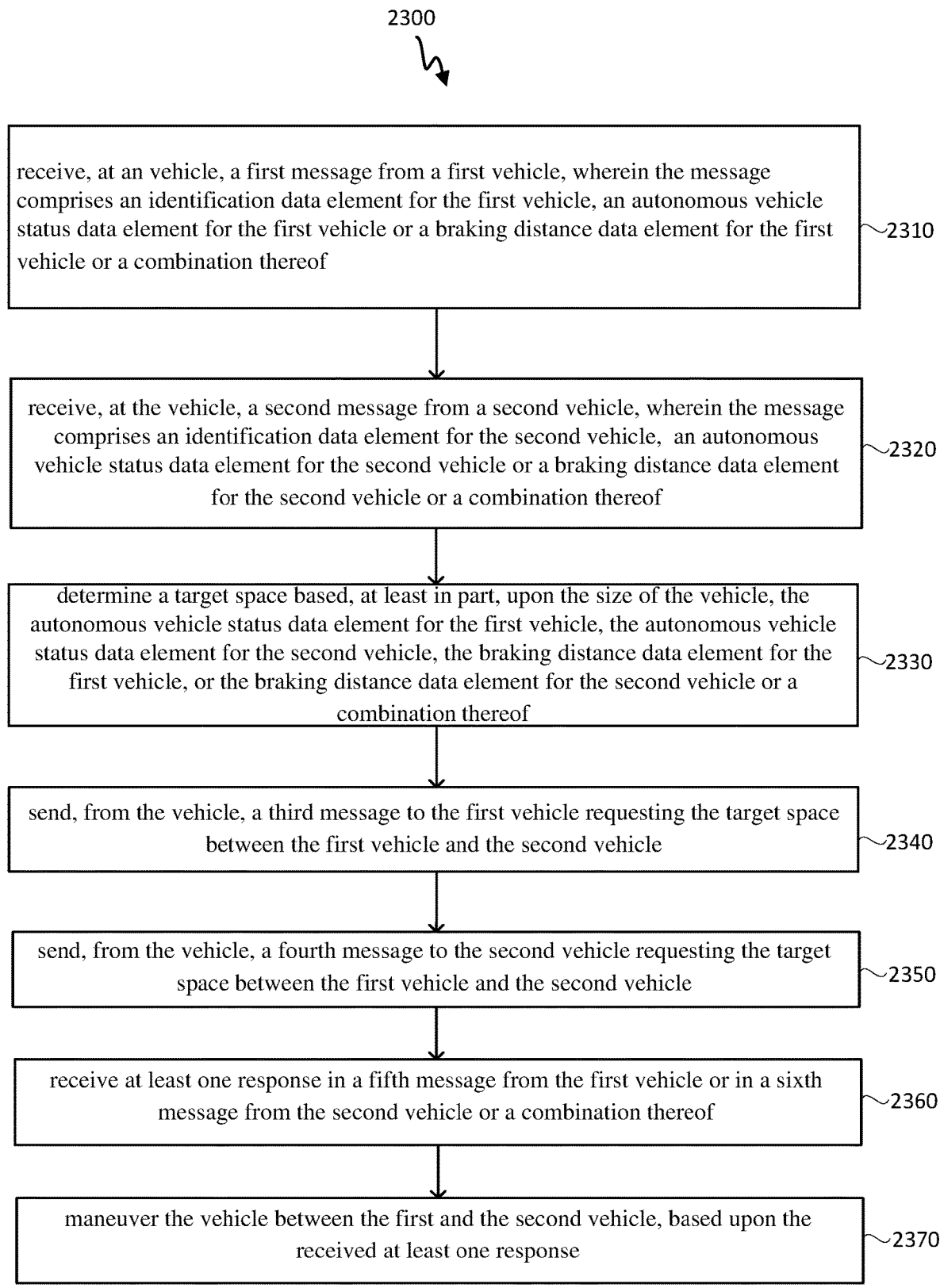
FIG. 23, illustrates a method of vehicle communication for lane change.

In FIG. 23, in an embodiment, an ego vehicle communicates with a first and a second vehicle to request that the first and second vehicles provide lane access and requested spacing for the ego vehicle to merge into their lane. In an embodiment, the requested spacing may account for whether the other vehicles are autonomous or non-autonomous (autonomous vehicle status) and braking distance for the various vehicles. For example, in an embodiment, if the car in front of the ego vehicle is capable of stopping in distance X and the ego vehicle is capable of stopping in distance Y, where distance X is shorter than Y, the ego vehicle may request extra space between the ego vehicle and the vehicle in front of it (for example, Y–X or more extra distance) to allow for the inability of the ego vehicle to stop within X distance. Similarly, the vehicle in back of the ego vehicle will negotiate for appropriate spacing between the ego vehicle and the vehicle in back. Thus, if ego vehicle is capable of stopping in distance X and the vehicle in back is capable of stopping in Y; if X>Y, the vehicle in back needs to allow at least Y distance. However, if X<Y, the vehicle in back needs to allow for at least Y+(Y–X) distance between the two cars. It is understood, that stopping distances are dynamic and may vary depending upon many factors including vehicular weight, cargo weight, tire pressure, road surface type, road surface status, weather, tire tread, brake wear, brake pressure and other factors. Therefore, in an embodiment, each of the vehicles will send messaging (for example, a broadcast message), comprising a basic safety message (BSM) or cooperative awareness message (CAM), wherein the message comprises an identification data element, an autonomous vehicle status data element, and/or a braking distance data element, which may be utilized to determine and request appropriate spacing between the vehicles and appropriate spacing to allow when vehicles are merging lanes. It is also understood that other factors besides those stated may also impact safe distances between vehicles and that additional space between vehicles to account for those factors (such as vehicular decision delay unforeseen obstacles, etc.) may be allocated.

In FIG. 23, it is understood that messages may be sent and received via wireless transceiver(s) 930 and antenna(s) 932 and may be directed via processor 910 and/or utilize DSP 920 and/or store data and instructions in memory 960, as described in FIG. 9. It is also understood that various sensors 945, accelerometers, gyros and magnetometers 940, camera 935, LIDAR 950, and/or systems 955 and/or externally provided information received over wireless transceiver(s) 930 or through other means may be utilized in determining braking distance and other data elements. It is further understood that various control, actions and/or maneuvers, and the analysis utilized to determine the control, actions and/or maneuvers, may be directed via or performed by processor 910 and/or DSP 920 using data and/or instructions in memory 960, and that processor 910 and/or DSP 920 using data and/or instructions in memory 960 may interact with various systems 955 and/or power and drive systems 975 and/or other systems, as described in FIGS. 9-11.

In step 2310, an ego vehicle receives a first message from a first vehicle, wherein the message comprises an identification data element for the first vehicle, an autonomous vehicle status data element for the first vehicle or a braking distance data element for the first vehicle or a combination thereof. The messaging between vehicles may be sent as basic safety messages (BSM) or cooperative awareness messages (CAM) or by utilizing other message protocols supported by wireless transceiver(s) 930.

The first and second vehicles, in an embodiment, are the target vehicle(s) that will be in front or in back of the ego vehicle after a lane change to insert in between the first and the second vehicle. The ego vehicle, in an embodiment, determines the identification for, the autonomous vehicle status (autonomously driven or manually driven) and/or the braking distance required for the first and second vehicles. The identification enables negotiation directly between the ego vehicle and the first and second vehicles.

Braking distance information may be utilized to determine a minimum safe distance between the ego vehicle and the first and second vehicles post merge. For example, the distance between vehicles may be determined such that collisions will be avoided in a sudden stop of the vehicles. In an embodiment, if the targeted following car requires more stopping distance than the vehicle in front of it, extra distance is added to the inter-vehicle spacing (for example, an extra buffer of the longer stopping distance less the shorter stopping distance) to avoid collisions during an emergency stop of the vehicles. It is further assumed that, in an embodiment, autonomously driven vehicles will have a faster response time than manually driven vehicles. Therefore, in an embodiment, manually driven vehicles may add extra buffer to their stopping distance to account for the extra response time required for a manual stop versus an autonomous stop. In an embodiment, a differentiation may also be made for a manually operated vehicle for which automatic emergency braking is enabled, such that emergency braking is quicker than for a fully manually operated vehicle, where there may be no increase or less increase in braking distance relative to braking distance for a fully autonomous vehicle.

Braking distance may be determined as described relative to FIG. 11 and/or as described below. Braking distance may utilize information from ego vehicle external sensors 1102, ego vehicle internal sensors 1104, ego vehicle capabilities 1106, external V2X inputs 1108, and ego vehicle motion state 1110, including current motion station such as velocity and heading and future intended motion and heading. Ego vehicle capabilities may, in an embodiment, be based on empirical test data for the make and model of the ego vehicle, such as factory test data, or may be based on measured performance data of the ego vehicle or may be formula-based, such as by using one or more of the formulas for braking distance specified herein. In an embodiment, ego vehicle capabilities may also be based on empirical test data modified based on current vehicle motion state 1110 and information from ego vehicle internal sensors 1104 and ego vehicle external sensors 1102. For example, in an embodiment, a make and model of car may be tested at various speeds using stock tires and tire inflation to determine stopping distances at various speeds and a stopping distance profile based on speed that assumes stock tires and a standard road surface. In an embodiment, the stopping distance profile may be stored as a table, where stopping distance for a given velocity may be interpolated based upon an entry at a higher velocity and an entry at a lower velocity. In an embodiment, each stopping distance may be fit into an equation or otherwise associated with a velocity. This may be done in a table or in an equation where the velocity of the vehicle, and in some embodiments, other factors and/or measurements, are input into an equation or table and the corresponding estimated stopping distance is output from the equation or table. Another factor to consider may include the reaction time of the vehicle, once a decision to stop is made and/or a human reaction time if the vehicle is being operated manually. If reaction time is considered, the speed of the car multiplied by the reaction time would be added to the estimated braking distance. Braking distance is composed of the reaction time to initiate braking multiplied by the velocity added to the distance required for the car motion to stop once braking is initiated. Typically, the distance required for the car to stop is related to the square of the velocity. It is also related to road gradient, road surface conditions, vehicular loading/weight, and the condition and type of brakes being utilized. Because road conditions and other environmental factors are also involved, the braking distance may vary and may need to be adjusted for variations in the environment such as ice or snow or water on the road. In an embodiment, an equation for braking distance, $d_B$, may be represented as follows: $d_B=(t_R*v)+(v^2/k*f_R*f_L*f_B)$, where $t_R$ is reaction time, v is velocity, $f_R$ is a function of road surface conditions and grade, $f_L$ is a function of vehicle loading, $f_B$ is a function of brake nominal performance and current brake status (degree of wear, etc.), and k is a scaling factor, in some embodiments, derived through empirical testing. $k*f_R*f_L*f_B$ is an estimated value to account for road friction, brake efficacy and mass. A simpler, but perhaps less accurate, estimate that variations in $f_R$, $f_L$, and $f_B$ could also be utilized where $d_B=(t_R*v)+(v^2/2\ ug)$, where u is a friction coefficient and g represents gravity.

The effects related to tire traction, tire inflation, or loading or other effects may, in some embodiments, also have different amounts of impact at different velocities (i.e., may also have non-linear impact), or in some embodiments may be estimated with linear models or in some embodiments represented by a constant factor (e.g., a wet road factor versus s dry road factor). The estimated stopping distance may be adjusted, either via direct input into the equation or via modification of the stopping distance output for various sensor input. For example, stopping distance decreases as tire pressure decreases due to greater contact with the road surface. However, water drainage also decreases as tire pressure decreases due to tire deformation. Thus, in dry conditions, the stopping distance may be increased due to over-inflated tires or decreased due to underinflated tires. In an embodiment, to be conservative, impacts that increase stopping distance may be considered while those that decrease stopping distance may be ignored or de-weighted/de-emphasized relative to their effect. In wet conditions, underinflated tires increase the risk of hydroplaning, and in an embodiment, tire pressure sensors may be utilized to in detect an underinflation condition where pressure is less than a threshold pressure, or is less than the recommended pressure by some threshold, which may be utilized to add extra distance to stopping distance based on an increased possibility of hydroplaning or otherwise skidding over the road surface. Similarly, input from tire traction sensors such as anti-lock braking sensors, traction control sensors and all-wheel drive traction sensors may be utilized to detect slick surfaces and loss of traction to tires and may trigger either a default increase to braking distance or may increase braking distance based upon a measured degree of road slickness/lack of traction. In an embodiment, temperature may be utilized to modify the stopping distance. For example, warmer temperatures may impact the softness of the tire tread and increase traction on a road surface while cold temperature may harden tire surfaces and reduce tire traction, thereby increasing stopping distance on cold days. Further, where sub-freezing temperatures are combined with detection of moisture, precipitation or high humidity, road surfaces may be slick or iced over and stopping distance may be increased. In an embodiment, deceleration ability may be measured based on velocity reduction relative to a given applied braking force during standard driving conditions and the braking distance may be redetermined and/or the equation or table recalibrated and/or compensation factors added or subtracted based on current measured braking performance. It is understood that one skilled in the art may also consider other factors as provided by the ego vehicle external sensors 1102, ego vehicle internal sensors 1104, ego vehicle capabilities 1106, external V2X inputs 1108, and ego vehicle motion state 1110 and this disclosure is not limited in that respect.

In step 2320, the ego vehicle receives a second message from a second vehicle, wherein the message comprises an identification data element for the second vehicle, an autonomous vehicle status data element for the second vehicle or a braking distance data element for the second vehicle or a combination thereof. The identification step may, in an embodiment, be utilized as a reference for further communication directly with the second vehicle and for negotiations and requests between the ego vehicle and the second vehicle. Similarly, when creating space for the ego vehicle to merge into the lane, the first vehicle and second vehicle may negotiate and coordinate responses to the ego vehicle's request for a lane merge using an identification data element.

It is understood that the first message and the second message may, in some embodiments, be broadcast messages that may be received and utilized by nearby vehicles, while request, acknowledgement and negotiation messages may be sent directly between the affected vehicles. Other embodiments may solely utilize broadcast messages or solely utilize point to point message or various combinations thereof. In an embodiment, it is further recognized that the first message and the second message may encompass more than one message and/or multiple message steps and may be segmented according to various protocols supported by the vehicles. In an embodiment, some or all point to point request, acknowledgement and negotiation messages may be encrypted for privacy between the negotiating vehicles, where the negotiating, requesting and acknowledging vehicles all have the appropriate public and private keys. In an embodiment, the communication may be shared by more than two vehicles, such as in the case of one vehicle merging into a lane between two other vehicles, to increase coordination between the affected vehicles and, in some embodiments, with the vehicles that are adjacent (for example, in front and in back) of them as well.

In step 2330, the ego vehicle determines a target space based, at least in part, upon the size of the ego vehicle, the autonomous vehicle status data element for the first vehicle, the autonomous vehicle status data element for the second vehicle, the braking distance data element for the first vehicle, or the braking distance data element for the second vehicle or a combination thereof. In an embodiment, the determination of the target space may further be based on negotiation between the affected vehicles and may impact the size of the target space and the placement of the target space relative to the three vehicles. In such an embodiment, for example, if the first vehicle has no obstacles in front of it and the second vehicle has another vehicle following it, the first vehicle may accelerate to increase the spacing between the first vehicle and the second vehicle and the ego vehicle may appropriately accelerate or decelerate to merge into the opened target space between the first vehicle and the second vehicle.

In step 2340, the ego vehicle sends a third message to the first vehicle requesting the target space between the first vehicle and the second vehicle. As discussed above, in an embodiment, the third message may be point to point between the ego vehicle and the first vehicle or, in an embodiment, it may be broadcast and received by both the first vehicle and the second vehicle, or it may be multicast to both the first vehicle and the second vehicle. If the request for the target space for a lane merge is broadcast or multicast to both the first vehicle and the second vehicle at the same time, the request may utilize the third message identifying both the first vehicle and second vehicle as message recipients for the request, eliminating the need for the fourth message in step 2350.

In step 2350, the ego vehicle sends a fourth message to the second vehicle requesting the target space between the first vehicle and the second vehicle. As discussed above, in some embodiments, the third and the fourth messages may be combined into a single request message designating both the first vehicle and the second vehicle as recipients, in which case the fourth message need not be sent.

In step 2360, the ego vehicle receives at least one response in a fifth message from the first vehicle or in a sixth message from the second vehicle or a combination thereof. The at least one response may, in an embodiment, grant permission for the ego vehicle to merge between the first and second vehicle. In an embodiment, the at least one response may specify timing and relative location between the vehicle and the first vehicle and/or second vehicle for the ego vehicle to initiate the merge. Additional messaging may be required to coordinate the movement and spacing between the ego vehicle and the first and/or second vehicles during and after the merge. In an embodiment, whereas the first and second vehicles may be in communication prior to and during the merge, either the first vehicle or the second vehicle or both the first and second vehicles may hand off communication between each other to the ego vehicle during or after the merge is complete such that each vehicle maintains communication with the vehicle immediately in front or in back of it.

In step 2370, the ego vehicle maneuvers into the target space between the first and the second vehicle based upon the received at least one response. In an embodiment, the ego vehicle will negotiate with the first vehicle and the second vehicle using appropriate messaging, to determine the spacing between the ego vehicle and the first vehicle and the ego vehicle and the second vehicle during and after the lane merge. In an embodiment, the ego vehicle may receive communication from the first vehicle or the second vehicle or from both vehicles regarding when to perform the lane change and may provide acknowledgement when the lane change is complete. Various conditions such as poor weather conditions or poor road conditions may be utilized to additionally affect the target rate or timing of the lane merge and/or the spacing between the target vehicles and the ego vehicle to be utilized in performing the lane merge and/or the spacing between the ego vehicle and the first and/or second vehicle after the lane merge. In an embodiment, messaging, particularly from the front vehicle, e.g., the first vehicle, or also from other surrounding vehicles, may also modify the timing of the merge due to lane obstacles such as potholes or due to slowing traffic in the target lane, each of which may make it more difficult to safely merge and/or for the first vehicle and the second vehicle to create the target space for the merge.

Figure 24:
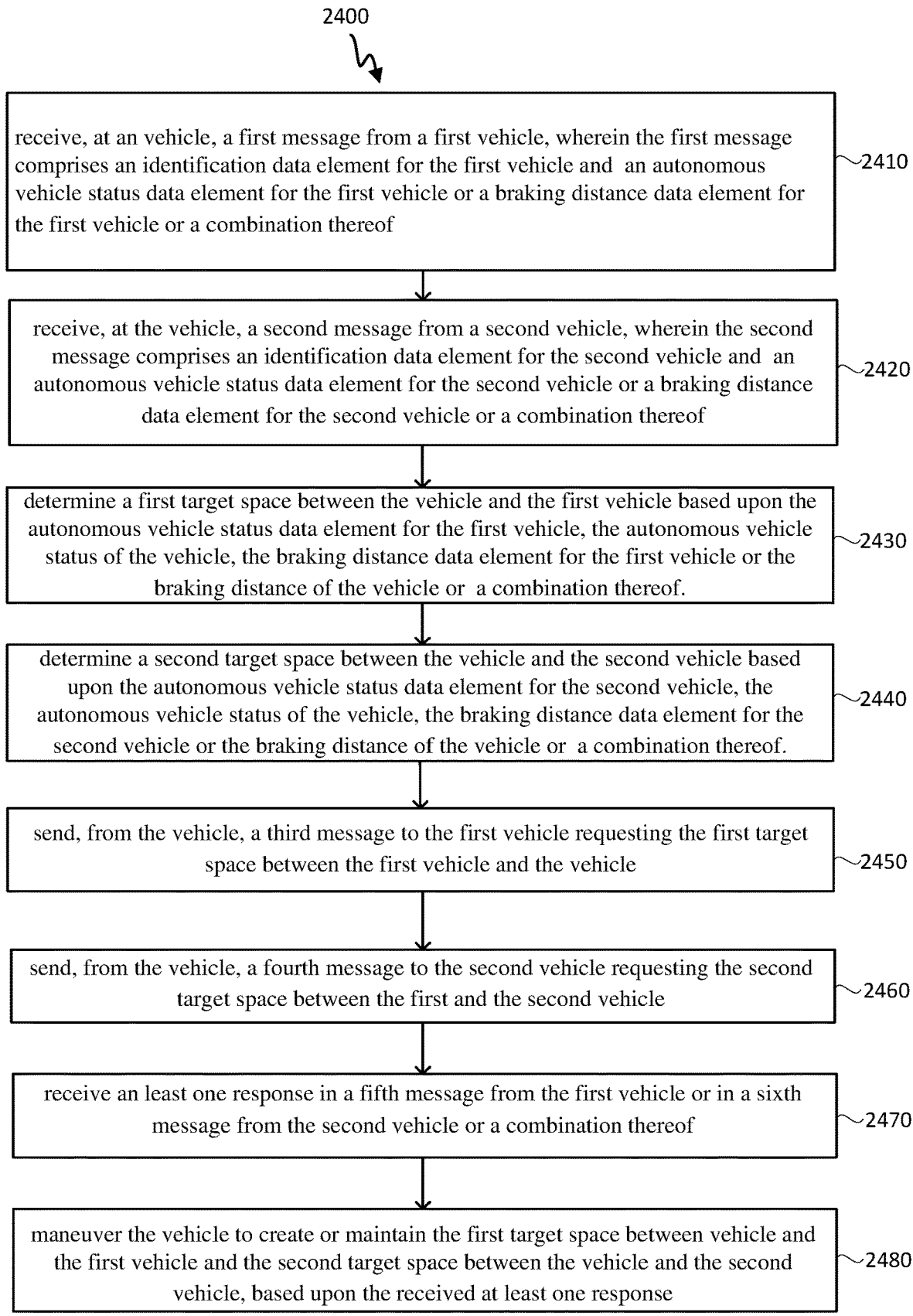
FIG. 24 illustrates a method of vehicle communication for requesting spacing between a vehicle and adjacent vehicles.

In FIG. 24, in an embodiment, an ego vehicle communicates with the vehicles in front and in back of it to request safe spacing between the ego vehicle and the vehicle in front of the ego vehicle (for discussion purposes, herein referred to as the first vehicle) and between the ego vehicle and the vehicle in back of the ego vehicle (for discussion purposes, herein referred to as the second vehicle). In an embodiment, the vehicles may be part of a platoon formation where they would coordinate spacing with the rest of the platoon or, in an embodiment, the three vehicles may be traveling alone and coordinating only with each other. In an embodiment, the communications between vehicles may be similar between FIG. 23, supporting lane change, and FIG. 24, supporting inter-vehicular spacing, where both activities require similar messaging, information, negotiation and responses from the current or targeted front and rear vehicles and, in general, the discussion relative to FIG. 23 is relevant to FIG. 24 and vice versa.

In FIG. 24, it is understood that messages may be sent and received via wireless transceiver(s) 930 and antenna(s) 932 and may be directed via processor 910 and/or utilize DSP 920 and/or store data and instructions in memory 960, as described in FIG. 9. It is also understood that various sensors 945, accelerometers, gyros and magnetometers 940, camera 935, LIDAR 950, and/or systems 955 and/or externally provided information received over wireless transceiver(s) 930 or through other means may be utilized in determining braking distance and other data elements. It is further understood that various control, actions and/or maneuvers, and the analysis utilized to determine the control, actions and/or maneuvers, may be directed via or performed by processor 910 and/or DSP 920 using data and/or instructions in memory 960, and that processor 910 and/or DSP 920 using data and/or instructions in memory 960 may interact with various systems 955 and/or power and drive systems 975 and/or other systems, as described in FIGS. 9-11.

In FIG. 24, it is understood that the first message and the second message may, in some embodiments, be broadcast messages that may be received and utilized by nearby vehicles, while request, acknowledgement and negotiation messages may be sent directly between the affected vehicles. For example, the third message and the fourth message may be point to point messages from the ego vehicle to the first vehicle and to the second vehicle respectively. Other embodiments may solely utilize broadcast messages or solely utilize point to point message or various combinations thereof. In an embodiment, it is further recognized that the first message and the second message may encompass more than one message and/or multiple message steps and may be segmented according to various protocols supported by the vehicles. In an embodiment, some or all point to point request, acknowledgement and negotiation messages, such as the third and fourth messages of FIG. 24, may be encrypted for privacy and/or security between the negotiating vehicles, where the negotiating, requesting and acknowledging vehicles all have the appropriate public and private keys. In an embodiment, the communication may be shared by more than two vehicles, such as in the case of one vehicle merging into a lane between two other vehicles or in the case of one vehicle modifying the spacing in front and in back of it, to increase coordination between the affected vehicles and, in some embodiments, with the vehicles that are adjacent (for example, in front and in back) of them as well. In an embodiment, the messaging between vehicles may be sent as basic safety messages (BSM) or cooperative awareness messages (CAM) or by utilizing other message protocols supported by wireless transceiver(s) 930.

In step 2410, the ego vehicle receives a first message from a first vehicle, wherein the first message comprises an identification data element for the first vehicle and an autonomous vehicle status data element for the first vehicle or a braking distance data element for the first vehicle or a combination thereof. As with FIG. 23, the messaging between vehicles may be sent as basic safety messages (BSM) or cooperative awareness messages (CAM) or by utilizing other message protocols supported by wireless transceiver(s) 930. In an embodiment, the messages may be broadcast, multi-cast or point-to-point or a combination thereof. In an embodiment, information and/or status messages such as the first message and the second message may be implemented as broadcast messages or as point to point messages to adjacent cars or as multicast messages to adjacent cars. Request, acknowledgement, negotiation and response messages may be point to point between the affected parties or broadcast or multicast with designations of the target vehicles; for example, here, the third message and the fourth message may be point to point between the ego vehicle and the first vehicle and the ego vehicle and the second vehicle respectively. The discussion of derivation of braking distance, and the relation of braking distance to various conditions and inputs as well as to autonomous vehicle capability, by a vehicle, is discussed above relative to FIG. 23.

In step 2420, the ego vehicle receives a second message from a second vehicle, wherein the second message comprises an identification data element for the second vehicle and an autonomous vehicle status data element for the second vehicle or a braking distance data element for the second vehicle or a combination thereof. The second message may be sent as a broadcast or multi-cast message, for neighboring cars to utilize, or may be sent point to point to neighboring vehicles.

In step 2430, the ego vehicle determines a first target space between the ego vehicle and the first vehicle based upon the autonomous vehicle status data element for the first vehicle, the autonomous vehicle status of the ego vehicle, the braking distance data element for the first vehicle or the braking distance of the ego vehicle or a combination thereof. It is understood that other factors may also be considered such as road surface, water on the road, weather conditions, tire pressure, surrounding traffic and road hazards. It is understood that this list is not comprehensive, and that further discussion is found relative to the discussion of FIG. 23 and FIG. 11. In some embodiments, the determination of the first target space may be done in the ego vehicle or in the first vehicle or cooperatively between the two vehicles.

In step 2440, determine a second target space between the ego vehicle and the second vehicle based upon the autonomous vehicle status data element for the second vehicle, the autonomous vehicle status of the ego vehicle, the braking distance data element for the second vehicle or the braking distance of the ego vehicle or a combination thereof. As with step 2430, it is understood that other factors may also be considered such as road surface, water on the road, weather conditions, tire pressure, surrounding traffic and road hazards. It is understood that this list is not comprehensive, and that further discussion is found relative to the discussion of FIG. 23 and FIG. 11. In some embodiments, the determination of the first second target space may be done in the ego vehicle or in the first vehicle or cooperatively between the two vehicles.

In step 2450, the ego vehicle sends a third message to the first vehicle requesting the first target space between the first vehicle and the ego vehicle. It is realized, however, that either adjacent vehicle could initiate the target space review and modification of inter-vehicular space or both could cooperative initiate the target space review and modification. FIG. 24 step 2450 is similar to FIG. 23 step 2340 in both intent and content exchanged.

In step 2460, the ego vehicle sends a fourth message to the second vehicle requesting the second target space between the first and the second vehicle FIG. 24 step 2460 is similar to FIG. 23 step 2350 in both intent and content exchanged.

In step 2470, the ego vehicle receives an at least one response in a fifth message from the first vehicle or in a sixth message from the second vehicle or a combination thereof. In an embodiment, the at least one response will grant permission for the ego vehicle to adjust positioning to create and/or coordinate the first target space between the first vehicle and the ego vehicle or the second target space between the first and the second vehicle or a combination thereof. Additional messaging may be required to coordinate the movement and spacing between the ego vehicle and the first and/or second vehicles.

In step 2480, based upon the received at least one response, the ego vehicle maneuvers, as needed, to manage the first target space between ego vehicle and the first vehicle and the second target space between the ego vehicle and the second vehicle.

Figure 25:
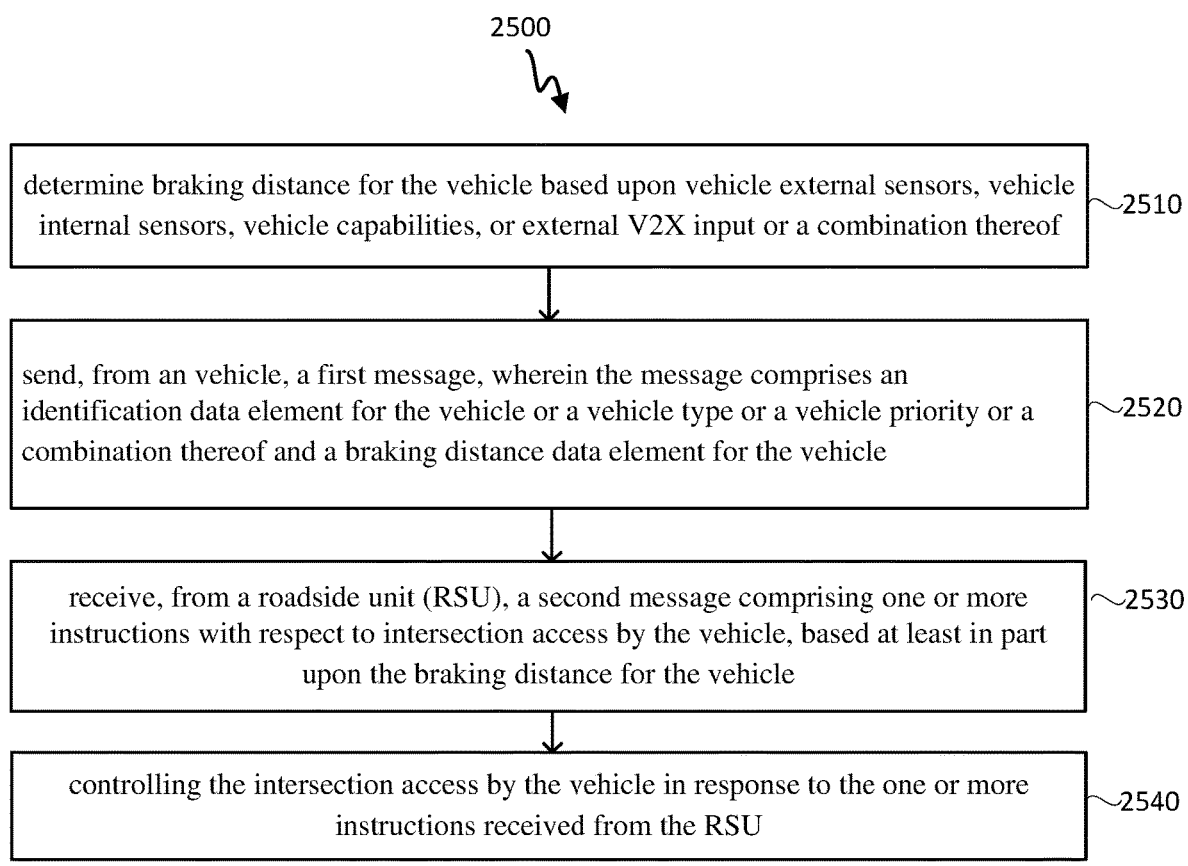
FIG. 25 illustrates a method of vehicle communication with a roadside unit.

In FIG. 25, in an embodiment, an ego vehicle interacts with a roadside unit (RSU), which controls intersection access, to request and receive permission to access the intersection. In an embodiment, if the ego vehicle's determined braking distance is greater than the distance between the ego vehicle and the approaching intersection (i.e., the distance between the ego vehicle and the intersection is insufficient for the ego vehicle to stop before the intersection, given the determined braking distance), the RSU may grant the ego vehicle intersection access in priority over other vehicles that are able to safely stop before the intersection. This may include priority over other vehicles that would otherwise have greater priority than the ego vehicle, such as emergency vehicles (police, fire, ambulance, etc.). If the ego vehicle's determined braking distance is smaller than the distance between the ego vehicle and the approaching intersection (i.e., the distance between the ego vehicle and the intersection is sufficient for the ego vehicle to stop before the intersection, given the determined braking distance), the RSU may request that the ego vehicle stop before the intersection (i.e., the RSU does not grant intersection access to the ego vehicle, instead requesting that the ego vehicle stop) so that the RSU may grant intersection access to vehicles that have greater priority (for example, emergency vehicles such as police, fire, ambulance, etc.) than the ego vehicle or that are closer to the intersection or who cannot stop before entering the intersection or various combinations thereof.

In FIG. 25, it is understood that messages may be sent and received via wireless transceiver(s) 930 and antenna(s) 932 and may be directed via processor 910 and/or utilize DSP 920 and/or store data and instructions in memory 960, as described in FIG. 9. It is also understood that various sensors 945, accelerometers, gyros and magnetometers 940, camera 935, LIDAR 950, and/or systems 955 and/or externally provided information received over wireless transceiver(s) 930 or through other means may be utilized in determining braking distance and other data elements. It is further understood that various control, actions and/or maneuvers, and the analysis utilized to determine the control, actions and/or maneuvers, may be directed via or performed by processor 910 and/or DSP 920 using data and/or instructions in memory 960, and that processor 910 and/or DSP 920 using data and/or instructions in memory 960 may interact with various systems 955 and/or power and drive systems 975 and/or other systems as described in FIGS. 9-11.

In FIG. 25, in an embodiment, an RSU may also provide, via point to point transmission or via local wireless broadcast, information to the ego vehicle such as traffic information, road obstacle information, weather information, road surface information, pedestrian warnings and/or other information related to the environment near the RSU. An RSU may also have non-vehicular inputs such as radar, LIDAR and camera inputs that it may use to independently review traffic flow and direction, weather conditions, road conditions (black ice, wet, etc.). An ego vehicle may consider information provided by an RSU in determining data elements. For example, in determining braking distance for the ego vehicle, the ego vehicle may consider weather, road surface and other conditions, that may be received from an RSU as data elements via wireless messaging, and that impact ego vehicle braking performance.

In step 2510, the ego vehicle determines its braking based upon information from ego vehicle external sensors, ego vehicle internal sensors, ego vehicle capabilities, or external V2X input or a combination thereof. Braking distance may be determined as previously discussed relative to FIG. 23. For example, an initial value of braking distance may be based on a lookup table of braking distance based on velocity. For velocity values that fall between table entries, braking distance may be interpolated. For example, if you have lower velocity V1 associated with a braking distance B1 and a higher velocity V2 associated with a braking distance B2, and a velocity V3 in between V2 and V1, such that V2>V3>V1, then B3, the braking distance associated with velocity V3, may be expressed as (V3−V1)/(V2−V1)*(B2−B1)+B1. In other embodiments, the velocity and braking data, having a non-linear relationship, may be fit to a curve. Notably, stopping distance increases at a faster rate as velocity increases, so, in an embodiment, the velocity and braking data may be plotted to a non-linear equation or it may be conservatively simplified to a linear equation that, in an embodiment, may result in excess braking distance at lower velocities. Furthermore, the initial velocity prediction may be modified to account for other factors such as excess vehicular weight, road surface, weather conditions (snow or ice on the road). In an embodiment, road or weather conditions may be addressed by modifying the initial braking estimate to add extra braking distance to account for weather, road surface irregularities, loose road surfaces (gravel, dirt or sand), ice or water on the road and other factors that would slow braking. In an embodiment, predetermined amounts may be added to the stopping distance based on each condition, for example, adding margin to the estimates based on conservative empirical data. In an embodiment, the table or curve may be modified, or there may be different tables or curves, to account for degraded stopping conditions. In an embodiment, measurements of wheel slippage such as traction control measures, all wheel drive, anti-lock brake measurements of wheel slippage, and/or adhesion coefficient of friction (adhesion between road and tire) may be used and/or considered when modifying the amount of extra braking distance added to the initial braking distance (i.e., the nominal condition braking distance).

In step 2520, the ego vehicle sends a first message, wherein the message comprises an identification data element for the ego vehicle or a vehicle type or a vehicle priority or a combination thereof and a braking distance data element for the ego vehicle. In some embodiments, a vehicle type may specify, in a non-limiting example, whether the vehicle is a passenger vehicle, a transport truck, or an emergency vehicle or other vehicle type. In some embodiments, a vehicle priority may comprise an indication of priority, such as whether a vehicle is in an emergency, is in a time critical situation, is in a moderately time sensitive situation or in a not time sensitive situation. In some embodiments, a vehicle priority may comprise an indication of financial transfer where the highest bidder may obtain priority in intersection access over lower bidders. In some embodiments, a vehicle status may comprise a numerical value or ordered sequence (such as 1 through 5 or A through F) connoting relative priority. In some embodiments, the ego vehicle may also send an autonomous data element relating to whether the vehicle is operated autonomously, such that response time or other factors related to autonomous operation may be considered. In some embodiments, the ego vehicle may send positioning information and/or velocity and heading information. In some embodiments, the ego vehicle may include, in the message, other related data elements such as slippery road indicators and/or measurements of road/tire slippage and/or adhesion. In some embodiments, the ego vehicle message may include data elements for surrounding traffic indications such as whether there are vehicles in front, in back and/or on the side of the ego vehicle. In some embodiments, the ego vehicle message(s) may include an emergency, status or priority flag that may be used to increase the priority of the ego vehicle for intersection access. In some embodiments, the ego vehicle message(s) may include observational data and/or received data from adjacent cars such as data in regard to the status and/or emergency status of the adjacent vehicles. The message(s) may be sent directly to the RSU, e.g., via a point to point message, or the message may be broadcast with data elements corresponding to an identification data for the ego vehicle and braking distance data for the ego vehicle. As with FIG. 23, the messaging between the ego vehicle and the RSU may be sent as basic safety messages (BSM) or cooperative awareness messages (CAM) or by utilizing other message protocols supported by wireless transceiver(s) 930. In an embodiment, the messages may be broadcast, multi-cast or point-to-point or a combination thereof. In an embodiment, information and/or status messages may be implemented as broadcast messages or as point to point messages to adjacent cars or as multicast messages to adjacent cars and/or roadside units. Request, acknowledgement, negotiation and response messages may be point to point between the affected parties or broadcast or multicast with designations of the target vehicles. The discussion of derivation of braking distance, and the relation of braking distance to various conditions and inputs as well as to autonomous vehicle capability, by a vehicle, is also discussed above relative to FIG. 23.

In an embodiment, the roadside unit (RSU) may automatically assume a request for intersection access by a vehicle approaching the intersection, such as the ego vehicle. In an embodiment, the ego vehicle may send, to the RSU, a message requesting intersection access. In some embodiments, an RSU may assume that vehicles approaching the intersection are requesting intersection access and accordingly monitor approaching vehicle distance, velocity, stopping distance, priority and/or other factors when determining the order of priority to grant intersection access.

In step 2530, the ego vehicle receives, from a roadside unit (RSU), a second message comprising one or more instructions with respect to intersection access by the ego vehicle, based at least in part upon the braking distance for the ego vehicle. In an embodiment, second message may comprise instructions granting or refusing permission to access the intersection, wherein the permission is based at least in part upon the braking distance for the ego vehicle. In an embodiment, the second message may specify a speed of approach to the intersection which may be, in an embodiment, associated with a grant of permission to access the intersection. In an embodiment, the speed of approach may be determined so as to let other vehicles pass through the intersection prior to the ego vehicle passing through the intersection. In an embodiment, the speed of approach may be determined so as to maximize traffic flow through the intersection. In an embodiment, the second message may be a broadcast signal status message. In an embodiment, the second message may be a point to point message. In an embodiment, if the ego vehicle stopping distance exceeds the distance between the ego vehicle and the intersection, the RSU may grant the ego vehicle access to the intersection and/or increased priority for intersection access. In an embodiment, if the ego vehicle stopping distance is less than the distance between the ego vehicle and the intersection (i.e., the ego vehicle is capable of stopping, or at least slowing, before the intersection) and higher priority vehicles are requesting access to the intersection, or if vehicles that are closer to or waiting at the intersection are requesting access to the intersection, the RSU may refuse the ego vehicle access to the intersection and, instead, request the ego vehicle to stop at the intersection while providing access to the intersection to other vehicles. In an embodiment, if the ego vehicle stopping distance is less than the distance between the ego vehicle and the intersection (i.e., the ego vehicle is capable of stopping, or at least slowing, before the intersection) and other vehicle types are requesting access to the intersection, particularly if public policy or other policy dictates that particular vehicle types are favored over other vehicle types, the RSU may refuse the ego vehicle access to the intersection and, instead, request the ego vehicle to stop at the intersection, or slow its approach, while providing access to the intersection to other vehicles of other types. For example, a public policy may favor transit with the fewest stops for public transit vehicles such as buses and trains or for large vehicles such as large trucks that would use more energy starting and stopping; under such a policy, the public transit vehicles and/or large vehicles may have priority access to the intersection over passenger cars. Similarly, a high occupancy vehicle type (or status) may have priority over a low occupancy vehicle type (or status). In an embodiment, the second message may be a broadcast signal status message from the RSU or the second message may be a point to point message from the RSU to the ego vehicle granting or refusing intersection access to the ego vehicle.

In step 2540, the ego vehicle may control the intersection access by the ego vehicle in response to the one or more instructions received from the RSU. In an embodiment, the ego vehicle may receive, in the second message, instructions to access the intersection or stop prior to the intersection to wait for intersection access to be granted by the RSU, based the second message. In an embodiment, the second message may comprise instructions from the RSU to the ego vehicle to stop or proceed, and may further comprise a request to modify vehicle speed as the ego vehicle approaches the intersection. In an embodiment, the ego vehicle may receive instructions from the RSU to slow or otherwise modify its speed (rather than stop) prior to the intersection to allow other vehicles to pass through the intersection before the ego vehicle arrives at the intersection. In an embodiment, the ego vehicle may receive instructions from the RSU to accelerate to pass through the intersection prior to other vehicles. In an embodiment, the RSU may send a target speed of approach to the intersection to the ego vehicle which may result in the ego vehicle approaching the intersection at a speed that is slower or faster than the current ego vehicle speed. In an embodiment, the ego vehicle may stop at a line demarcating the intersection to wait for permission to enter the intersection.

In various embodiments, an ego vehicle may be illustrated by vehicle 1000 (e.g., as illustrated in FIGS. 9-11) and may be capable of location determination, navigation, autonomous driving, object detection, inter-vehicle communication and/or other technologies that are utilized in autonomous and/or semi-autonomous vehicles. In various embodiments above, the term vehicle and ego vehicle may be used interchangeably, wherein systems within the ego vehicle, for example, may be referred to as vehicle systems or as ego vehicle systems. For example, the terms vehicle internal sensors and vehicle external sensors relate to systems on the ego vehicle. An ego vehicle may be autonomous or may have an autonomous mode and a manual mode or may have semi-autonomous features such as automated lane control (for example, where the ego vehicle is able to automatically stay in a lane or request lane change/merge into another lane) or is able to automatically stop or to automatically avoid road obstacles) but may otherwise be driven manually.

In various embodiments, and as discussed above, vehicle 1000 may utilize location technology in combination with brake pad and brake status monitoring systems to estimate braking distance (and/or, in an embodiment, the efficacy of braking at different velocities), which may be estimated at multiple velocities (as may be measured by location systems and/or speedometers, wheel monitors, etc.). braking distance and/or performance versus velocity may be used to create tables of braking distance based on velocity and/or equations fit to the braking data at different velocities, which may be utilized to estimate braking distance. Braking distance may be regularly and periodically updated based upon changing input parameters including changes in velocity and location.

In various embodiments, and as discussed above, vehicle 1000 may utilize location systems to determine location which may be communicated in location data elements to adjacent and/or nearby vehicles. Vehicle 1000 may use location in determining vehicular motion, for example, when merging lanes or in determining spacing between vehicles. Vehicle 1000 may exchange location information with adjacent or nearby vehicles to negotiate and coordinate motion such as lane changes and in adjusting spacing between vehicles.

In various embodiments, and as discussed above, vehicle 1000, e.g. vehicle A 1280 and vehicle B 1290, may have circuitry and processing resources capable of obtaining location related measurements (e.g. for signals received from GPS, GNSS or other Satellite Positioning System (SPS) satellites 1210, WAN wireless transceiver 1220 or WLAN or PAN local transceiver 1230 and possibly computing a position fix or estimated location of vehicle 1000 based on these location related measurements. In the presently illustrated example, location related measurements obtained by vehicle 1000 may include measurements of signals (1212) received from satellites belonging to an SPS or Global Navigation Satellite System (GNSS) (1210) such as GPS, GLONASS, Galileo or Beidou and/or may include measurements of signals (such as 1222 and/or 1232) received from terrestrial transmitters fixed at known locations (e.g., such as WAN wireless transceiver 1220). Vehicle 1000 or a location server 1260 may then obtain a location estimate for vehicle 1000 based on these location related measurements using any one of several position methods such as, for example, GNSS, Assisted GNSS (A-GNSS), Advanced Forward Link Trilateration (AFLT), Observed Time Difference of Arrival (OTDOA) or Enhanced Cell ID (E-CID), network triangulation, Received Signal Strength Indication (RSSI) or combinations thereof. In some of these techniques (e.g. A-GNSS, AFLT and OTDOA, RSSI), pseudoranges, ranges or timing differences may be measured at vehicle 1000 relative to three or more terrestrial transmitters at known locations or relative to four or more satellites with accurately known orbital data, or combinations thereof, based at least in part, on pilots, positioning reference signals (PRS) or other positioning related signals transmitted by the transmitters or satellites and received at vehicle 1000. Servers may provide positioning assistance data to vehicle 1000 including, for example, information regarding signals to be measured (e.g., signal timing and/or signal strength), locations and identities of terrestrial transmitters, and/or signal, timing and orbital information for GNSS satellites to facilitate positioning techniques such as A-GNSS, AFLT, OTDOA and E-CID. For example, location server 1260 may comprise an almanac which indicates locations and identities of wireless transceivers and/or local transceivers in a particular region or regions such as a particular venue, and may provide information descriptive of signals transmitted by a cellular base station or AP or mobile terrestrial transceiver such as transmission power and signal timing. In the case of E-CID, a vehicle 1000 may obtain measurements of signal strengths for signals received from WAN wireless transceiver 1220 and/or wireless local area network (WLAN) or PAN local transceiver 1230 and/or may obtain a round trip signal propagation time (RTT) between vehicle 1000 and a WAN wireless transceiver 1220 or wireless local transceiver 1230. A vehicle 1000 may use these measurements together with assistance data (e.g. terrestrial almanac data or GNSS satellite data such as GNSS Almanac and/or GNSS Ephemeris information) received from a location server 1260 to determine a location for vehicle 1000 or may transfer the measurements to a location server 1260 to perform the same determination.

In various embodiments, location may be determined through various means, as described above. For example, in an embodiment, the vehicle 1000 may determine its location with GNSS satellite signal measurements, with terrestrial transmitter signal measurements or some combination thereof. In an embodiment, vehicle 1000 may determine its location with LIDAR, RADAR, GNSS, sensors and various combinations thereof. In an embodiment, the vehicle 1000 may determine its location using accelerometers and/or gyros and various sensors (wheel ticks, steering direction, etc.) to determine, via dead reckoning, distance and direction traveled from the last determined position. In an embodiment, the vehicle 1000 may determine its location using a combination of signals and sensors; for example, a location may be determined using various signal measurements from GNSS and terrestrial transmitters and then updated using dead reckoning. From a determined location, various signal measurements can be taken from visible transmitters to obtain an indication of distance of the transmitter from a determined location. The indication of distance may include signal strength or round-trip time or time of arrival or other distance estimation methods. New signal measurements may be taken at new determined locations. By combining indications of distance to any given transmitter taken from multiple locations, whether by one device or by a plurality of devices, the location of a transmitter, such as a WAN wireless transceiver 1220 or WLAN or PAN local transceiver 1230, may be determined. The location of the transmitter may be determined on vehicle 1000 or on a crowd sourcing server or on a location server 1260 or other network-based server.

A vehicle (e.g. vehicle 1000 in FIG. 2, e.g., vehicle A 1280 and vehicle B 1290) may be referred to as a device, a car, a truck, a motorcycle, a flying device such as a plane or drone, a wireless device, a mobile terminal, a terminal, a mobile station (MS), a user equipment (UE), a SUPL Enabled Terminal (SET). Typically, though not necessarily, a vehicle may support wireless communication such as using V2X, GSM, WCDMA, LTE, CDMA, HRPD, Wi-Fi, BT, WiMAX, Long Term Evolution (LTE), 5th Generation Wireless (5G) or new radio access technology (NR), V2X communication protocols, etc. A vehicle may also support wireless communication using a wireless LAN (WLAN), personal area network (PAN) such as Bluetooth™ or ZigBee, DSL or packet cable for example. In an embodiment, a vehicle may support transmission of basic safety messages (BSM) including various data elements, such as one delineating that the respective vehicle is autonomously driven. In an embodiment, a vehicle may support transmission of ETSI cooperative awareness messages (CAM), for example, in an embodiment including various data elements such as a data element delineating that the respective vehicle is autonomously driven.

An estimate of a location of a vehicle (e.g., vehicle 1000) may be referred to as a location, location estimate, location fix, fix, position, position estimate or position fix, and may be geographic, thus providing location coordinates for the vehicle (e.g., latitude and longitude) which may or may not include an altitude component (e.g., height above sea level, height above or depth below ground level, floor level or basement level). Alternatively, a location of a vehicle may be expressed as a civic location (e.g., as a postal address or the designation of some point or small area in a building such as a particular room or floor). A location of a vehicle may also be expressed as an area or volume (defined either geographically or in civic form) within which the vehicle is expected to be located with some probability or confidence level (e.g., 67% or 95%). A location of a vehicle may further be a relative location comprising, for example, a distance and direction or relative X, Y (and Z) coordinates defined relative to some origin at a known location which may be defined geographically or in civic terms or by reference to a point, area or volume indicated on a map, floor plan or building plan. In the description contained herein, the use of the term location may comprise any of these variants unless indicated otherwise.

Reference throughout this specification to "one example", "an example", "certain examples", "in an embodiment", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or "in an embodiment" or other like phrases in various places throughout this specification are not necessarily all referring to the same feature, example, and/or limitation. Furthermore, the particular features, structures, or characteristics may be combined or modified in one or more examples and/or features and across various embodiments. The specified embodiments are not intended to be limiting relative to implementations, which may vary in detail; one skilled in the art will realize that other non-specified embodiments may also be used with or to modify the described embodiments.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, steps, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Wireless communication techniques described herein may be in connection with various wireless communications networks such as a wireless wide area network ("WAN"), a wireless local area network ("WLAN"), a wireless personal area network (PAN), and so on. The term "network" and "system" may be used interchangeably herein. A WAN may be a Code Division Multiple Access ("CDMA") network, a Time Division Multiple Access ("TDMA") network, a Frequency Division Multiple Access ("FDMA") network, an Orthogonal Frequency Division Multiple Access ("OFDMA") network, a Single-Carrier Frequency Division Multiple Access ("SC-FDMA") network, Long Term Evolution ("LTE"), Fifth Generation ("5G") or any combination of the above networks, and so on. A CDMA network may implement one or more radio access technologies ("RATs") such as cdma2000, Wideband-CDMA ("W-CDMA"), to name just a few radio technologies. Here, cdma2000 may include technologies implemented according to IS-95, IS-2000, and IS-856 standards. A TDMA network may implement Global System for Mobile Communications ("GSM"), Digital Advanced Mobile Phone System ("D-AMPS"), or some other RAT. GSM and W-CDMA are described in documents from a consortium named "3rd Generation Partnership Project" ("3GPP"). CDMA2000 is described in documents from a consortium named "3rd Generation Partnership Project 2" ("3GPP2"). 3GPP and 3GPP2 documents are publicly available. 4G Long Term Evolution ("LTE") communications networks may also be implemented in accordance with claimed subject matter, in an aspect. A WLAN may comprise an IEEE 802.11x network, and a PAN may comprise a Bluetooth network, an IEEE 802.15x, comprising a Zigbee network, for example. Wireless communication implementations described herein may also be used in connection with any combination of WAN, WLAN or PAN.

In another aspect, as previously mentioned, a wireless transmitter or access point may comprise a wireless transceiver device, utilized to extend cellular telephone service into a business or home or vehicle. In such an implementation, one or more vehicles may communicate with a wireless transceiver device via a code division multiple access ("CDMA") cellular communication protocol, for example.

Techniques described herein may be used with a satellite positioning system ("SPS") that includes any one of several global navigation satellite systems ("GNSS" such as the Global Positioning system "GPS", the Russian GLONASS system and the European Union's Gallileo system and the Chinese BeiDou and BeiDou-2 systems) and/or combinations of GNSS. Furthermore, such techniques may be used with positioning systems that utilize terrestrial transmitters acting as "pseudolites", or a combination of SVs and such terrestrial transmitters. Terrestrial transmitters may, for example, include ground-based transmitters that broadcast a PN code or other ranging code (e.g., similar to a GPS or CDMA cellular signal). Such a transmitter may be assigned a unique PN code so as to permit identification by a remote receiver. Terrestrial transmitters may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "SV", as used herein, is intended to include terrestrial transmitters acting as pseudolites, equivalents of pseudolites, and possibly others. The terms "SPS signals" and/or "SV signals", as used herein, is intended to include SPS-like signals from terrestrial transmitters, including terrestrial transmitters acting as pseudolites or equivalents of pseudolites.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, the claimed subject matter is not limited to the examples disclosed; such claimed subject matter may also include all aspects falling within the scope of the claims, and equivalents thereof.

For an implementation involving firmware and/or software, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable storage medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, FLASH, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

What is claimed is:

1. A method of vehicle coordination, comprising:
   receiving, at an ego vehicle, a first message from a first vehicle, wherein the first message comprises an identification data element for the first vehicle, an autonomous vehicle capability element, indicating whether the first vehicle has a non-autonomous vehicle capability or an autonomous vehicle capability for the first vehicle, and a braking distance data element for the first vehicle;
   receiving, at the ego vehicle, a second message from a second vehicle, wherein the second message comprises an identification data element for the second vehicle, an autonomous vehicle capability element, indicating whether the second vehicle has a non-autonomous vehicle capability or an autonomous vehicle capability for the second vehicle, and a braking distance data element for the second vehicle;
   determining a target space between the first and the second vehicle based, at least in part, upon:
      a size of the ego vehicle, or the braking distance data element for the first vehicle, or the braking distance data element for the second vehicle, or a combination of any two or more thereof; and
      the autonomous vehicle capability element for the first vehicle or the autonomous vehicle capability element for the second vehicle or a combination thereof;
   sending, from the ego vehicle, a third message to the first vehicle requesting the target space between the first vehicle and the second vehicle;
   sending, from the ego vehicle, a fourth message to the second vehicle requesting the target space between the first vehicle and the second vehicle;
   receiving at least one response in a fifth message from the first vehicle or in a sixth message from the second vehicle or a combination thereof; and
   maneuvering the ego vehicle into the target space between the first and the second vehicle based upon the at least one response.

2. The method of claim 1, wherein the third message and the fourth message are sent to the first vehicle and the second vehicle as a broadcast message or a multicast message.

3. The method of claim 1, wherein the third message and the fourth message are sent to the first vehicle and the second vehicle respectively as peer-to-peer messages.

4. The method of claim 1, wherein the target space is determined based, at least in part, by a braking distance for the ego vehicle.

5. The method of claim 4, wherein the braking distance for the ego vehicle is determined based, at least in part, on velocity of the ego vehicle.

6. The method of claim 4, wherein the braking distance for the ego vehicle is determined based, at least in part, by tire pressure for the ego vehicle, weather conditions, or tire traction data or a combination thereof.

7. The method of claim 4, wherein the braking distance for the ego vehicle or the braking distance data element for the first vehicle or the braking distance data element for the second vehicle or a combination of thereof is less in autonomous mode than in manual mode.

8. The method of claim 1, wherein the first message and the second message are broadcast messages.

9. The method of claim 1, wherein the first message and the second message are point-to-point messages.

10. The method of claim 1, wherein the first message and the second message are a Basic Safety Message or a Cooperative Awareness Message.

11. The method of claim 1, wherein maneuvering the ego vehicle into the target space comprises moving the ego vehicle into the same lane as the first vehicle and the second vehicle.

12. An ego vehicle, comprising:
one or more wireless transceivers;
vehicle internal sensors;
vehicle external sensors;
a memory; and
one or more processors, communicatively coupled to the one or more wireless transceivers, the vehicle internal sensors, the vehicle external sensors, and the memory;
wherein the one or more processors are configured to:
  receive, at the one or more wireless transceivers, a first message from a first vehicle, wherein the first message comprises an identification data element for the first vehicle, an autonomous vehicle capability element, indicating whether the first vehicle has a non-autonomous vehicle status or an autonomous vehicle status for the first vehicle, and a braking distance data element for the first vehicle;
  receive, at the one or more wireless transceivers, a second message from a second vehicle, wherein the second message comprises an identification data element for the second vehicle, an autonomous vehicle capability element, indicating whether the second vehicle has a non-autonomous vehicle status or an autonomous vehicle status for the second vehicle, and a braking distance data element for the second vehicle;
  determine a target space between the first and the second vehicle based, at least in part, upon:
    a size of the ego vehicle, the autonomous vehicle capability element for the first vehicle, or the autonomous vehicle capability element for the second vehicle, or the braking distance data element for the first vehicle, or the braking distance data element for the second vehicle, or a combination of any two or more thereof; and
    the autonomous vehicle capability element for the first vehicle or the autonomous vehicle capability element for the second vehicle or a combination thereof;
  send, from the one or more wireless transceivers, a third message to the first vehicle requesting the target space between the first vehicle and the second vehicle;
  send, from the one or more wireless transceivers, a fourth message to the second vehicle requesting the target space between the first vehicle and the second vehicle;
  receive at least one response in a fifth message from the first vehicle or in a sixth message from the second vehicle or a combination thereof; and
  maneuver the ego vehicle into the target space between the first and the second vehicle based upon the at least one response.

13. The ego vehicle of claim 12, wherein the third message and the fourth message are sent to the first vehicle and the second vehicle as a broadcast message or a multicast message.

14. The ego vehicle of claim 12, wherein the third message and the fourth message are sent to the first vehicle and the second vehicle respectively as peer-to-peer messages.

15. The ego vehicle of claim 12, wherein the target space is determined based, at least in part, by a braking distance for the ego vehicle.

16. The ego vehicle of claim 15, wherein the braking distance for the ego vehicle is determined based, at least in part, on velocity of the ego vehicle.

17. The ego vehicle of claim 15, wherein the braking distance for the ego vehicle is determined based, at least in part, by tire pressure for the ego vehicle, weather conditions, or tire traction data or a combination thereof.

18. The ego vehicle of claim 15, wherein the braking distance for the ego vehicle or the braking distance data element for the first vehicle or the braking distance data element for the second vehicle or a combination of thereof is less in autonomous mode than in manual mode.

19. The ego vehicle of claim 12, wherein the first message and the second message are broadcast messages.

20. The ego vehicle of claim 12, wherein the first message and the second message are point-to-point messages.

21. The ego vehicle of claim 12, wherein the first message and the second message are a Basic Safety Message or a Cooperative Awareness Message.

22. The ego vehicle of claim 12, wherein maneuvering the ego vehicle into the target space comprises moving the ego vehicle into the same lane as the first vehicle and the second vehicle.

23. A method of vehicle coordination, comprising:
  receiving, at an ego vehicle, a first message from a first vehicle, wherein the first message comprises an identification data element for the first vehicle, an autonomous vehicle capability element, indicating whether the first vehicle has a non-autonomous vehicle status or an autonomous vehicle status for the first vehicle, and a braking distance data element for the first vehicle, and wherein the first vehicle is in a same lane as the ego vehicle, preceding the ego vehicle;
  receiving, at the ego vehicle, a second message from a second vehicle, wherein the second message comprises an identification data element for the second vehicle, an autonomous vehicle capability element, indicating whether the second vehicle has a non-autonomous vehicle status or an autonomous vehicle status for the second vehicle, and a braking distance data element for the second vehicle, and wherein the second vehicle is in a same lane as the ego vehicle, following the ego vehicle;
  determining a first target space between the ego vehicle and the first vehicle based upon:
    an autonomous vehicle status of the ego vehicle, or the braking distance data element for the first vehicle, or a braking distance of the ego vehicle, or a combination of any two or more thereof; and
    the autonomous vehicle capability element for the first vehicle;
  determining a second target space between the ego vehicle and the second vehicle based upon:
    the autonomous vehicle status of the ego vehicle, or the braking distance data element for the second vehicle, or the braking distance of the ego vehicle, or a combination of any two or more thereof; and the autonomous vehicle capability element for the second vehicle;

sending, from the ego vehicle, a third message to the first vehicle requesting the first target space between the first vehicle and the ego vehicle;

sending, from the ego vehicle, a fourth message to the second vehicle requesting the second target space between the first and the second vehicle;

receiving at least one response in a fifth message from the first vehicle or in a sixth message from the second vehicle or a combination thereof; and maneuvering the ego vehicle to create or maintain the first target space between the ego vehicle and the first vehicle and the second target space between the ego vehicle and the second vehicle, based on the received at least one response.

24. The method of claim 23, wherein the first target space or the second target space or a combination thereof is determined based, at least in part, by the braking distance for the ego vehicle or the braking distance data element for the first vehicle or the braking distance data element for the second vehicle or a combination thereof.

25. The method of claim 24, wherein the braking distance for the ego vehicle is determined based, at least in part, by velocity of the ego vehicle and empirical stopping distance data associated with the velocity of the ego vehicle.

26. The method of claim 24, wherein the braking distance for the ego vehicle is determined based, at least in part, by tire pressure for the ego vehicle.

27. The method of claim 24, wherein the braking distance for the ego vehicle is determined based, at least in part, by weather conditions.

28. The method of claim 24, wherein the braking distance for the ego vehicle is determined based, at least in part, by tire traction data.

29. The method of claim 24, wherein the braking distance for the ego vehicle or the braking distance data element for the first vehicle or the braking distance data element for the second vehicle or a combination thereof is less in autonomous mode than in manual mode.

30. The method of claim 23, wherein the first message and the second message are broadcast messages.

31. The method of claim 23, wherein the first message and the second message are point-to-point messages.

32. The method of claim 23, wherein the first message and the second message are a Basic Safety Message or a Cooperative Awareness Message.

33. An ego vehicle, comprising:
one or more wireless transceivers;
vehicle internal sensors;
vehicle external sensors;
a memory; and
one or more processors, communicatively coupled to the one or more wireless transceivers, the vehicle internal sensors, the vehicle external sensors, and the memory;
wherein the one or more processors are configured to:
receive, at the one or more wireless transceivers, a first message from a first vehicle, wherein the first message comprises an identification data element for the first vehicle, an autonomous vehicle capability element, indicating whether the first vehicle has a non-autonomous vehicle status or an autonomous vehicle status for the first vehicle, and a braking distance data element for the first vehicle;

receive, at the one or more wireless transceivers, a second message from a second vehicle, wherein the second message comprises an identification data element for the second vehicle, an autonomous vehicle capability element, indicating whether the second vehicle has a non-autonomous vehicle status or an autonomous vehicle status for the second vehicle, and a braking distance data element for the second vehicle;

determine a first target space between the ego vehicle and the first vehicle based upon:
an autonomous vehicle status of the ego vehicle, or the braking distance data element for the first vehicle, or a braking distance of the ego vehicle or a combination of any two or more thereof; and
the autonomous vehicle capability element for the first vehicle;

determine a second target space between the ego vehicle and the second vehicle based upon:
the autonomous vehicle status of the ego vehicle, or the braking distance data element for the second vehicle, or the braking distance of the ego vehicle, or a combination of any two or more thereof; and
the autonomous vehicle capability element for the second vehicle;

send, from the one or more wireless transceivers, a third message to the first vehicle requesting the first target space between the first vehicle and the ego vehicle;

send, from the one or more wireless transceivers, a fourth message to the second vehicle requesting the second target space between the first and the second vehicle;

receive, at the one or more wireless transceivers, an at least one response in a fifth message from the first vehicle or in a sixth message from the second vehicle or a combination thereof; and maneuver the ego vehicle to create or maintain the first target space between the ego vehicle and the first vehicle and the second target space between the ego vehicle and the second vehicle, based on the received at least one response.

34. The ego vehicle of claim 33, wherein the first target space or the second target space or a combination thereof is determined based, at least in part, by the braking distance for the ego vehicle or the braking distance data element for the first vehicle or the braking distance data element for the second vehicle or a combination thereof.

35. The ego vehicle of claim 34, wherein the braking distance for the ego vehicle is determined based, at least in part, by velocity of the ego vehicle and empirical stopping distance data associated with the velocity of the ego vehicle.

36. The ego vehicle of claim 34, wherein the braking distance for the ego vehicle is determined based, at least in part, by tire pressure for the ego vehicle.

37. The ego vehicle of claim 34, wherein the braking distance for the ego vehicle is determined based, at least in part, by weather conditions.

38. The ego vehicle of claim 34, wherein the braking distance for the ego vehicle is determined based, at least in part, by tire traction data.

39. The ego vehicle of claim 34, wherein the braking distance for the ego vehicle or the braking distance data element for the first vehicle or the braking distance data element for the second vehicle or a combination of vehicles thereof is shorter in autonomous mode than in manual mode.

40. The ego vehicle of claim 33, wherein the first message and the second message are broadcast messages.

41. The ego vehicle of claim 33, wherein the first message and the second message are point-to-point messages.

42. The ego vehicle of claim 33, wherein the first message and the second message are a Basic Safety Message or a Cooperative Awareness Message.

\* \* \* \* \*